United States Patent  
Cappiello

Patent No.: US 10,635,669 B1
Date of Patent: Apr. 28, 2020

(54) DATA ENGINE INTEGRATION AND DATA REFINEMENT

(71) Applicant: MicroStrategy Incorporated, Vienna, VA (US)

(72) Inventor: Scott Cappiello, San Marcos, CA (US)

(73) Assignee: MicroStrategy Incorporated, Vienna, VA (US)

( * ) Notice: Subject to any disclaimer, the term of this patent is extended or adjusted under 35 U.S.C. 154(b) by 809 days.

(21) Appl. No.: 14/606,164

(22) Filed: Jan. 27, 2015

Related U.S. Application Data

(60) Provisional application No. 61/931,852, filed on Jan. 27, 2014, provisional application No. 62/021,581, filed on Jul. 7, 2014, provisional application No. 61/932,099, filed on Jan. 27, 2014.

(51) Int. Cl.
G06F 16/24 (2019.01)
G06F 16/2453 (2019.01)

(52) U.S. Cl.
CPC .............. *G06F 16/24542* (2019.01)

(58) Field of Classification Search
CPC ............ G06F 17/30477; G06F 16/27; G06F 16/2455; G06F 16/2471; G06F 16/278
See application file for complete search history.

(56) References Cited

U.S. PATENT DOCUMENTS

| | | | |
|---|---|---|---|
| 5,414,469 A | 5/1995 | Gonzales | |
| 7,181,444 B2 | 2/2007 | Porter et al. | |
| 8,402,052 B2 | 3/2013 | Sano et al. | |
| 8,495,627 B2 | 7/2013 | Barsness | |
| 8,996,523 B1 | 3/2015 | Fisher | |
| 9,411,853 B1 * | 8/2016 | Dovrtel | G06F 17/30477 |
| 2002/0032676 A1 | 3/2002 | Reiner | |
| 2003/0233403 A1 | 12/2003 | Bae | |
| 2004/0165780 A1 | 8/2004 | Maki | |
| 2005/0050036 A1 | 3/2005 | Araki | |
| 2005/0187977 A1 | 8/2005 | Frost | |
| 2006/0155687 A1 | 7/2006 | Chou | |
| 2006/0155688 A1 | 7/2006 | Chou | |
| 2006/0227970 A1 | 10/2006 | Nakano | |
| 2007/0130131 A1 | 6/2007 | Porter et al. | |
| 2009/0104123 A1 | 4/2009 | Yang | |
| 2009/0112949 A1 | 4/2009 | Ergan | |

(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

Data engine integration and data refinement are described. The actions include receiving, by a data refinement engine, a request for data. The actions include determining a first amount of processing to be performed by the data refinement engine and a second amount of processing to be performed by one or more processors of a data source that include a plurality of data nodes. The actions include transmitting, by the data refinement engine, code to the plurality of data nodes of instructions associated with the second amount of processing. The actions include receiving, by the data refinement engine and from the plurality of data nodes, unprocessed first data and processed second data. The actions include processing, by the data refinement engine, the unprocessed first data. The actions include, in response to the request for data, transmitting, by the data refinement engine, the processed first data and the processed second data.

18 Claims, 54 Drawing Sheets

(56) References Cited

U.S. PATENT DOCUMENTS

| | | |
|---|---|---|
| 2011/0040733 A1 | 2/2011 | Sercinoglu |
| 2011/0302583 A1* | 12/2011 | Abadi ................ G06F 16/2471 |
| | | 718/102 |
| 2012/0084296 A1 | 4/2012 | Waters |
| 2012/0136649 A1 | 5/2012 | Freising et al. |
| 2012/0179714 A1 | 7/2012 | Chandhok |
| 2012/0226804 A1* | 9/2012 | Raja .................... H04L 43/028 |
| | | 709/224 |
| 2013/0013552 A1* | 1/2013 | Eshleman ............. G06Q 10/00 |
| | | 707/600 |
| 2013/0018903 A1 | 1/2013 | Taranov |
| 2014/0195558 A1* | 7/2014 | Murthy ............ G06F 17/30545 |
| | | 707/770 |
| 2014/0280372 A1* | 9/2014 | Huras ............... G06F 17/30584 |
| | | 707/803 |
| 2014/0358845 A1* | 12/2014 | Mundlapudi ..... G06F 17/30592 |
| | | 707/602 |
| 2015/0135255 A1* | 5/2015 | Theimer ................ H04L 63/20 |
| | | 726/1 |
| 2015/0169688 A1 | 6/2015 | Halverson |
| 2015/0178052 A1 | 6/2015 | Gupta |
| 2015/0317362 A1 | 11/2015 | Teranishi |
| 2015/0355989 A1 | 12/2015 | Hayden |
| 2016/0048584 A1 | 2/2016 | Valentin |
| 2016/0105328 A1 | 4/2016 | Cooper |
| 2016/0154852 A1 | 6/2016 | Chen et al. |

\* cited by examiner

DATA ENGINE INTEGRATION AND DATA REFINEMENT

CROSS REFERENCE TO RELATED APPLICATIONS

This application claims the benefit of U.S. Patent Application No. 61/931,852, filed Jan. 27, 2014, U.S. Patent Application No. 62/021,581, filed Jul. 7, 2014, and U.S. Patent Application No. 61/932,099, filed Jan. 27, 2014, the contents of which are incorporated by reference.

FIELD

This description relates to data engine integration and data refinement.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage—disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation.

SUMMARY

In general, one innovative aspect of the subject matter described in this specification can be embodied in methods that include the actions of receiving, by a data refinement engine, a request for data; determining, by the data refinement engine, a first amount of processing to be performed by the data refinement engine and a second amount of processing to be performed by one or more processors of a data source that include a plurality of data nodes; transmitting, by the data refinement engine, code to the plurality of data nodes of instructions associated with the second amount of processing; receiving, by the data refinement engine and from the plurality of data nodes, unprocessed first data and processed second data; and processing, by the data refinement engine, the unprocessed first data; in response to the request for data, transmitting, by the data refinement engine, the processed first data and the processed second data.

These and other embodiments can each optionally include one or more of the following features. The first amount of processing and the second amount of processing includes filtering, aggregation, wrangling, searching, data mining, text analytics, on demand loading, incremental refreshing, streaming, data blending, complex ETL workflows, or multi-sourcing. The data refinement engine receives the request for data request from a dashboard application. The action of determining, by the data refinement engine, a first amount of processing to be performed by the data refinement engine and a second amount of processing to be performed by one or more processors of a data source that include a plurality of data nodes includes generating a query tree that includes query tasks for processing; and determining that the first amount of processing includes a first portion of the query tasks and the second amount of processing includes a second portion of the query tasks.

The action of determining, by the data refinement engine, a first amount of processing to be performed by the data refinement engine and a second amount of processing to be performed by one or more processors of a data source that include a plurality of data nodes includes determining the first amount of processing and the second amount of processing to balance a processing load of the data refinement engine and a processing load of the plurality of data nodes. The actions include after transmitting, by the data refinement engine, code to the plurality of data nodes of instructions associated with the second amount of processing, receiving, by the data refinement engine and from the plurality of data nodes, heartbeats and execution status updates. The action of transmitting, by the data refinement engine, code to the plurality of data nodes of instructions associated with the second amount of processing includes identifying a particular data node of the plurality of data nodes that stores a portion of the unprocessed second data; and transmitting, to the particular data node of the plurality of data nodes, the code to perform a portion of the second amount of processing on the portion of the unprocessed second data.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 15-54 illustrate example user interfaces.

DETAILED DESCRIPTION

Techniques are described for an in-memory engine that receives a request for analytics or visualization of data stored on a big data engine that is separate from the in-memory engine. The in-memory engine queries the big data engine for the requested data and requests the big data engine to perform any needed processing to arrive at the requested data prior to sending to the in-memory engine. The in-memory engine receives the requested data, stores it in an in-memory cache, presents the requested data, and processes further analytics on the requested data based on subsequent requests.

In some implementations, an in-memory engine and a big data engine collaborate to provide insights from raw data to a business analyst. In these implementations, the collaboration may include performing data cleaning/preparation/ETL, data enrichment/predictive analysis/text analytics, and visual data discovery. Further, in these implementations, data may be processed locally in a big data platform, the processed data may be cached at an in-memory layer, and data may be viewed using dashboards. In the following disclosure, FIGS. 2-8 and the associated descriptions relate to data storage technology that may be used with data engine integration. Thereafter, data engine integration features that may be implemented using the systems described with reference to FIGS. 2-8 are discussed in more detail with reference to FIGS. 1 and 9-13.

In some implementations, the big data engine may include a data refinement engine that provides data refinement capabilities for local files, as well as a big data file system. The data refinement engine has the ability to push the processing into the big data file system. In the following disclosure, FIG. 14 and the associated description relates to the data refinement engine, and FIGS. 15-54 and the associated descriptions relate to user interfaces for the data refinement engine.

In some implementations, a database system integrates with an outside source for refining data (e.g., Open Refine). In these implementations, the database system may integrate the web graphical user interface (GUI) of a data refinement source (e.g., Open Refine) into the database system web server, but keep an independent data refinement source (e.g., Open Refine) server along with the database system web server. In these implementations, the database system keeps most of the data refinement source (e.g., Open Refine) GUI intact and automatically directs the "refined data" file to data import.

In some examples, the database system may have a web GUI based on an independent design of data wrangling features, but invoke web commands of the data refinement source (e.g., Open Refine) server to achieve the desired effect. In other examples, the database system may extract and reuse individual action modules out of the data refinement source (e.g., Open Refine) server.

Figure 1:
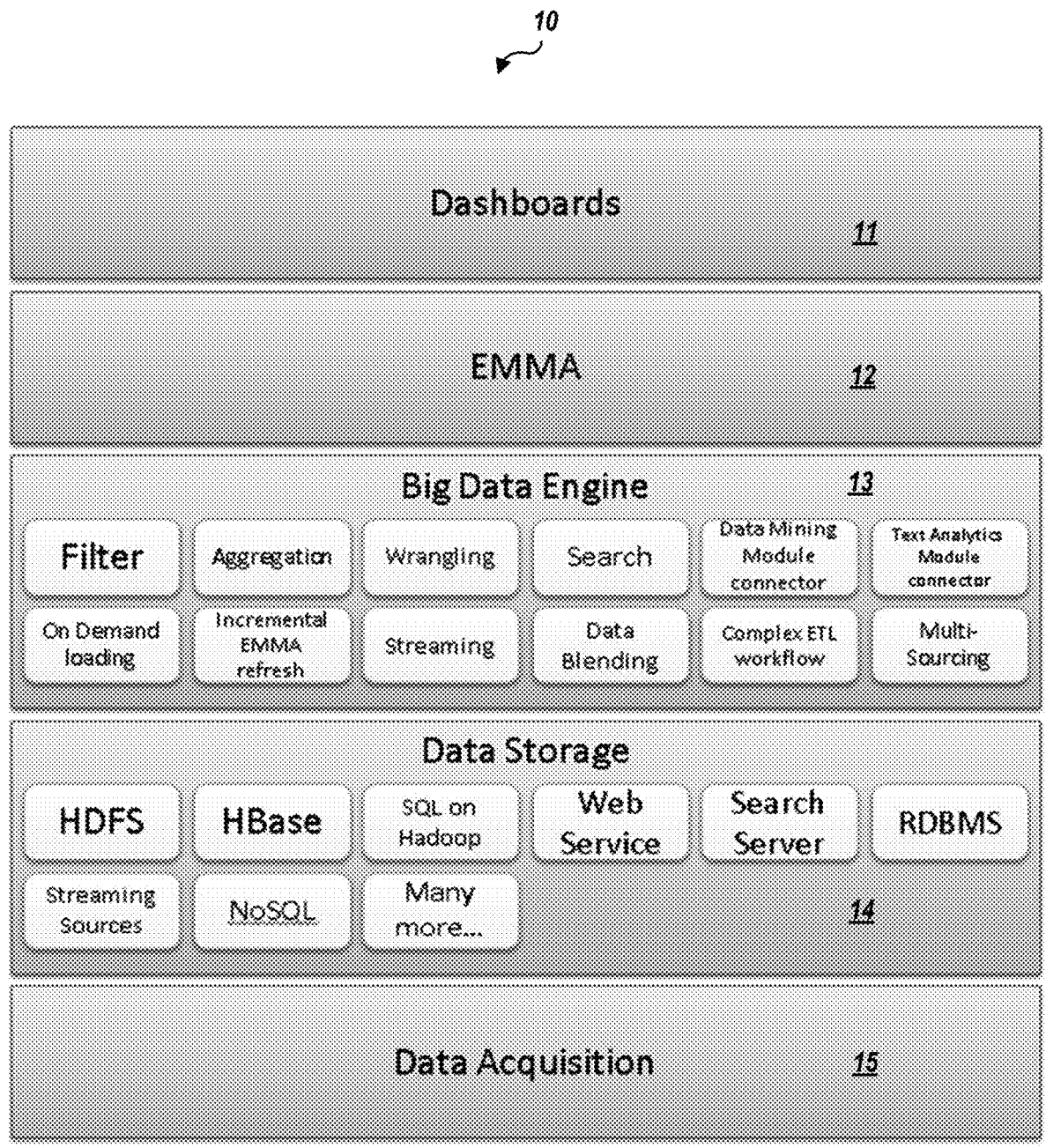
FIG. 1 illustrates example integration with a data engine.

FIG. 1 illustrates example integration with a data engine. As shown, a system 10 includes a dashboard layer 11, an in-memory layer 12, a data engine layer 13, a data storage layer 14, and a data acquisition layer 15. The dashboard layer 11 provides an interface for data analysis and review by a data analyst. The dashboard layer 11 receives user input related to desired data analysis/viewing and produces output that is responsive to the received user input and that presents the data desired by the analyst. The dashboard layer 11 may generate a dashboard that is dynamic and flexible. The dashboard layer 11 interacts with the in-memory layer 12 to request data needed to service user requests, receive data from the in-memory layer 12 based on requests, and use the received data to generate dashboard output.

The in-memory layer 12 may include an embedded in-memory, column-oriented, distributed, analytic data store that is coupled to the dashboard layer 11 and that provides rapid query response and analytic processing. In the in-memory layer 12, data is partitioned in various nodes on memory components and processed in parallel using load balancing and failover techniques. The in-memory layer 12 receives requests from the dashboard layer 11 and services the requests to the extent the in-memory layer 12 has the data needed to satisfy the requests. The in-memory layer 12 may send data to the dashboard layer 11 without processing or after performing analytics on the data. The in-memory layer 12 interacts with the data engine layer 13 to gather data needed to satisfy requests from the dashboard layer 11 or to otherwise populate its data store.

The data engine layer 13 performs various data analytics operations on data. For instance, the data engine layer 13 may perform filtering, aggregation, wrangling, searching, data mining, text analytics, on demand loading, incremental refreshing, streaming, data blending, complex ETL workflows, and multi-sourcing. Data wrangling will be described in more detail below. The data engine layer 13 may receive requests from the in-memory layer 12 to provide data that represents analytics performed on raw data. The data engine layer 13 may access the raw data from the data storage layer 14 and perform the needed analytics and/or may request the data storage layer 14 to perform the analytics and provide the data after the analytics have been performed. Performing the analytics at the data storage layer 14 may save time because all of the data does not need to be transmitted to the data engine layer 13 for the analytics to be performed.

The data storage layer 14 may include one or more sources of large volume data. For example, the data storage layer 14 may include a Hadoop Distributed File System (HDFS), a column-oriented database management system that runs on top of HDFS (Hbase), SQL on Hadoop, a web service, a search server, a relational database management system (RDBMS), streaming sources, a NoSQL database, or any other type of large volume data source. The data storage layer 14 may store data and may be able to send data to the data engine layer 13 either as raw, unprocessed data or processed data that includes results of performing analytics on the raw data.

The data acquisition layer 15 acquires data that is stored in the data storage layer 14. The data acquisition layer 15 may use any types of data acquisition techniques to acquire data.

Figure 2:
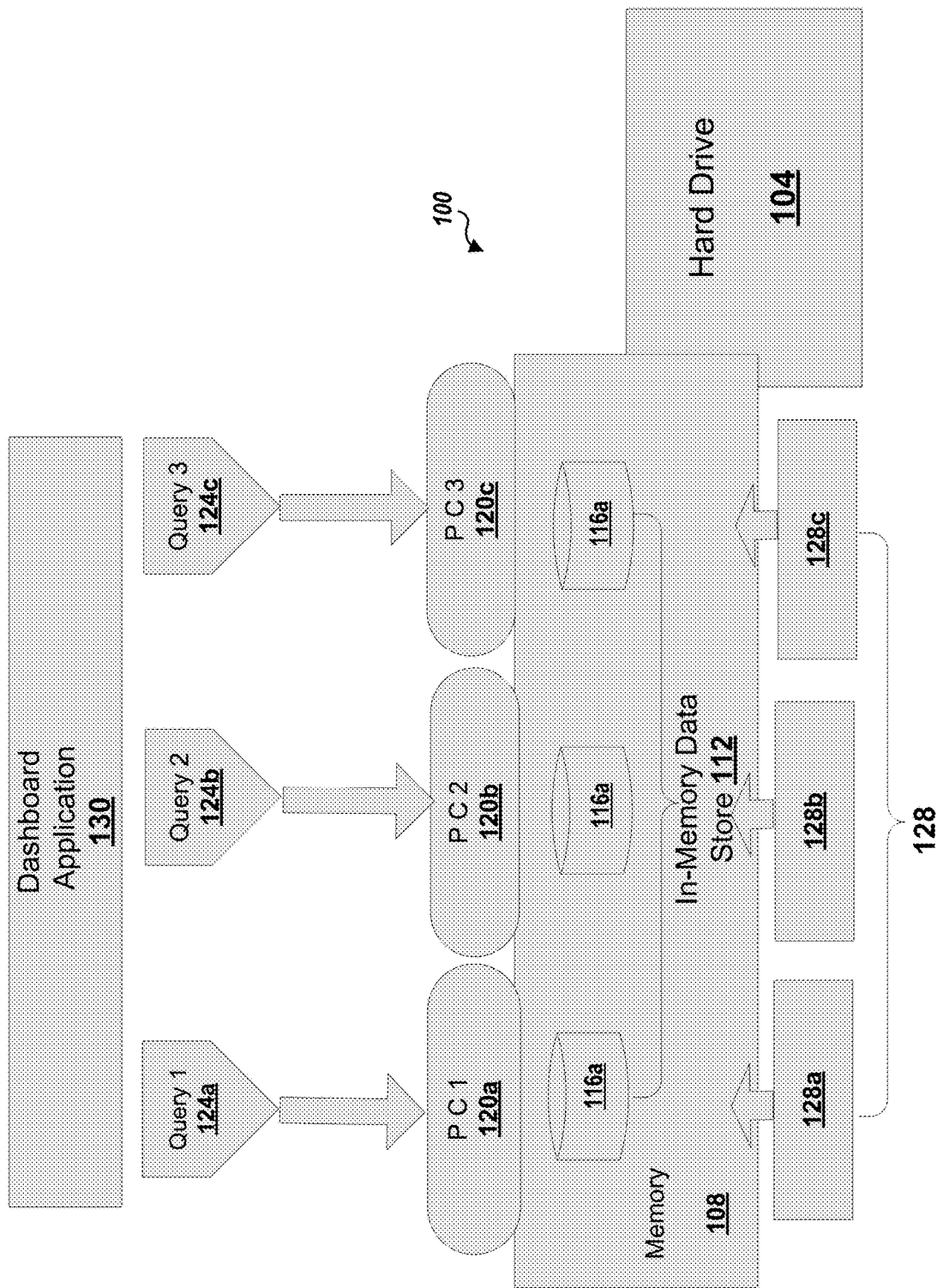
FIG. 2 is a block diagram of an example architecture of an in-memory analytic data store.

FIG. 2 shows an example conceptual diagram of a computer system 100 that may be used in the system 10. For example, computer system 100 can be implemented on or more computers (or nodes). As shown, computer system 100 can be conceptually represented as having two data storage areas, a hard disk 104 and a memory 108. The computer system 100 includes a dashboard application 130. Dashboard application 130 can include an interface (as described in detail below) for displaying grids and graphs based on underlying data to a user.

For example, memory 108 can be a random access memory or a flash memory. In some implementations, memory 108 allows data items to be read and written in a substantially similar amount of time regardless of an order in which the data items are access. In this regard, memory 108 can be different from, for example, hard disk 104 where the time to read and write data items can vary significant depending on the physical locations of the data items in the recording medium and because of, e.g., mechanical limitations such as media rotation speeds and arm movement delays.

Memory 108 includes an in-memory data store 112. For example, the in-memory data store can be partitioned into one or more data sub sets 116*a-c*. For example, one or more data sub sets 116*a-c* can include partitions (e.g. a portion) of one or more tables within data store 112. Although three data sub sets 116*a-c* are shown and described here, there can be fewer or more (perhaps several more) than the three data sub sets 116*a-c*. Each data sub set 116*a-c* is associated with one or more processing units 120*a-c*. Although three processing units 120*a-c* are shown and described here, there can be fewer or more (perhaps several more) than the three processing units 120*a-c*. In some examples, a processing unit 120*a* can be associated with more than one data sub set 116*a-c*.

For example, processing units 120*a-c* can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 100 can be implemented across multiple nodes. For example, a first processing unit 120*a* can each be a processor core of a multi-core processor in a first node, and a second processing unit 120*b* can be a processor core of a multi-core processor in a second, different, node. In some implementations, while processing unit 120*a* is physically located in a first node (e.g. a first processor core in the first node), processing units 120*b* and 120*c* can be physically located in a second, different node (e.g. second, different processor cores in the second node). In some implementations, data sub set 116*a* can be physically located in the first node, and data sub sets 116*b* and 116*c*, corresponding respectively to each of processing units 120*b* and 120*c*, can be physically located in the second, different node. Although a few example combinations of processor cores and partitioned data sets are described here, a person of ordinary skill in the art would understand that any number of combinations of processor cores and partitioned data sets, spread out over a single node or multiple nodes, are possible.

In some examples, one or more database transactions can be processed in the form of one or more queries 124*a-c* to the in-memory analytic data store 112. For example, a high level database transaction can be divided into the multiple queries 124*a-c*. In some examples, the number of queries 124*a-c* can be as high as a number of parallel processing units 120*a-c* that are available to process the queries 124*a-c* in parallel. As shown, the queries 124*a-c* can be processed in parallel by the respective processing units 120*a-c*. For example, query 124*a* may require the summation of a column of data (e.g., numbers) residing in a portion of the data sub set 116*a*. For example, the column of data relates to sales made by a customer over a period of time. This summation operation can be handled by respective processing unit 120*a*. Substantially at the same time, a different (but perhaps related) operation, e.g. retrieving transaction dates for the sales fields being processed through the summation operation, can be handled by processing unit 120*b* operating on data sub set 116*b*. The results from respective queries 124*a* and 124*b* can be sent back to a query engine (see e.g. FIG. 3 described in further detail below) to assemble the information for, e.g., final display.

For example, computer systems implementing the techniques described herein (e.g. computer system 100 of FIG. 2) uses information about an application and/or design aspects of a dashboard application 130 to generate queries 124*a-c* to the in-memory data store. For example, dashboard application 130 can include a dashboard interface, as described in detail below, in which two or more grids (e.g. tables of data) are based on same or similar content. In some implementations, the computer system 100 can cause a single combined query (e.g., only query 124*a*) or parallel queries (e.g., queries 124*a-c*) to be executed on the in-memory data store for the two or more grids. In some implementations, dashboard application 130 can have two visualizations representing, e.g. sales trends over time through both a line chart and a grid of data. In the computer system 100, the data needed for the two visualizations can be the same and so can be based on a either a single query or multiple parallel queries to in-memory analytic data store 112. In some examples, dashboard application 130 can include two visualizations (not shown) based on selecting key performance indicators (KPIs) from a same set of underlying data in in-memory data store 112. Because the underlying data involved is the same, the visualizations can be executed together—i.e. a single query or multiple parallel queries can be executed together. In some implementations, dashboard application 130 can include visualizations that are based on same or similar filtering criteria, and as such queries corresponding to these visualizations can be combined into a single query and/or executed together.

In some implementations, a data service engine 128 can receive data from multiple high volume data storage systems and load the received data into in-memory data store 112. In some examples, data service engine 128 can perform parallel data loading into data store 112 through parallel processes 128*a-c*. For example, processes 128*a-c* can load data from a corresponding data sources (not shown) into respective in-memory data store sub sets 116*a-c* in parallel. In some implementations, the loaded data can be all of the market intelligence data needed to generate output for an end application, e.g., a dashboard/visualization engine as described in further detail below.

The in-memory analytic data store 112 can enable bigger data volume given its partitioned and parallel processing structure. For instance, current in-memory technologies are limited to two billion rows. By dividing datasets into partitions (e.g., data store sub sets 116*a-c*), each partition or sub set 116*a-c* can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multiprocessor node. For multiple node partitioning, data partitions are distributed within and across multiple nodes (e.g., machines) and queries processed in parallel within and across multiple nodes.

In some implementations, the in-memory analytic data store 112 can provide broader analytic functionality. For instance, current in-memory cubes do not support full filter and metric functionality. In current in-memory cubes, "single pass" queries can be executed on underlying data. As such, complex business questions, such as, returning regional sales for those customers that bought certain widgets worth more than a predetermined number, could not be run on the data. The in-memory analytic data store 112, however, extends to "multi-pass" analytics with multiple levels of aggregation and/or filtering. For example, computer system 100 can process metrics having conditions. In some examples, computer system 100 can also set qualification filters on the data.

Figure 3:
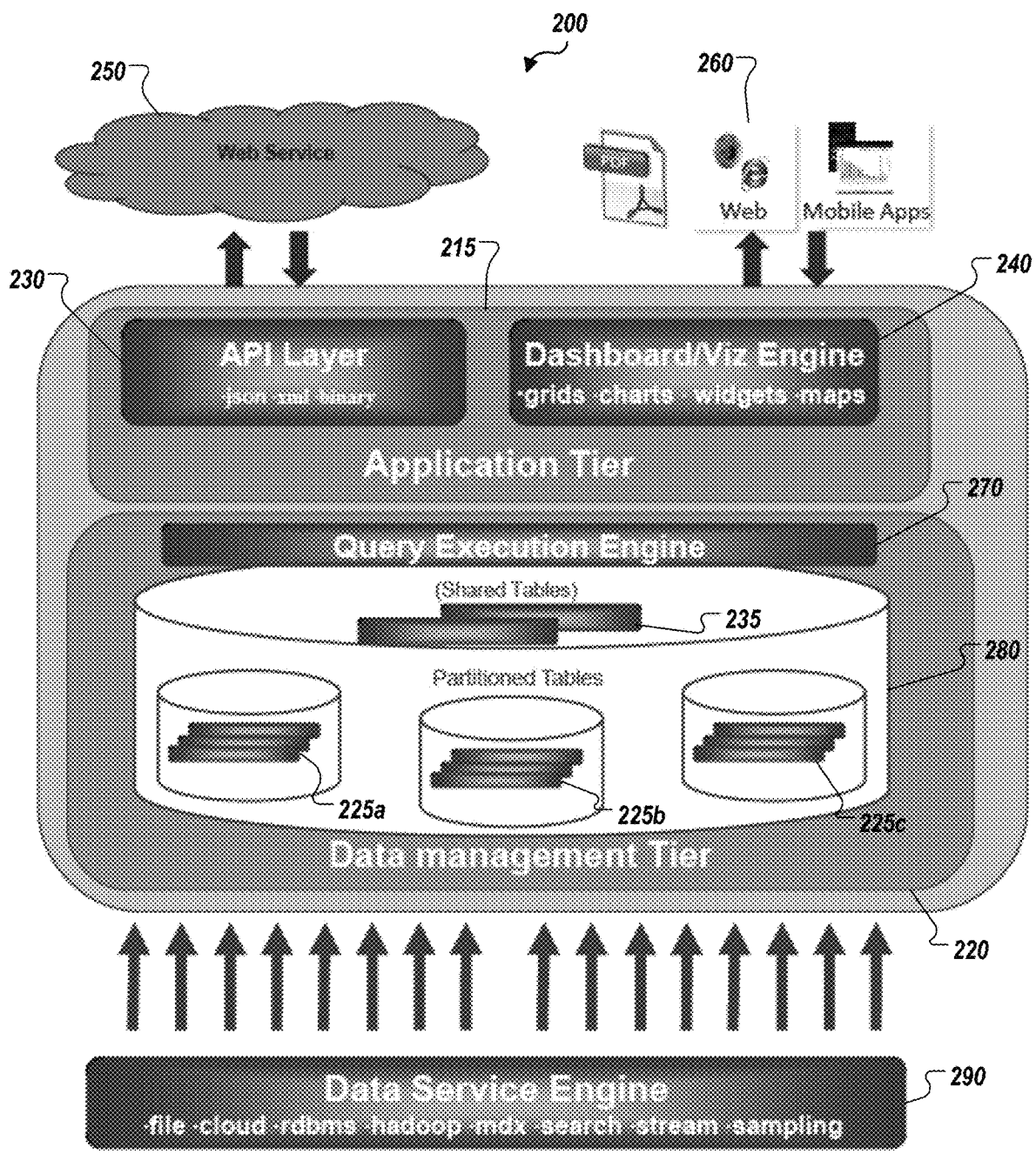
FIG. 3 is a block diagram illustrating an example architecture of a node.

In some implementations, the computer system of FIG. 2 can be implemented on a single node. Referring to FIG. 3, an example architecture of a single node 200 is shown. Node 200 can be a server implementing an in-memory analytic data store 280. Node 200 can include an application tier 215, a data management tier 220, and a data service engine 290. Application tier 215 includes an application programming interface (API) layer 230 and an intelligence dashboard/visualization engine 240. For example, API layer 230 includes specifications describing how components in data management tier 220 can interact with other components, e.g., one or more web services 250. For example, API layer 230 interfaces with web services 250 to receive data from one or more other applications (e.g., market intelligence data) and/or to provide collaborative functionality with the one or more other applications (e.g., receive user input from the one or more other applications and provide data to be output by the one or more other applications).

Figure 5:
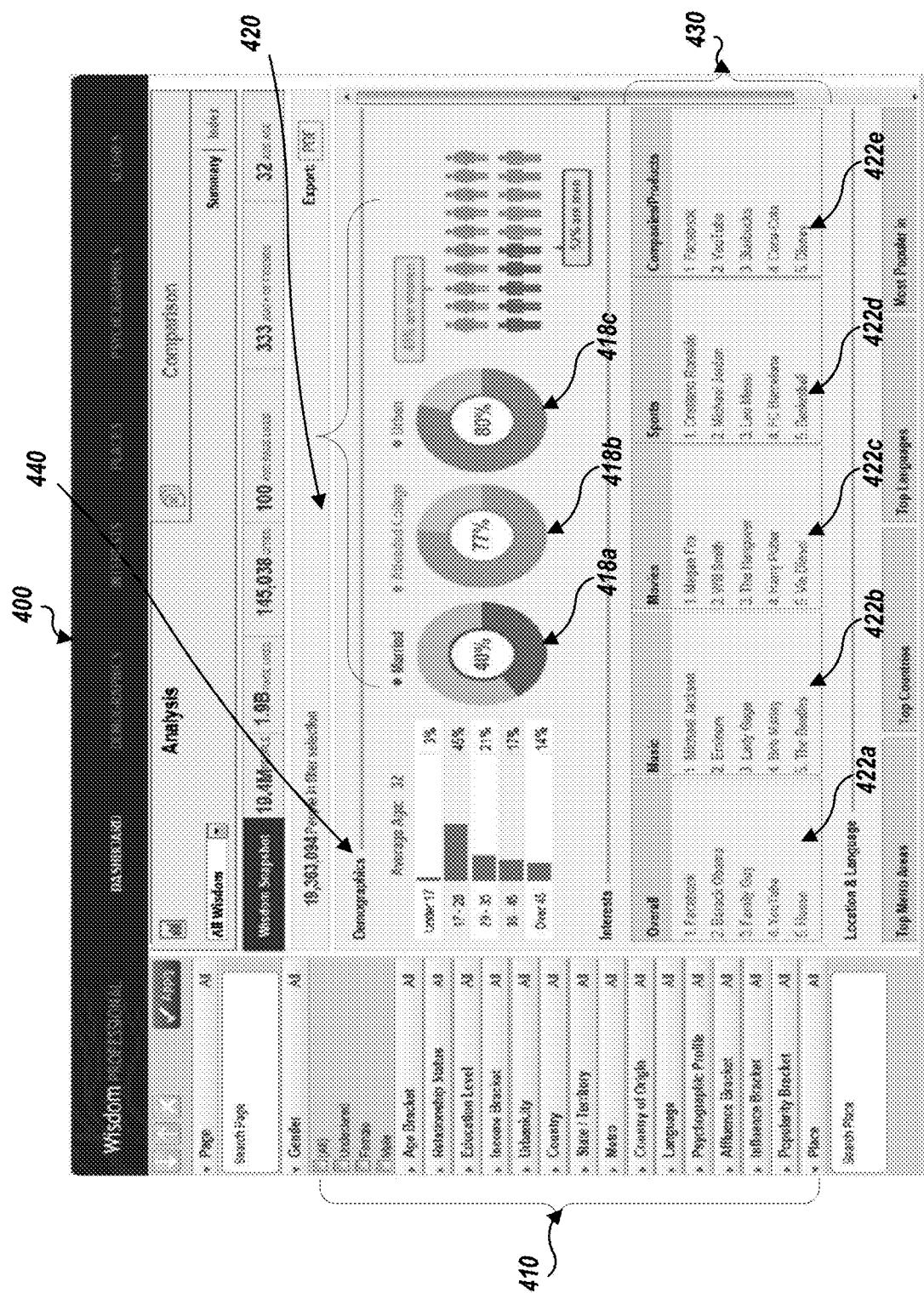
FIGS. 5 and 6 illustrate example user interfaces of an intelligence dashboard.

Dashboard/visualization engine 240 interacts with one or more of web applications, mobile applications, and documents 260 to receive user input and provide user output. For instance, dashboard/visualization engine 240 can generate a user interface 400 as shown in FIG. 5. For example, dashboard/visualization engine 240 can interact with a web or mobile application to output the user interface 400 on a user's device, e.g. a handheld device. Dashboard/visualization engine 240 also can output user interface 400 as a document or file that a user device is able to store and display. Application tier 210 can be a tightly-coupled with globally optimized query execution across multiple visualizations in single dashboard. Application tier 210 can also include a "data-only" JSON REST API and can provide super-fast search-style selectors.

Data management tier 220 can include a query execution engine 270 and an in-memory data store 280. Query execution engine 270 receives queries (similar to queries 124*a-c* described in connection with FIG. 2) from application tier 210 and processes the received queries on data stored in in-memory data store 280. Query execution engine 270 can access data from the in-memory data store 280, perform analytics on the accessed data, and provide, to the application tier 215, the accessed data and/or the results of the performed analytics. In some implementations, query execution engine 270 can divide a database transaction into a plurality of queries for processing on the respective data partitions.

In-memory data store 280 can be partitioned as shown. In some implementations, in-memory data store 280 can be partitioned to include, e.g., multiple partitioned tables 225*a-c* and one or more shared tables 235 that are stored in-memory. In some implementations, while each of the partitioned tables 225*a-c* is associated with a corresponding processor core, shared tables 235 can be accessed by multiple processor cores at substantially the same time. For example, the in-memory data store 280 can include a customer transactions table that can be partitioned such that each of the partitioned tables 225*a-c* has one million customer transaction entries. In some implementations, a shared table can be a customer table that is shared among two or more processor cores.

Query execution engine 270 is configured to process queries to multiple partitioned tables 225*a-c* and one or more shared tables 235 in parallel to provide fast data retrieval and enable a larger volume of data to be stored in-memory. For example, partition tables 225*a-c* can include a plurality of customer transaction records. Data management tier 220 can be a high-performance in-memory data tier that performs distributed in-memory analytics on the customer transaction records.

As explained above, data management tier 220 can have data partitioned across multiple processing cores and can perform parallel execution of queries across all cores according to a partition logic. In some implementations, a partition attribute can be defined to couple the processing cores to the respective data partition table e.g., any one of partition tables 225*a-c*. For example, if a partition table 225*a* contains customer transaction information, a customer transaction attribute such as a transaction identification code ("ID") can be used as a partition attribute. In this regard, in some examples, the transaction ID can be processed through a hash function and sent to partition tables 225*a-c* to determine which partition 225*a-c* has the corresponding transaction information. In some implementations, while multiple customers can be located in a partition table 225*a*, a customer located on partition table 225*a* can remain on that partition table 225*a* indefinitely (e.g., until the customer record is reallocated elsewhere).

Data service engine 290 can receive data from multiple high volume data storage systems and load the received data into the in-memory data store 280 in the data management tier 220. The data service engine 290 can perform parallel data loading into the in-memory data store 280 from multiple data sources. The loaded data can be all of the market intelligence data accessible to generate output through the dashboard/visualization engine 240. For example, data service engine 290 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information.

In some implementations, any arbitrary schema can be loaded into the in-memory analytic data store. In some implementations, the in-memory analytic data store 280 can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the in-memory analytic data store. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the in-memory analytic data store 280 can be loaded with all such star schemas.

Figure 4:
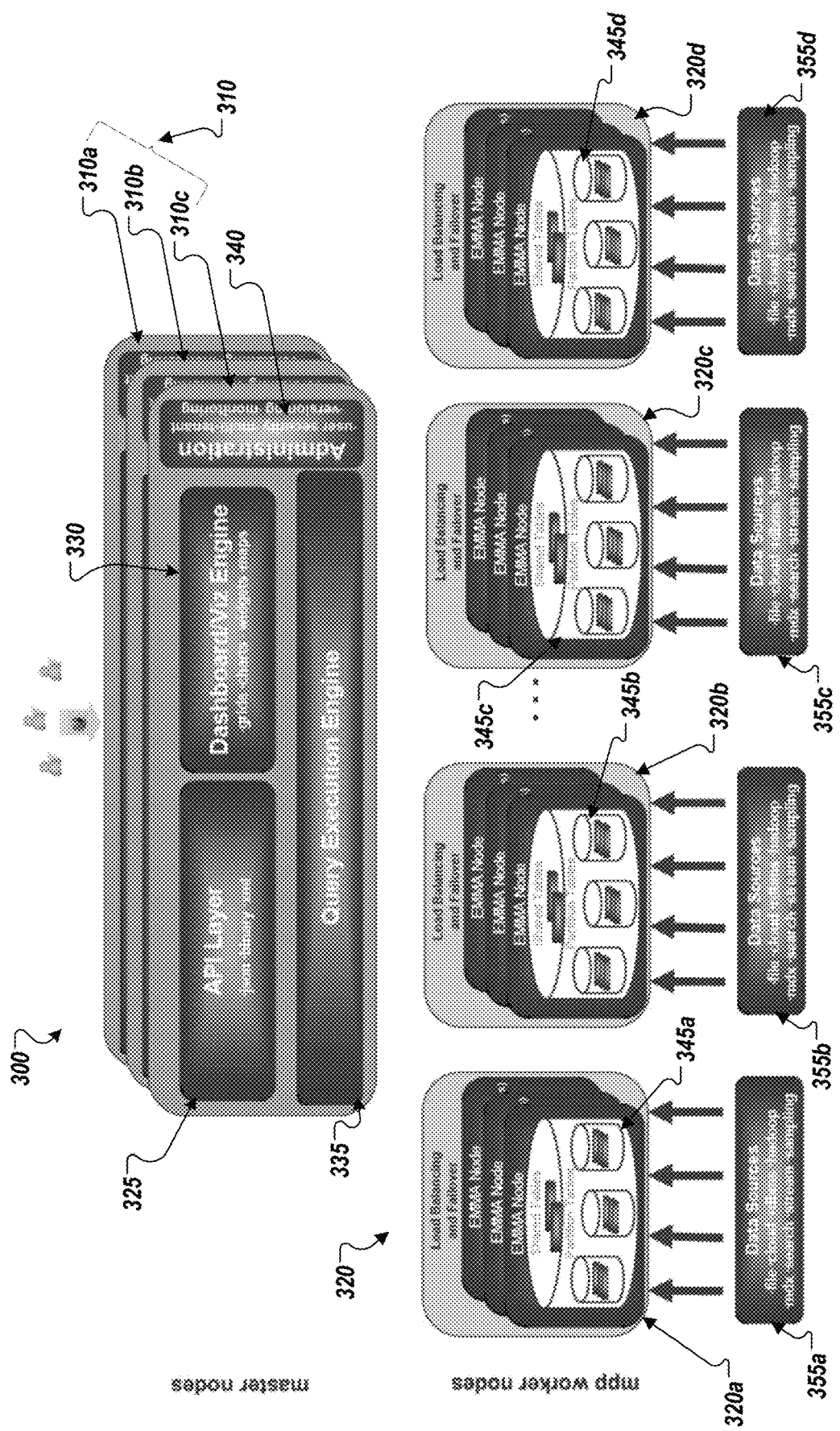
FIG. 4 is a block diagram illustrating an example system with multiple nodes.

FIG. 4 illustrates an example system 300 with multiple nodes 310, 320. The system 300 includes master nodes 310, further delineated as master nodes 310a-c, and worker nodes 320, further delineated as worker nodes 320a-d. Although FIG. 4 illustrates three master nodes 310a-c and four worker nodes 320a-d, the system 300 can include more (perhaps, many more) or fewer master nodes 310a-c and worker nodes 320a-d.

As shown, each of the master nodes 310a-c includes an API layer 325, a dashboard and/or visualization engine 330, a query execution engine 335, and an administration engine 340. The API layer, dashboard/visualization engine 330, and query execution engine 335 can be similar to the API layer 230, the dashboard/visualization engine 240, and the query execution engine 270 described above with respect to FIG. 3, except with for query execution engine 270 operating over multiple, different worker nodes 320a-d. Administration engine 340 handles administration functionality for the corresponding master node 310, including user security, multi-tenant administration, versioning, and process monitoring. Each of master nodes 310a-c can be operated on a separate machine.

As shown, each of the worker nodes 320a-d includes a corresponding in-memory analytic data store 345a-d, each of which can be similar to the in-memory data store 280 described above with respect to FIG. 3. Each of worker nodes 320a-d can perform load balancing and failover operations for its own in-memory analytic data store nodes and/or across all of the worker nodes 320. In this regard, in some implementations, a status of a node is monitored. If, for example, a node (or a core within the node) fails or the load on a node (or a core within the node) exceeds a predetermined maximum, its load is immediately redistributed across the remaining nodes (or cores). For example, if an abnormal condition state is detected with respect to one or more nodes (or cores in the nodes), a failover can be effected to another one of the plurality of nodes (or processor cores) to ensure continued operation.

Each of the worker nodes 320a-d can receive data from multiple large volume data sources and load the received data in parallel as described above. For example, each worker node 320a-d can be in communication with one or more corresponding data sources 355a-d. Although FIG. 4 illustrates a one-to-one correspondence between worker nodes 320a-d and data sources 355a-d, it should be understood that any variation of relationships between the worker nodes 320-a-d and data sources 355a-d is possible. For example, a single data source, e.g., data source 355a (say, a Hadoop system), can provide data to all four worker nodes 320a-d. The data sources 355a-d can include high volume data storage systems. Accordingly, a data services engine (e.g. data service engine 290 of FIG. 3) can load data from the data sources 355a-d in parallel into the in-memory data stores 345a-d. In some implementations, the loaded data can be all of the market intelligence data needed to generate output through a dashboard/visualization engine.

In some implementations, the raw data from one or more information sources, e.g., a Hadoop system, can be processed before being loaded (e.g. via data service engine 290 of FIG. 3) to an in-memory analytic data store. An example implementation of an interface for such processing is described in U.S. provisional Application No. 61/932,099, filed Jan. 27, 2014.

The system 300 can be configured differently depending on the type of application and the amount of data needed to support the application. For instance, for a market intelligence application that uses 2.2 billion rows, the system 300 can have a memory footprint of 59 GB and can have a hardware configuration of a single server with 32 cores and 1 TB of RAM. For a social media application that uses 2.8 billion rows, the system 300 can have a memory footprint of 100 GB and can have a hardware configuration of a single server with 40 cores and 1 TB of RAM. For an e-commerce application that uses 3.8 billion rows, the system 300 can have a memory footprint of 500 GB and can have a hardware configuration of a single server with 80 cores and 1 TB of RAM. For a social media application that uses 80 billion rows, the system 300 can have a memory footprint of 5-6 TB and can have a hardware configuration of 100 worker nodes, each with 16 cores and 144 GB of RAM, which results in a total of 1600 cores and 14 TB of RAM.

The system 300 can be configured to support use case characteristics with data volume in the 100's of GB to 1 TB range. In these cases, the system 300 can provide fast response time, as all executions are against in-memory datasets and datasets and queries are partition-friendly. The system 300 can serve mostly external-facing applications, although some applications can be internal. The data volume that can be handled by system 300 may not be limited to a particular size, such as 1 TB. In fact, depending on the available nodes in system 300, a variety of data volumes can be serviced by system 300.

FIG. 5 illustrates an example user interface 400 of an intelligence dashboard. As shown, interface 400 comprises a plurality of control objects 410-440. For example, control objects include grids (e.g. data displayed in table format), graphs, text fields, shapes, etc. that users can use to navigate through the data presented through interface 400. Interface 400 can be powered by the in-memory analytic data store described throughout this disclosure (e.g., in-memory analytic data store 112 of FIG. 2). In this regard, in some implementations, the analytic data store powers an extensive market intelligence network that provides the data shown in user interface 400. For example, computer systems implementing the techniques described herein (e.g. computer system 100 of FIG. 2) uses information about an application and/or design aspects of dashboard 400 to generate queries to the in-memory data store.

For example, all of the market intelligence data used by and displayed through the intelligence dashboard interface 400 can be loaded into the in-memory analytic data store. In this example, user interface 400 receives user input defining filter criteria 410 related to the market intelligence information a user seeks. Filter criteria 410 can include demographics data or any other type of data as shown in interface 400 or otherwise available to filter the market intelligence data stored in the in-memory analytic data store. For example, the user may be able to filter the data by gender, age, relationship status, education level, income bracket, urbanicity, etc. A query execution engine (e.g. query execution engine 270 of FIG. 3) can receive the user input defining filter criteria 410, and execute queries (e.g. queries 124a-c of FIG. 2) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 400.

As shown in FIG. 5, the user interface 400 specifies the demographic data used to generate the dashboard output broken down into various categories 420 (e.g. as shown in charts 418a-c) and outputs ranked lists of interests 422-a-e for people that fall within the demographic profile 440 defined by the filter criteria 410. For example, the categories 420 can include what percentage of the relevant population is married, has attended college, or lives in an urban area. Other types of output and data visualization can be used. In addition, the user interface 400 can receive additional user input to refine or change the filter criteria 410 or the results sought and the user interface 400 can dynamically update in short order given the in-memory data retrieval and processing that occurs responsive to the additional user input.

Figure 6:
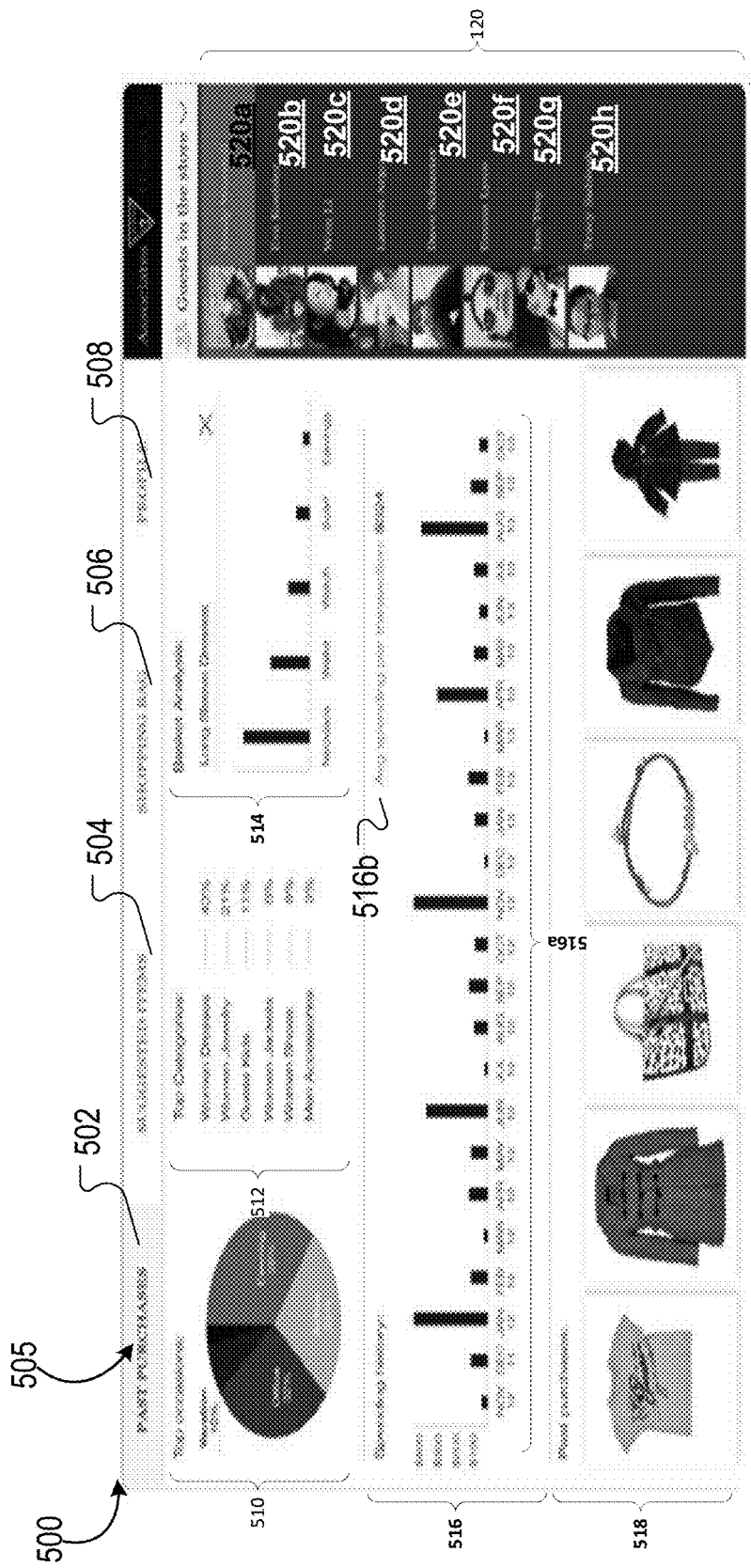

By way of example, FIG. 6 shows a user interface 500 of an intelligence dashboard also powered by an analytical in-memory data store (e.g., in-memory analytic data store 112 of FIG. 2). Interface 500 displays a customer report 505 to, e.g., a sales associate in a retail store. In an example, the sales associate can view the customer report 505 on a store computer.

In some examples, graphical user interface 500 includes customer portion 520 that displays information indicative of customers who are, e.g. in a particular geographic location (say, the retail store). Customer portion 520 displays customer information 520a-520h, with each item of customer information 520a-520h representing a customer. A user can select customer information 520a-520h by, for example, using a mouse to click on, or using a touch screen display to touch, a desired item of customer information 520a-520h. When an item of customer information 520a-520h is selected, interface 500 displays information pertaining to the selected customer. In the interface 500 of FIG. 6, a viewer of graphical user interface 500, e.g., the sales associate, has opted to view information associated with the customer represented by customer information 520a.

A query execution engine (e.g. query execution engine 270 of FIG. 3) can receive the user input, e.g., selection of customer information 520a-520h, and execute queries (e.g. queries 124a-c of FIG. 2) to access the market intelligence data stored in an in-memory analytic data store. In some examples, the query execution engine can receive the accessed data (e.g. data from the in-memory analytic data that complies with the filter criteria 410), perform analytics on the accessed data, and output the results of the analytics to user interface 500.

As shown, interface 500 includes past purchases link 502, selection of which causes interface 500 to display information indicative of past purchases of the customer that is selected via customer portion 520. Interface 500 also includes suggested items link, selection of which causes interface 500 to display suggestions information 504 indicative of suggested items that a particular customer (e.g., the customer selected from customer portion 520) may be interested in and want to purchase. Suggestions information 504 can based on analyzing data that is retrieved from an in-memory analytic data store. For example, suggestions information 504 can be based on customers' past purchases. Interface 500 includes shopping bag link 506, selection of which causes graphical user interface 500 to display items that a particular customer wishes to purchase. Interface 500 includes profile link 508, selection of which causes interface 500 to be updated to display a customer profile of a particular customer (e.g., the customer selected via currently present customer portion 520).

Interface 500 includes top occasions portion 510 that displays information (e.g., a graph) indicative of the top occasions for which a particular customer (e.g., customer 520a) has purchased merchandise. Information for top occasions portion 510 can be generated based on analytics performed on market intelligence data contained in an in-memory data store. In this example, top occasions portion 510 is generated by tracking past purchases of the customer and then categorizing the types of purchase (e.g., based on various occasions). In another example, top occasions portion 510 displays information indicative of the top occasions for a group of customers, e.g., rather than displaying the top occasions for a particular customer.

Interface 500 also displays top categories information 512, e.g., information specifying top categories of goods that have been purchased by a particular customer and/or by a group of customers at a retail store. Information for top categories portion 510 can be generated based on analytics performed on market intelligence data pertaining to the particular customer and/or the group of customers contained in an in-memory data store. In some implementations, interface 500 can include basket analysis portion 514—for display of information indicative of types of goods that are currently in an electronic shopping cart of a customer.

Graphical user interface 500 also includes spending history portion 516 to display information indicative of how much money a particular customer (e.g., the customer selected in portion 520) has spent with the retailer over a period of time. Information for spending history portion 516 can be generated based on analytics performed on market intelligence data pertaining to the particular customer contained in an in-memory data store. Spending history portion 516 can include a timeline 516a, e.g., a representation of the period of time over which spending is tracked. Spending history portion 516 also includes information 516b that specifies an average amount of money a particular customer has spent with the retailer over a period of time. Interface 500 also includes portion 518 for display of information indicative of past purchases and/or transactions of a particular customer.

Figure 7:
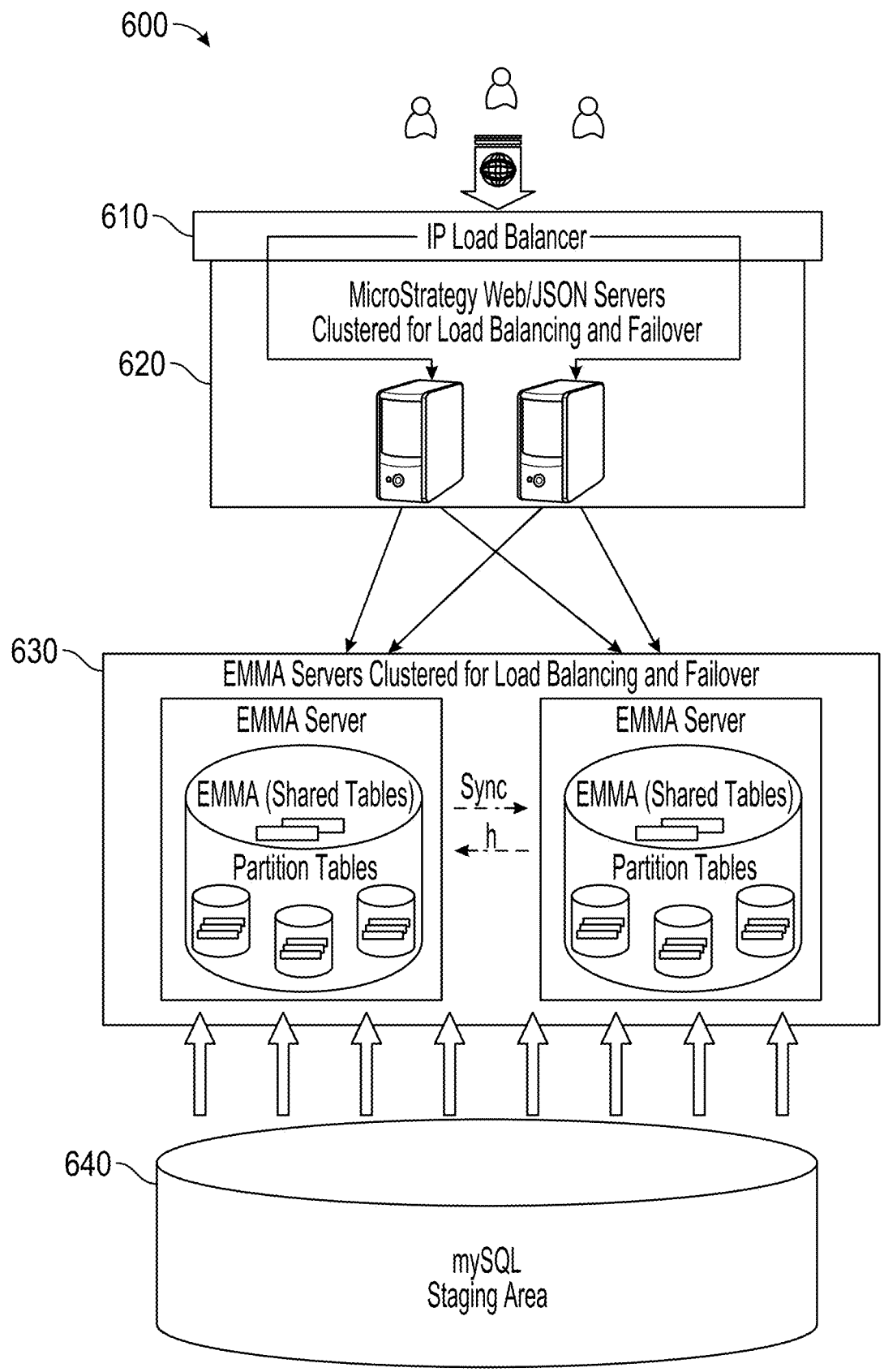
FIGS. 7 and 8 are block diagrams illustrating example topologies for applications leveraging an in-memory, distributed, analytic data store.
Figure 8:
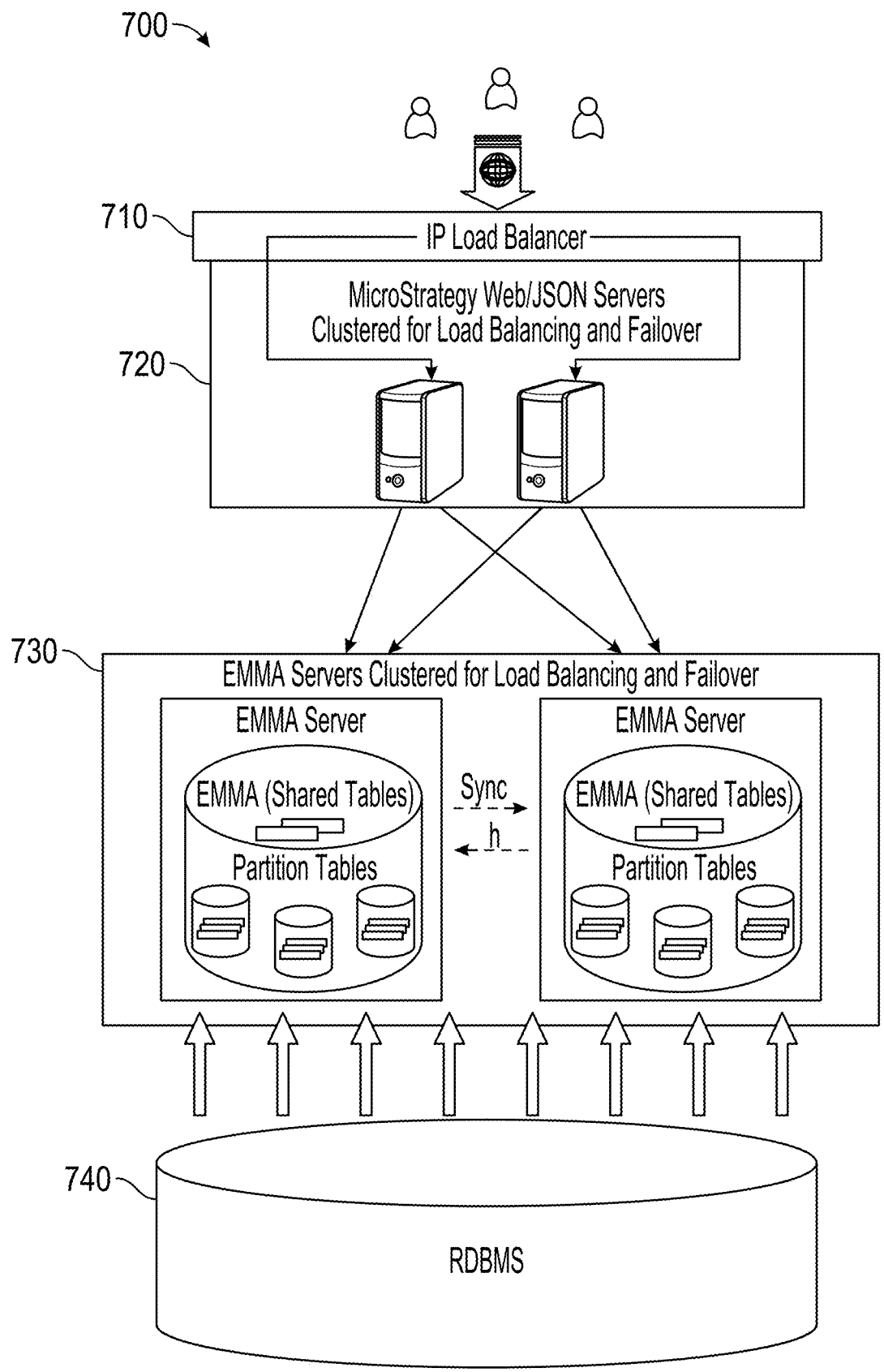

FIGS. 7 and 8 illustrate example topologies for applications leveraging an in-memory, distributed, analytic data store. In FIG. 7, an example topology 600 includes an Internet Protocol (IP) load balancer 610, multiple web server nodes 620, multiple in-memory analytic data store nodes 630, and a data staging area 640. The IP load balancer 610 receives user requests over the Internet and balances the user requests across the web server nodes 620. The web server nodes 620 process the user requests and access data needed to serve the user requests from the multiple in-memory analytic data store nodes 630. Each web server node can use the operating system RHEL 6.2, can have a 12 core Intel Xeon @ 2.24 GHz central processing unit, and can have 32 GB of RAM.

The multiple in-memory analytic data store nodes 630 store data in a partitioned manner and perform parallel processing of the partitioned data. The multiple in-memory analytic data store nodes 630 are clustered for load balancing and failover and serve queries/requests from the web server nodes 620. The multiple in-memory analytic data store nodes 630 communicate with one another to perform synchronization of changes made to the dataset. Each in-memory analytic data store node can use the operating system RHEL 6.2, can have a 32 core Intel Xeon @ 2.24

GHz central processing unit, and can have 1 TB of RAM. The full dataset can be replicated on each server.

The data staging area 640 accesses data to be loaded into the in-memory analytic data store nodes 630. The data staging area 640 stages the data in a manner that enables parallel loading of the data into the in-memory analytic data store nodes 630.

In FIG. 8, an example topology 700 includes an IP load balancer 510, multiple web server nodes 720, multiple in-memory analytic data store nodes 730, and a relational database management system (RDBMS) 740. The IP load balancer 710 receives user requests over the Internet and balances the user requests across the web server nodes 720. The web server nodes 720 process the user requests and access data needed to serve the user requests from the multiple in-memory analytic data store nodes 730. Each web server node can use the operating system Windows Server 2003 Enterprise x64 Edition (SP2), can have a Quad Core Intel Xeon L5520 @ 2.27 GHz central processing unit, and can have 6 GB of RAM.

The multiple in-memory analytic data store nodes 730 store data in a partitioned manner and perform parallel processing of the partitioned data. The multiple in-memory analytic data store nodes 730 are clustered for load balancing and failover and serve queries/requests from the web server nodes 720. The multiple in-memory analytic data store nodes 730 communicate with one another to perform synchronization of changes made to the dataset. Each in-memory analytic data store node can be a model Sun Fire X4800 M2 server, can use the operating system RHEL 6.1, can have an 80 core Intel Xeon @ 2.40 GHz with hyper threading central processing unit, and can have 1 TB of RAM. The full dataset can be replicated on each server.

The RDBMS 740 stores data to be loaded into the in-memory analytic data store nodes 730. In some implementations, the RDBMS 740 loads data into the in-memory analytic data store nodes 730 in parallel.

Figure 9:
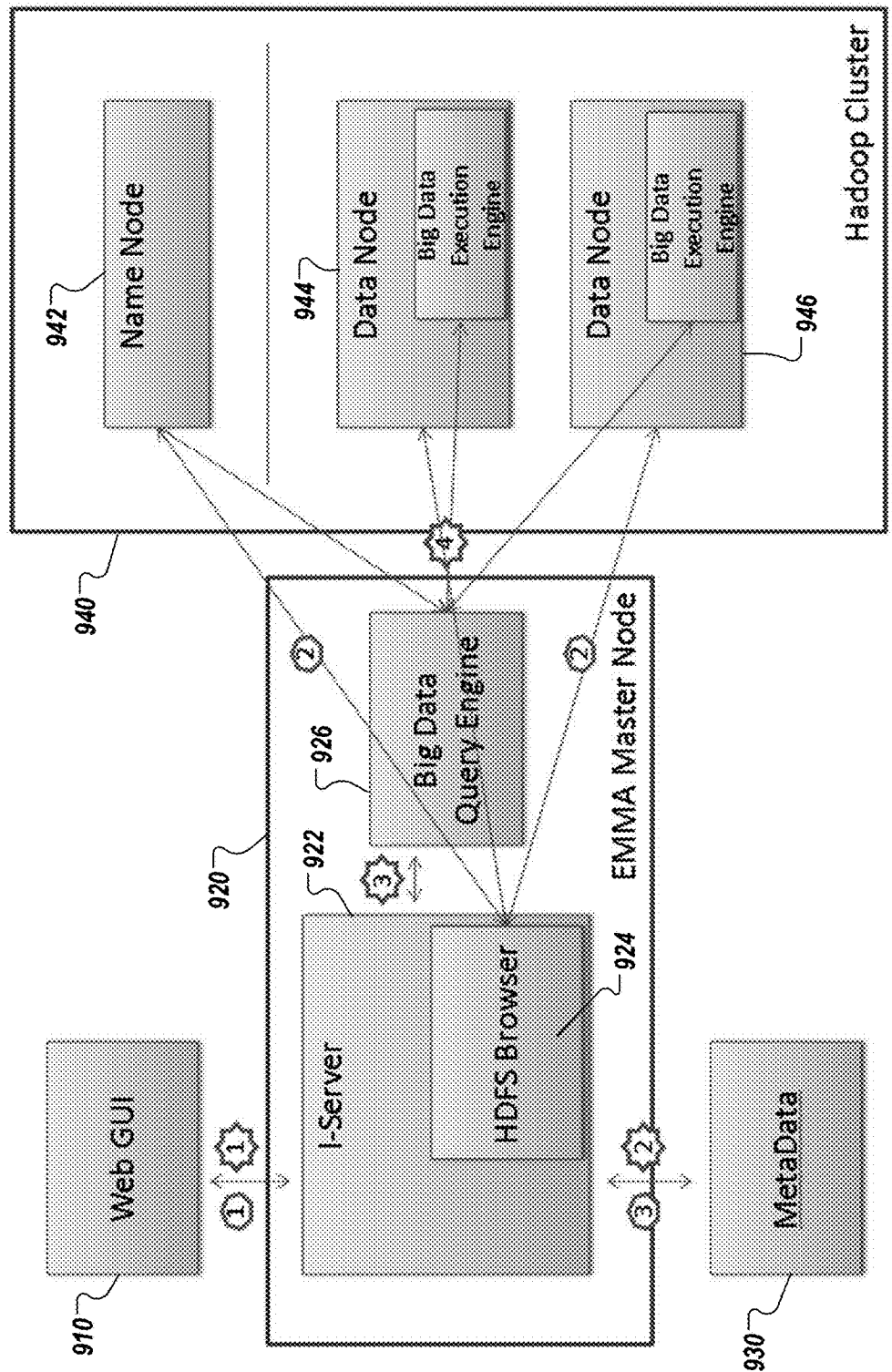
FIG. 9 is a block diagram illustrating an example user/execution workflow.

FIG. 9 illustrates an example user/execution workflow. In the example user/execution workflow, a web graphical user interface (GUI) 910 receives user input related to data analysis and presentation requests and communicates with an in-memory master node 920 to receive the data needed to provide output for the analysis and presentation requests. The in-memory master node 920 includes a server 922 with an HDFS browser 924 and a data query engine 926. The server 922 communicates with a metadata storage unit 930 to receive metadata related to the data analysis and presentation requests. The received metadata may be needed to service the requests itself or may be retrieved to enable the server 922 to determine the best way to service the requests. The server 922 determines whether analytics needed to service the analysis and presentation requests needs to be performed by the data query engine 926 and communicates the determinations to the data query engine 926. The server 922 also uses the HDFS browser 924 to arrange a connection with a data storage system 940. The data storage system 940 includes a name node 942 and multiple, data nodes 944 and 946. The name node 942 is the centerpiece of an HDFS file system by keeping the directory tree of all files in the file system and tracking where across the cluster the file data is kept. The data nodes 944 and 946 store the data on the data storage system 940 and each include a data execution engine that is capable of performing analytics on the stored data. Although two data nodes 944 and 946 are shown for brevity, more (perhaps, many more) data nodes may be included in the data storage system 940.

The HDFS browser 924 communicates with the name node 942 and the data nodes 944 and 946 to retrieve data needed to service the data analysis and presentation requests. The data query engine 926 also communicates with the name node 942 and the data execution engines on the data nodes 944 and 946 to perform the queries and necessary analytics on the data needed to service the data analysis and presentation requests. For analytics that the data execution engines are able to perform, the data query engine 926 requests that the analytics be performed prior to the data being sent. For analytics that the data execution engines are unable to perform, the data query engine 926 requests raw data and performs the analytics on the raw data. The server 922 receives the analyzed data needed to service the data analysis and presentation requests from the HDFS browser 924 and/or the data query engine 926 and provides the data to the web GUI 910 for output. By causing performance of at least a portion of the analytics at the data storage system 940, data retrieval and analytics may have increased speed given that all of the raw data does not need to be communicated to the data query engine 926.

Figure 10:
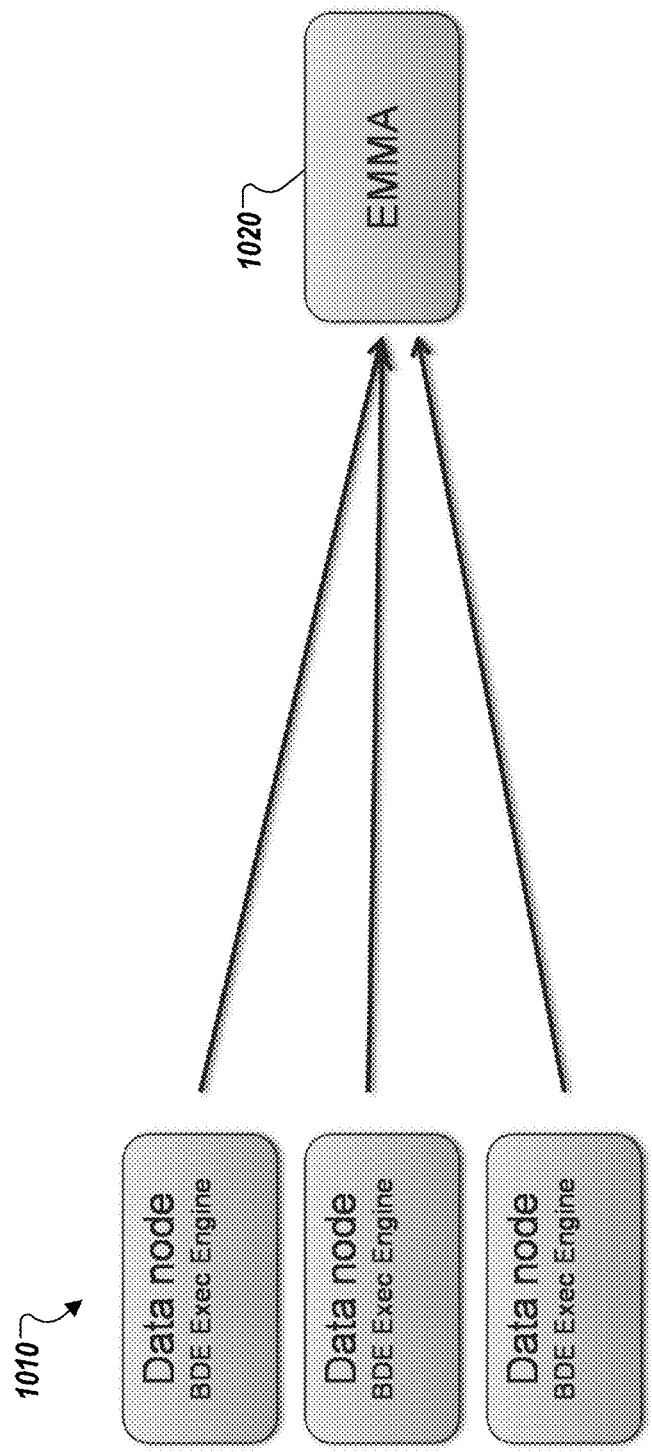
FIG. 10 is a block diagram illustrating example data flow in data fetching.

FIG. 10 illustrates example data flow in data fetching. As shown, data nodes 1010 access data on a big data engine and perform analytics using an execution engine. After performing the analytics, the data nodes 1010 send the results of the analytics to an in-memory data store 1020 for storage. The in-memory data store 1020 caches the analyzed data and can service queries on the analyzed data, as well as perform additional analytics on the analyzed data. Using these techniques for data fetching may enable fetching of data from a bid data engine (e.g., HDFS) at a speed of 20-30 MB/s on ten nodes.

A big data storage and processing platform may include a Hadoop big data system. Business intelligence products may be natively integrated with a Hadoop system. These technologies may combine the high performance of in-memory technology with the massive storage capability of the Hadoop system.

In implementations that integrate in-memory technology with a big data system, raw data in the big data system, such as Hadoop, needs to be discovered, cleaned, filtered, aggregated, and loaded into the in-memory database before conducting the in-memory analysis. In these implementations, the big data engine may conduct at least some of these operations on the raw data in an efficient way.

In some examples, a user interface for users to browse the raw data may be stored in a big data system. Through the user interface, including, for example, the user interfaces described below, users may define different data transformation rules to clean the data and perform data wrangling operation. Also, through the same user interface, users may pick the relevant columns from the relevant tables, apply filtering conditions, and define the aggregation and other functions to define the final tables (e.g., OLAP tables) for the data analysis. The in-memory system may provide the engine to automatically generate and execute queries to conduct the transformation in a distributed way.

In addition to the data importing (to the in-memory system) functionality, the big data engine also may support direct data access where the in-memory server may issue an SQL query to the big data engine directly. The query may be limited to a single table only or may span multiple tables.

Figure 11:
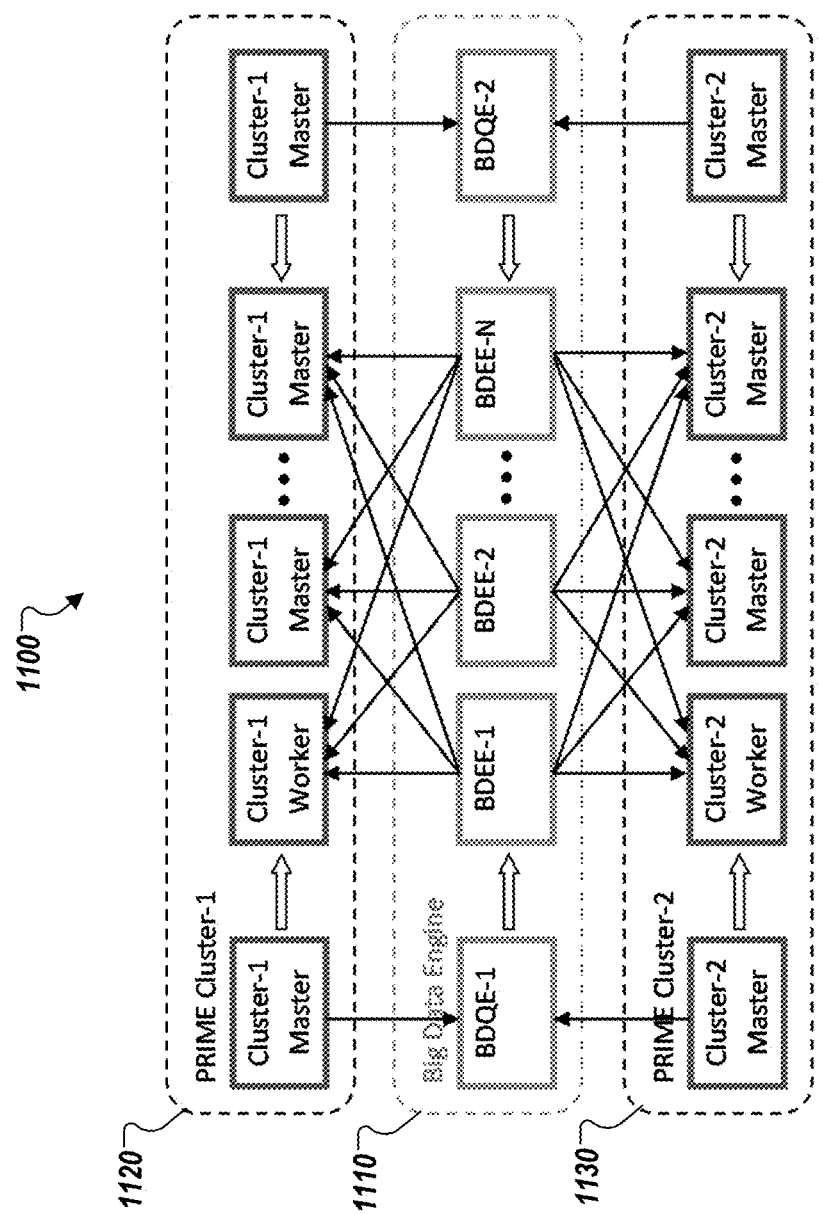
FIG. 11 is a block diagram illustrating an example big data engine architecture.

FIG. 11 illustrates an example big data engine architecture 1100. The Big Data Engine 1110 is composed of one Big Data Query Engine (BDQE) paired with multiple (e.g., many) Big Data Execution Engines (BDEE). As shown, Big Data Engine 1110 may include multiple instance of a single BDQE paired with multiple BDEEs.

One BDQE is paired with one in-memory (e.g., PRIME) master server. It receives Big Data Requests from the in-memory (e.g., PRIME) master node. The main function of BDQE is twofold. First, it is responsible to compile and generate an optimized query tree. Secondly, it plays the role of the coordinator of all BDEEs. It dispatches the query tasks to all the execution engines so that loads are balanced and data are processed locally on each big data (e.g., Hadoop) data node. BDQE is a standalone server process that may be sitting on any machine. It could coexist with the in-memory (e.g., PRIME) master server; sit on a big data (e.g., Hadoop) node or any machine outside a Hadoop cluster.

BDEEs are deployed on the big data (e.g., Hadoop) data nodes with one BDEE process sitting on each big data (e.g., Hadoop) data node. The role of the execution engines is to execute the query task they receive from the query engine. The execution results are streamed to the in-memory (e.g., PRIME) slave nodes. The BDEEs also update the BDQE with heartbeats and execution status. As shown, the Big Data Engine 1110 may interact with multiple in-memory clusters 1120 and 1130 simultaneously.

Figure 12:
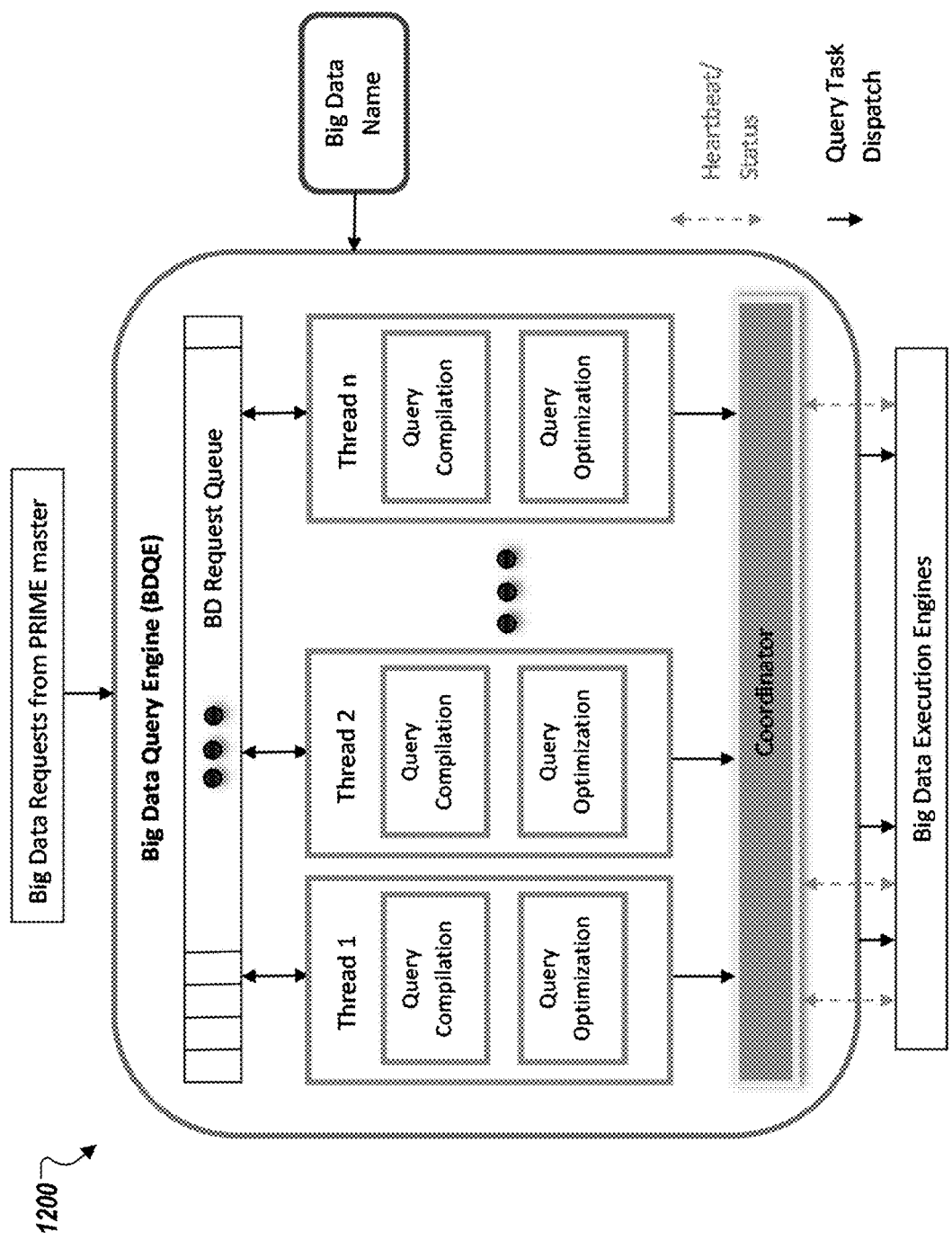
FIG. 12 is a block diagram illustrating an example big data query engine.

FIG. 12 illustrates an example big data query engine 1200. In this example, BDQE is a standalone server process. The in-memory (e.g., PRIME) master connects to BDQE through a DB Role that is configured with the IP address of the BDQE machine and a port. Big Data Requests are structured SQL statements. The request is packed into ProtoBuf binary format and sent to BDQE through the connection. The BDQE may support two types of Big Data queries: Data Import (DI) and Direct Data Access (DDA). Both types may carry filter and aggregation to limit the data being imported and processed. Queries are queued inside BDQE. A thread pool picks up queries to process from the queue.

For each Big Data Request, the BDQE thread compiles the request into a query tree. The query tree is further optimized to obtain optimal performance. Each query tree is a sequence of processing steps that the execution engine takes and executes. It starts with a "load" query where the system reads the raw big data (e.g., Hadoop) data. It ends with a "store" step where the system streams the data to the in-memory (e.g., PRIME) slave nodes.

A query tree tells the BDEE what to do with the data and in what order since data is distributed in a big data (e.g., Hadoop) cluster. Another major job the BDQE performs is to dispatch splits (the block of data distributed on the big data (e.g., Hadoop) data nodes). By default each data block is replicated three times. Accordingly, the same block could be found on three different nodes. BDQE's find the one to dispatch so that overall the load is balanced. The BDQE is configured to be aware of the location of the big data (e.g., Hadoop) name node. With each Big Data Request, the BDQE obtains the data splits from the big data (e.g., Hadoop) name node. The BDQE relies on the coordinator to find the best data node to dispatch these splits.

The coordinator inside each BDQE receives heartbeats and task process status on a regular basis. That gives BDQE the information about the health and load of each BDEE. The query dispatch is based on this information.

Figure 13:
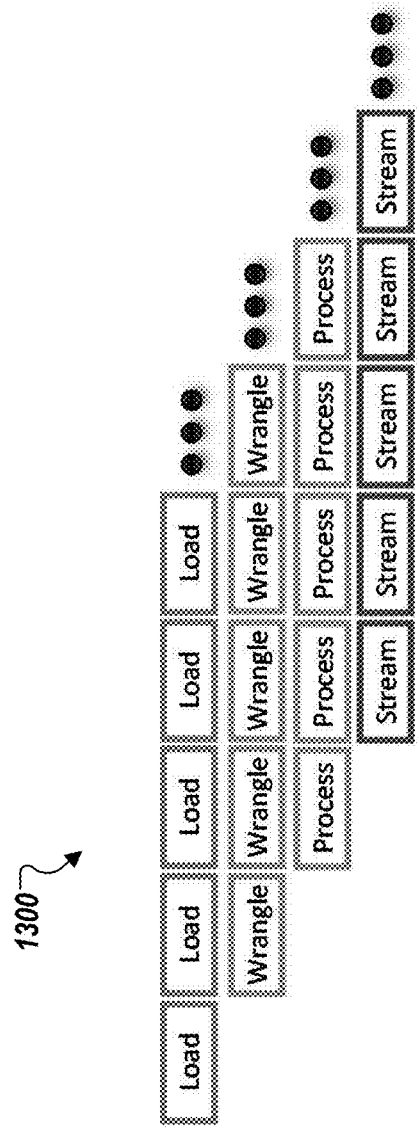
FIG. 13 is a block diagram illustrating an example pipelined execution engine architecture.

FIG. 13 illustrates an example pipelined execution engine architecture 1300. The Big Data Execution Engine (BDEE) is another server process deployed on each big data (e.g., Hadoop) data node. It receives the query and a data split from the BDQE. The query and the split combined are called a sub task. BDEE employs a pipelined architecture 1300.

Four processing stations may be responsible for the following four data operations: Data Loading, Data Wrangling, Data Process and Data Streaming. The output of one processing station is the input of another. By separating I/O related processing steps into separate processing stations, I/O intensive work and data crunching tasks are in separated threads. In this regard, the CPU resource is better utilized.

Each Processing Station has its own subtask queue. Each also contains a pool of threads that pick subtasks from the queue. The output from a Processing Station is entered into the subtask queue of the subsequent Processing Station.

The output of the BDEEs is streamed to the in-memory (e.g., PRIME) slave nodes through a Data Transmitter. The transmitter client is responsible to perform the data partition. The partition logic is passed from the in-memory (e.g., PRIME) master and carried with the query to the BDEEs. The transmitter client maintains one bucket for each partition. When the result is received from BDEE row by row, the data is put into the corresponding bucket based on the partition rules. When a bucket is full the bucket is transmitted to the in-memory (e.g., PRIME) corresponding slave node.

Another role the data transmitter plays is to support streaming aggregation. To support aggregation when data is distributed, the transmitter performs aggregations in two steps. At the first step, the BDEE calculates the aggregations on each data node. Note that the local aggregation result still needs to be aggregated one more time at the global level. The second (global) aggregation is conducted by the transmitter. For instance, the second (global) aggregation is conducted at the receiver end of the transmitter. The aggregation group-by key is the same as the partition key. As a result, each partition naturally contains all the partially aggregated data within each group-by group. The receiver performs the final aggregation. Not all aggregations can be done in this fashion. Sum, Count, Max and Min fall in this category. Average is a typical example where the calculation occurs in two separate steps (e.g., the average of the local average is not the global average). To increase the speed of average calculation, the system calculates the Sum and Count separately at each node and then calculates the global average using the calculated Sum and Count at each. This technique broadens the aggregation functions that the system supports. In addition to the data transmitting function, the transmitter also supports data partition and streaming aggregation to increase the speed of how data is processed and loaded to the in-memory system.

Figure 14:
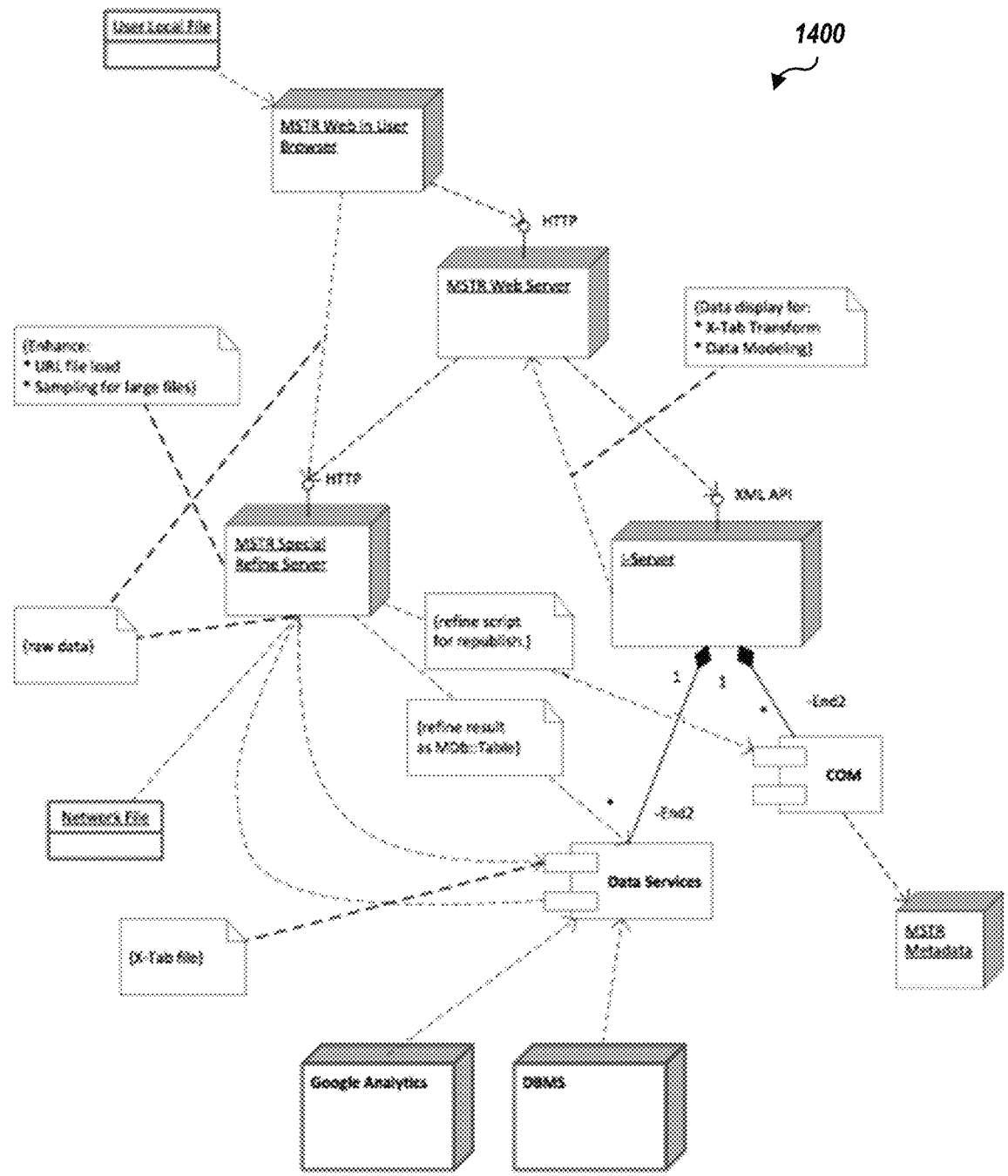
FIG. 14 is a block diagram illustrating an example architecture of a system that performs data wrangling.

FIG. 14 illustrates an example architecture 1400 of a system that performs data wrangling. The system with the architecture 1400 shown in FIG. 14 may be used to generate and display the user interfaces shown in following figures. The example architecture 1400 may be implemented in the wrangling module of the data engine layer 13 from FIG. 1. The architecture 1400 provides a user the tools for manipulating data before the system analyses the data. For example, changing abbreviations to their full versions such as changing NY to New York or formatting times and dates to a common format.

Figure 15:
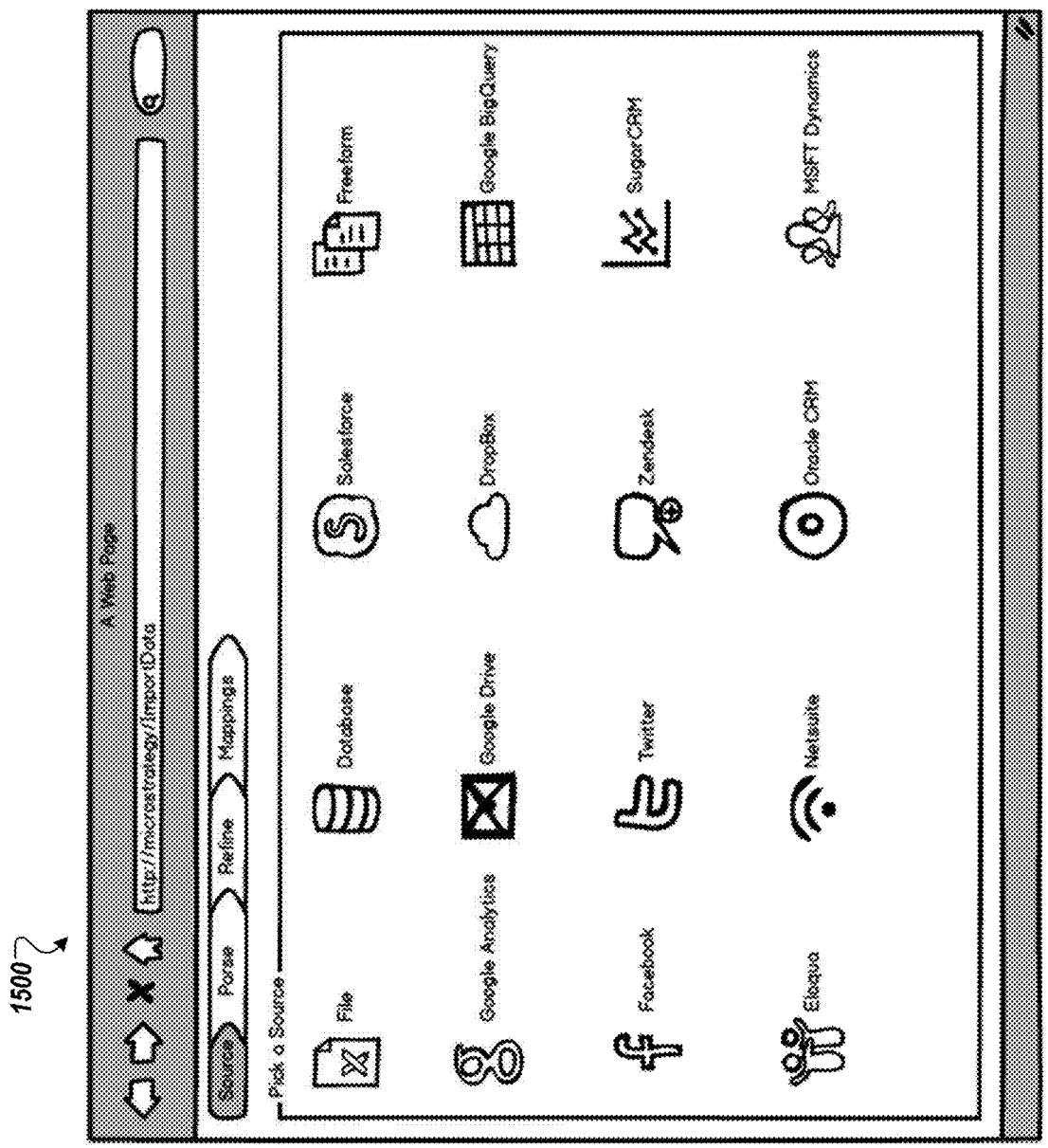

FIG. 15 illustrates an example user interface 1500 for selecting a data source. As shown, the user interface 1500 has a variety of sources a user may select to import data. In this example, the user selects to import data from a file.

Figure 16:
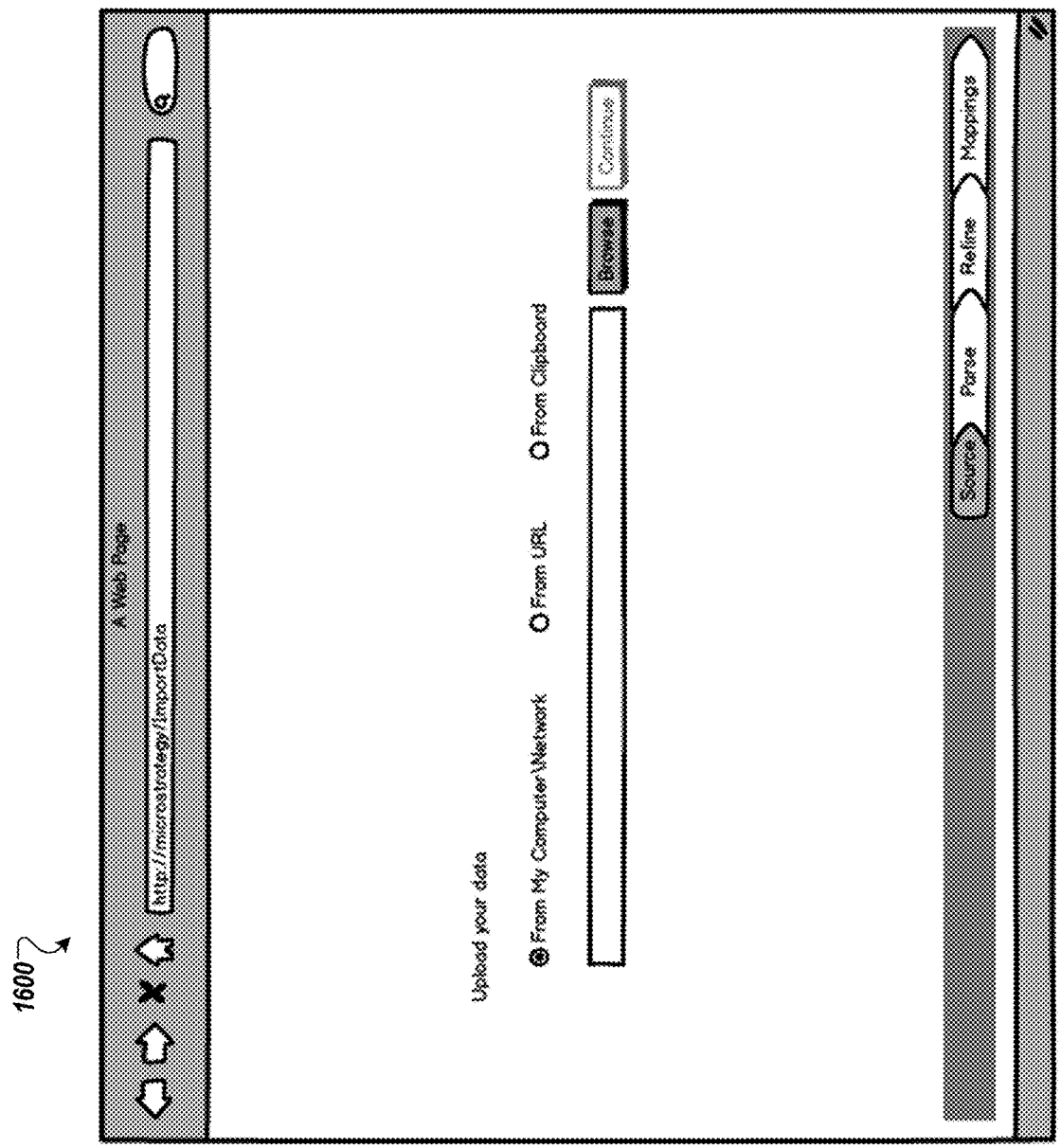

FIG. 16 illustrates an example user interface 1600 for selecting file data to import. The user interface 1600 is displayed in response to the user selecting to import data from a file in the user interface 1500. The user interface 1600 allows users to upload from a machine, a uniform resource locator (URL), or from a Clipboard. In this example, the user selects the browse control with the "From My Computer/ Network" button selected.

Figure 17:
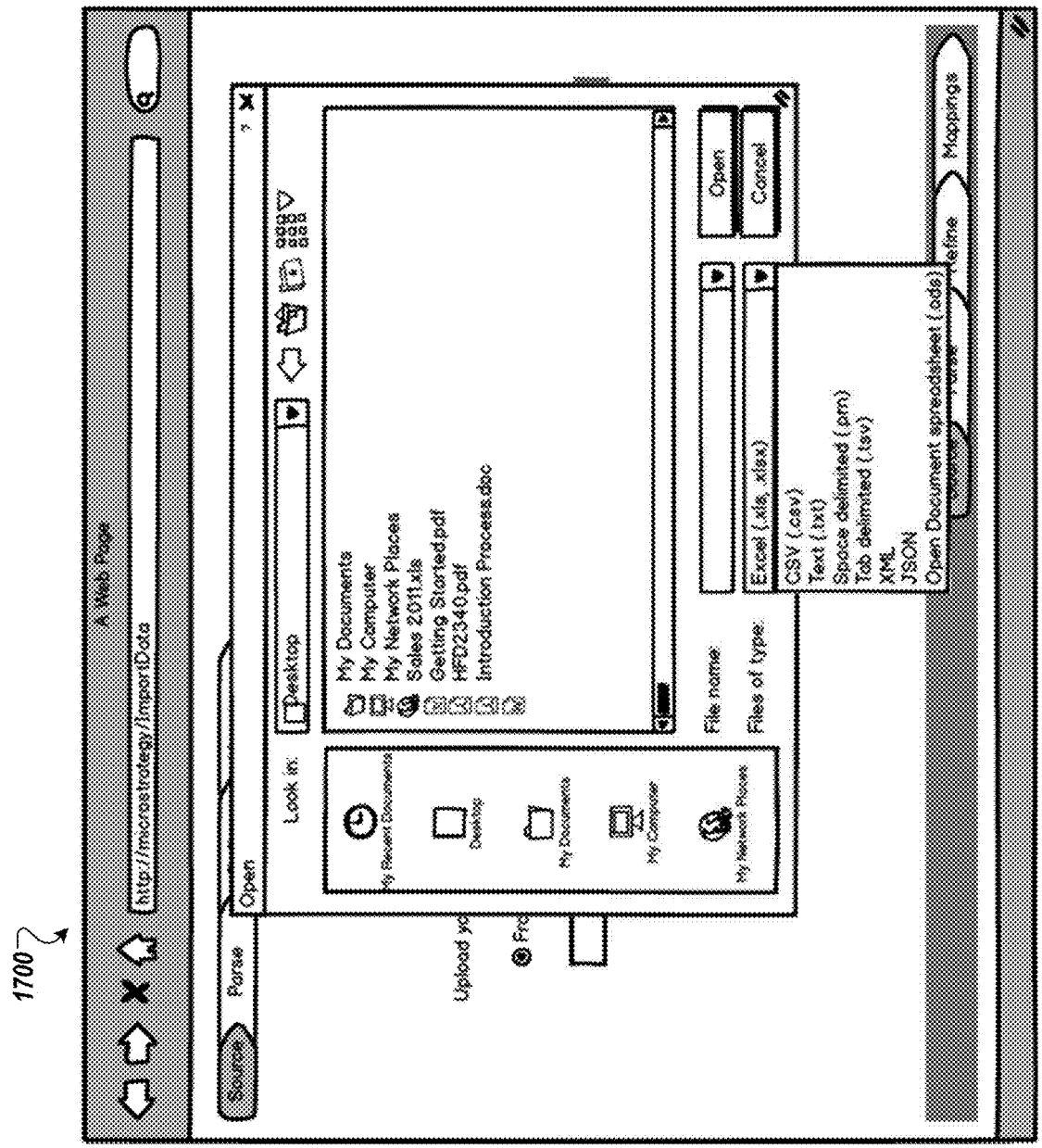

FIG. 17 illustrates an example user interface 1700 for selecting a file from a computer. The user interface 1700 is displayed in response to the user selecting the browse control with the "From My Computer/Network" button selected in the user interface 1600. The user interface 1700 allows users to select a file from a machine and the file upload options list all the File types that a data refinement source (e.g., OpenRefine) supports (e.g., Excel, CSV, text, XML, JSON, et al.).

Figure 18:
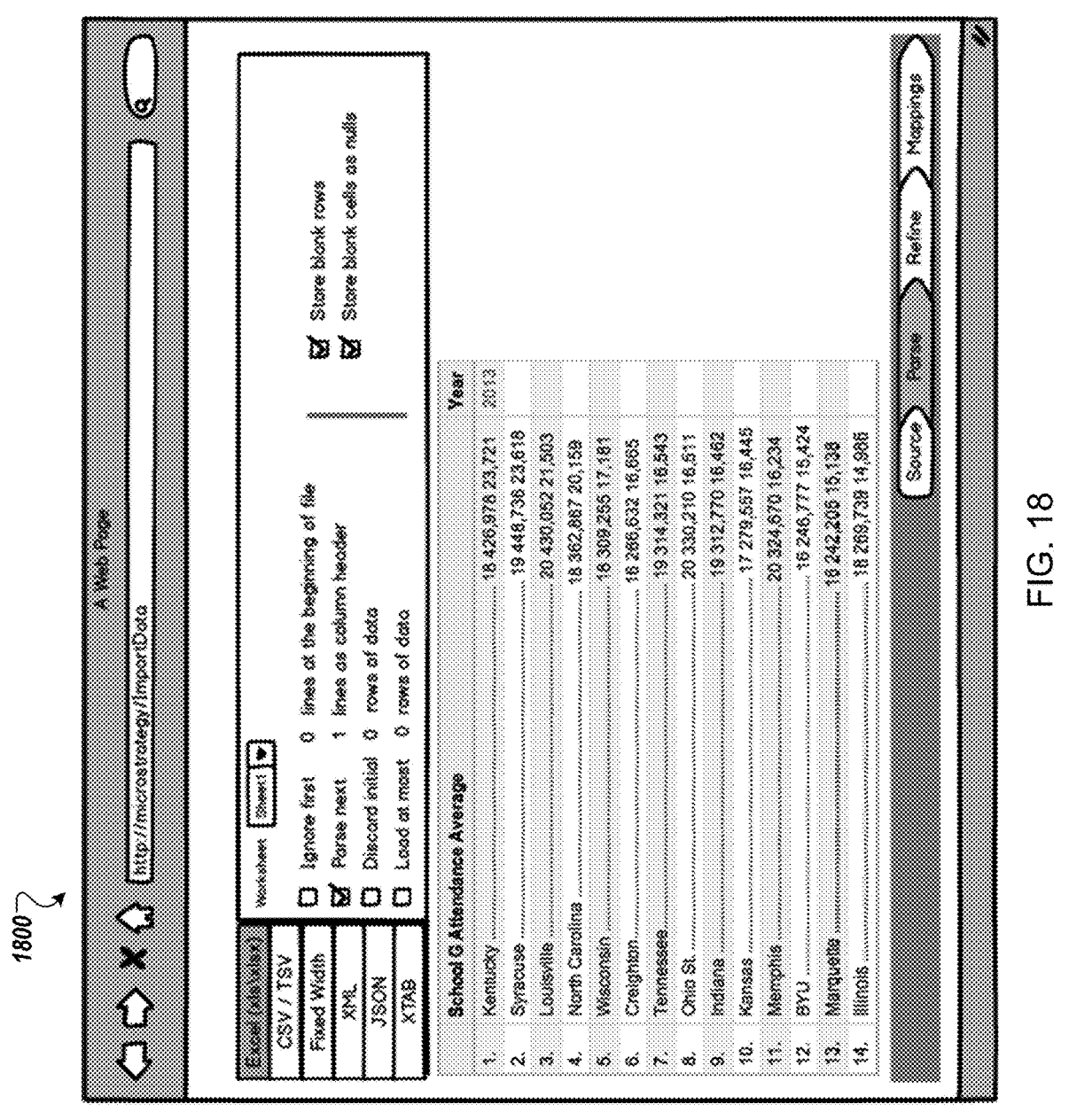

FIG. 18 illustrates an example user interface 1800 that displays data from a selected file. The user interface 1800 is displayed in response to the user selecting a file in the user interface 1700. As shown, after uploading the file, the first step is to parse the file. After parsing, a user may either click on Refine or jump to the Mappings stage. In this example, the user selects the refine control to refine the data parsed from the file.

Figure 19:
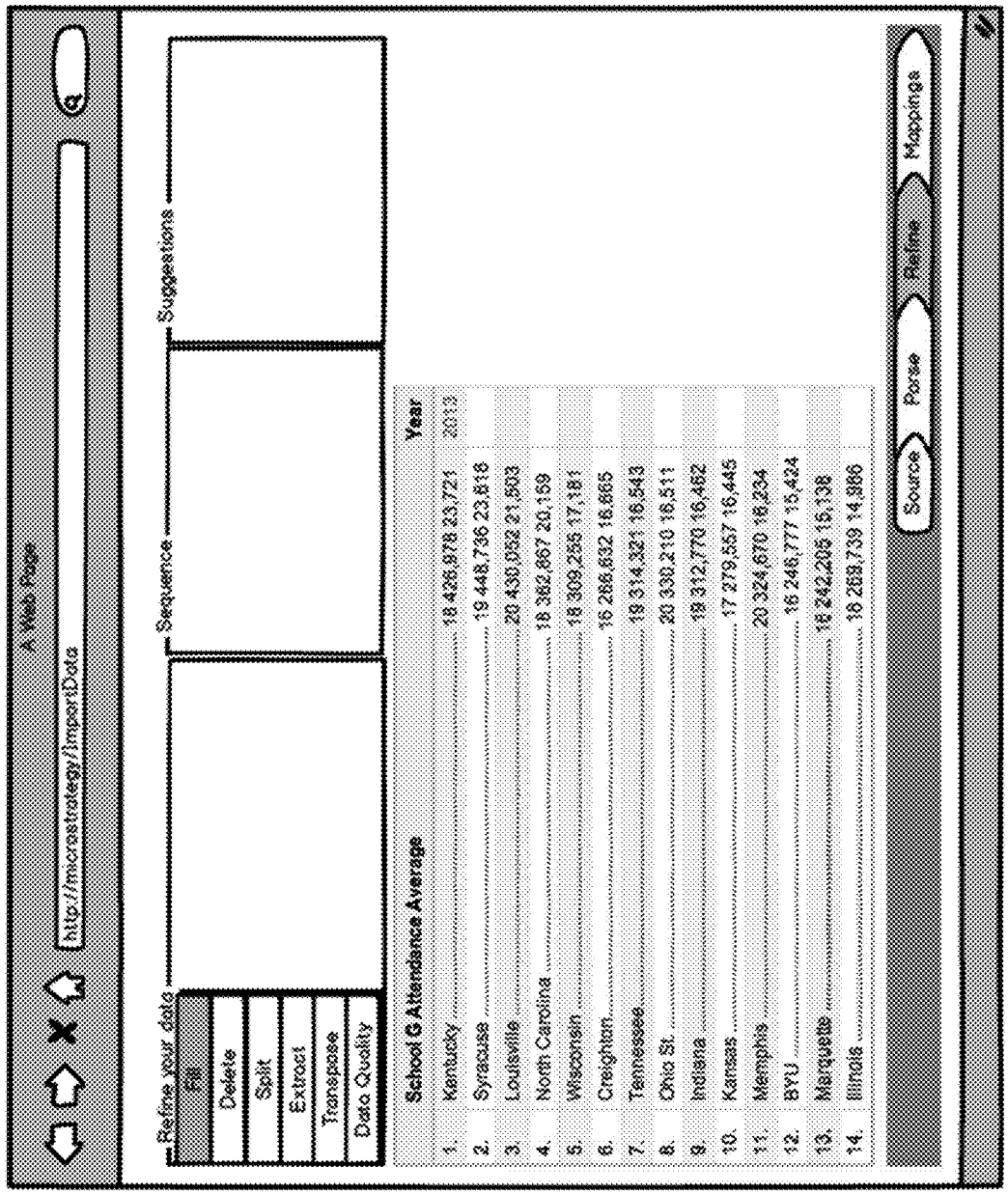

FIG. 19 illustrates an example user interface 1900 that displays a refine data interface. The user interface 1900 is displayed in response to the user selecting the refine control in the user interface 1800. As shown, the user interface 1900 has three options: List of Transformations and the corresponding UI, Sequence of Steps which is the data refinement (e.g., Open Refine) script, and Suggestions. The Suggestions is part of the intuitive UI where the system suggests to the user some of the transformation functions based on what they click in the preview of data below.

Figure 20:
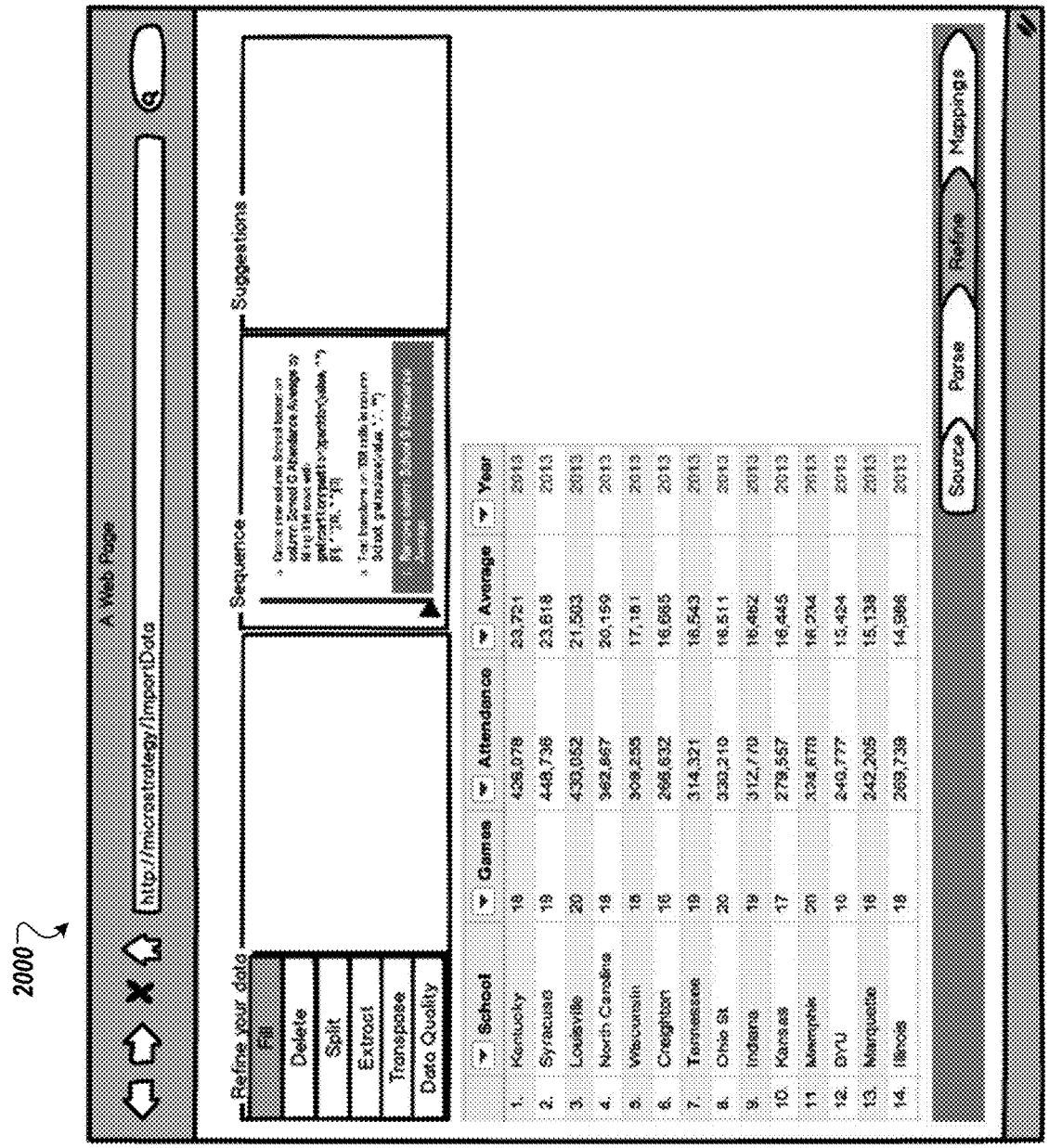

FIG. 20 illustrates an example user interface 2000 that displays a refine data interface with a sequence built. The user interface 2000 is displayed in response to the user performing some transformations in the user interface 1900. In this example, the system has received some transformations performed by the user and has built the sequence of steps shown based on the transformations. The user has the option to undo or redo the sequence steps by using the vertical slider shown. From this point, the user clicks on the mappings control.

Figure 21:
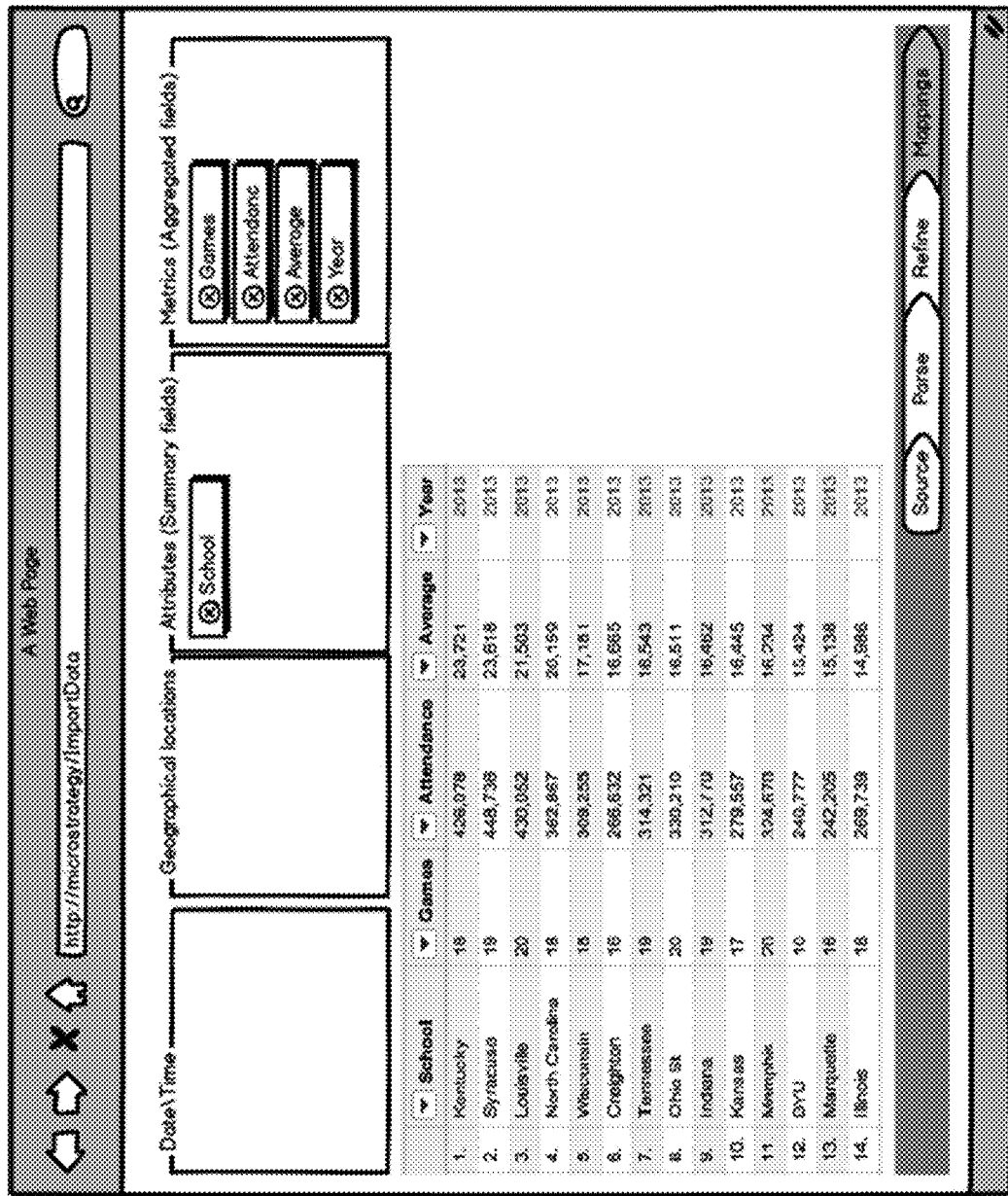

FIG. 21 illustrates an example user interface 2100 that displays a mappings interface. The user interface 2100 is displayed in response to the user selecting the mappings control in the user interface 2000. In the previous interfaces, the system was dealing with columns. In the user interface 2100, the system maps those columns to attributes and metrics. As shown, the system displays a preview of the mapping at the top of the user interface 2100. The system may display inline mapping (e.g., the first row displays the attribute versus metrics).

Figure 22:
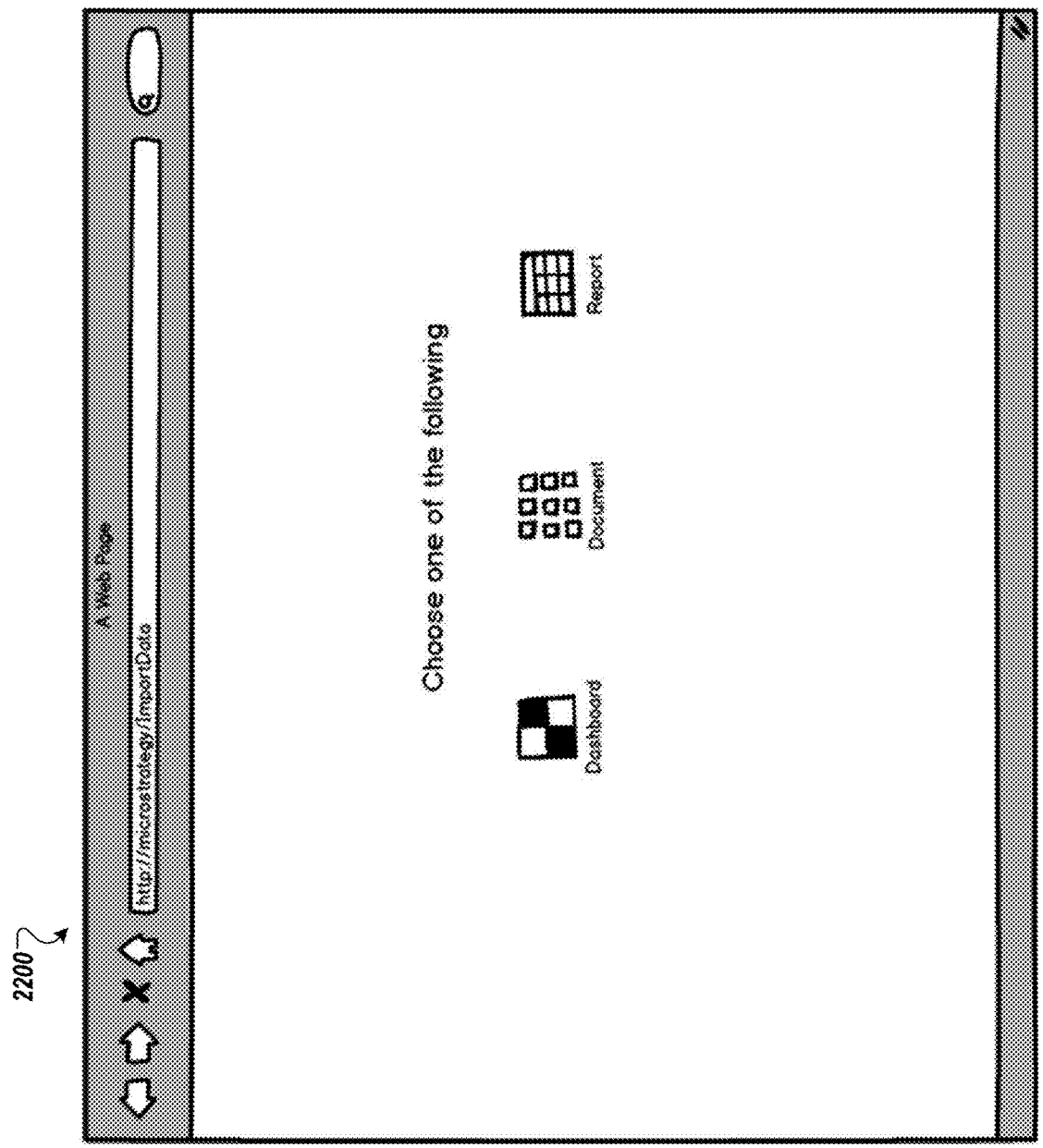

FIG. 22 illustrates an example user interface 2200 for selecting a type of data to import. As shown, the user interface 2200 enables a user to import data to and/or from a dashboard, a document, or a report. In this example, the user selects to import data from a document.

Figure 23:
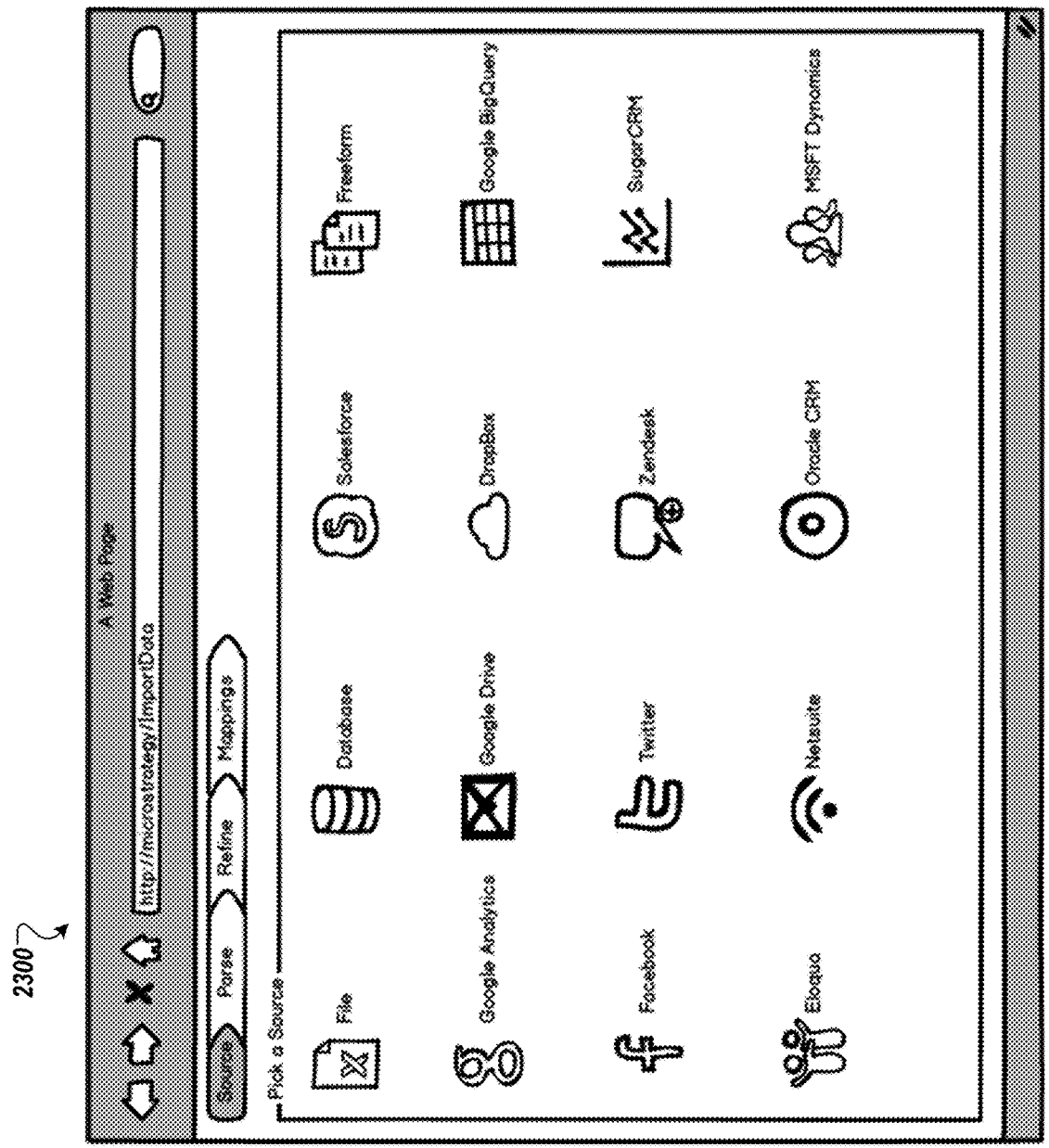

FIG. 23 illustrates an example user interface 2300 for selecting a data source. As shown, the user interface 2300 has a variety of sources a user may select to import data. In this example, the user selects to import data from a file.

Figure 24:
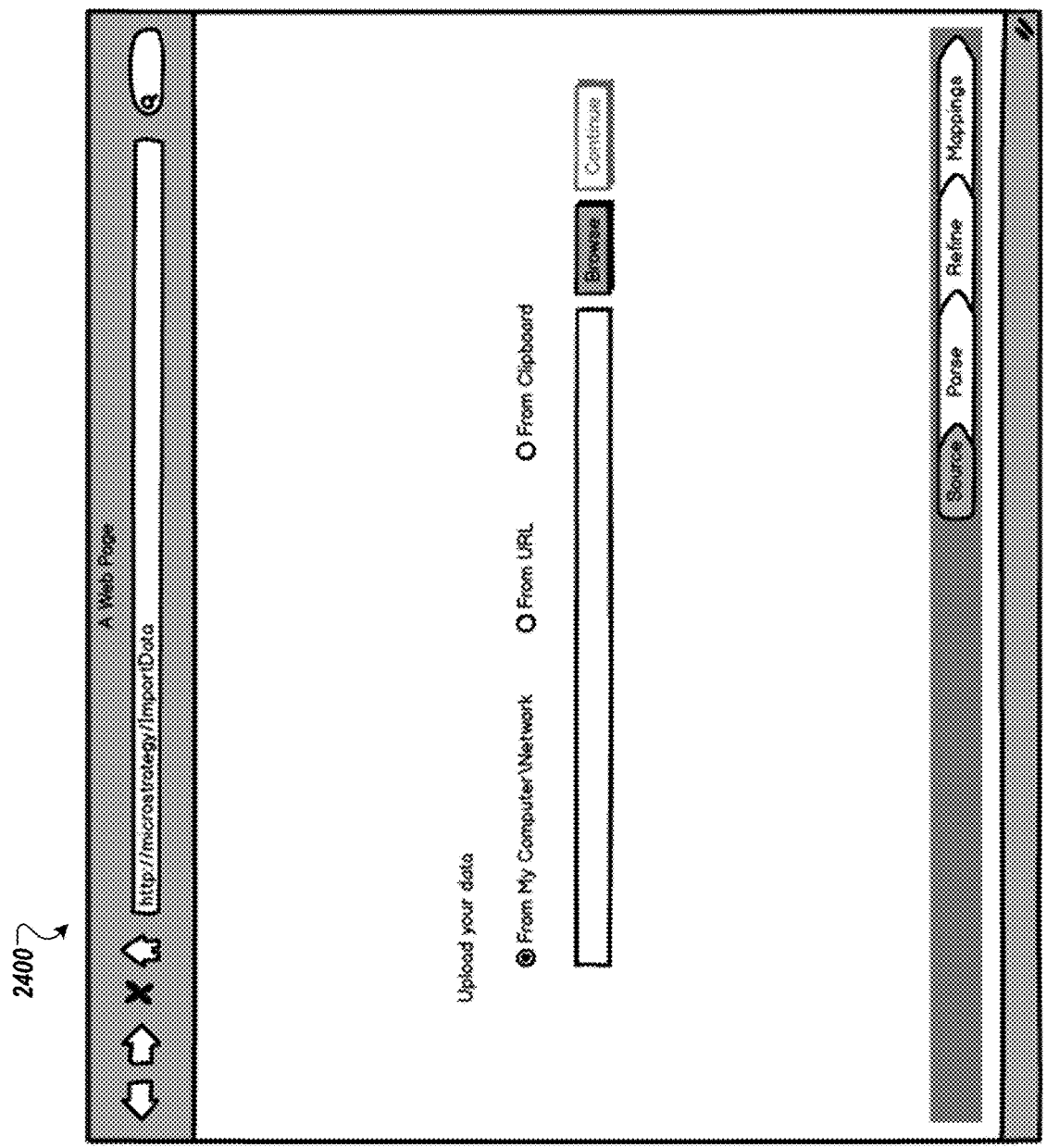

FIG. 24 illustrates an example user interface 2400 for selecting file data to import. The user interface 2400 is displayed in response to the user selecting to import data from a file in the user interface 2300. The user interface 2400 allows users to upload from a machine, a uniform resource locator (URL), or from a Clipboard. In this example, the user selects an Xtab file to import.

Figure 25:
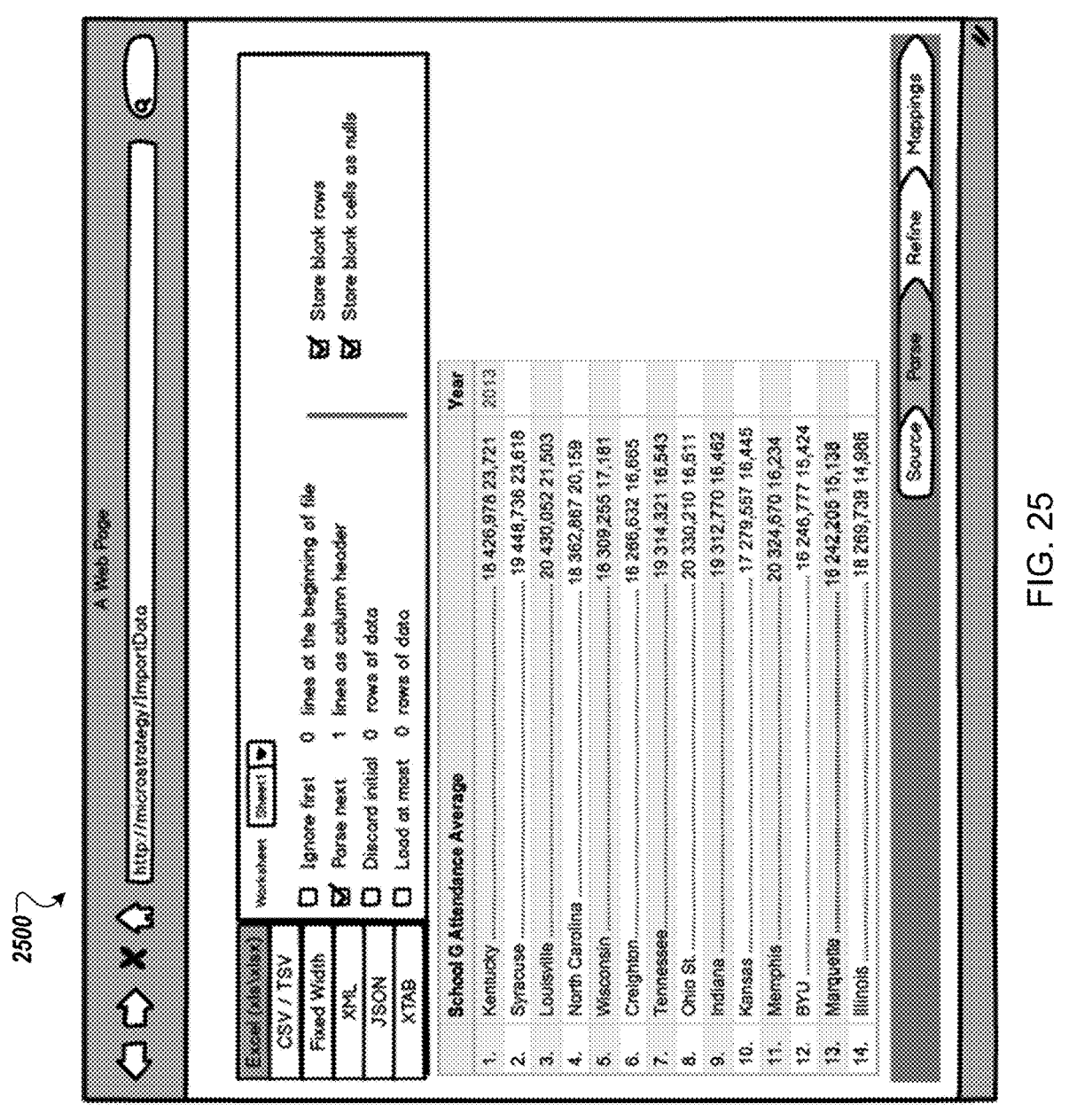

FIG. 25 illustrates an example user interface 2500 that displays data from a selected Xtab file. The user interface 2500 is displayed in response to the user selecting an Xtab file. As shown, after uploading the file, the first step is to parse the file. The user interface 2500 has an option to click on the Xtab option on the "Parse" step. Any file can be an Xtab file. In this example, the user selects the Xtab option on the "Parse" step.

Figure 26:
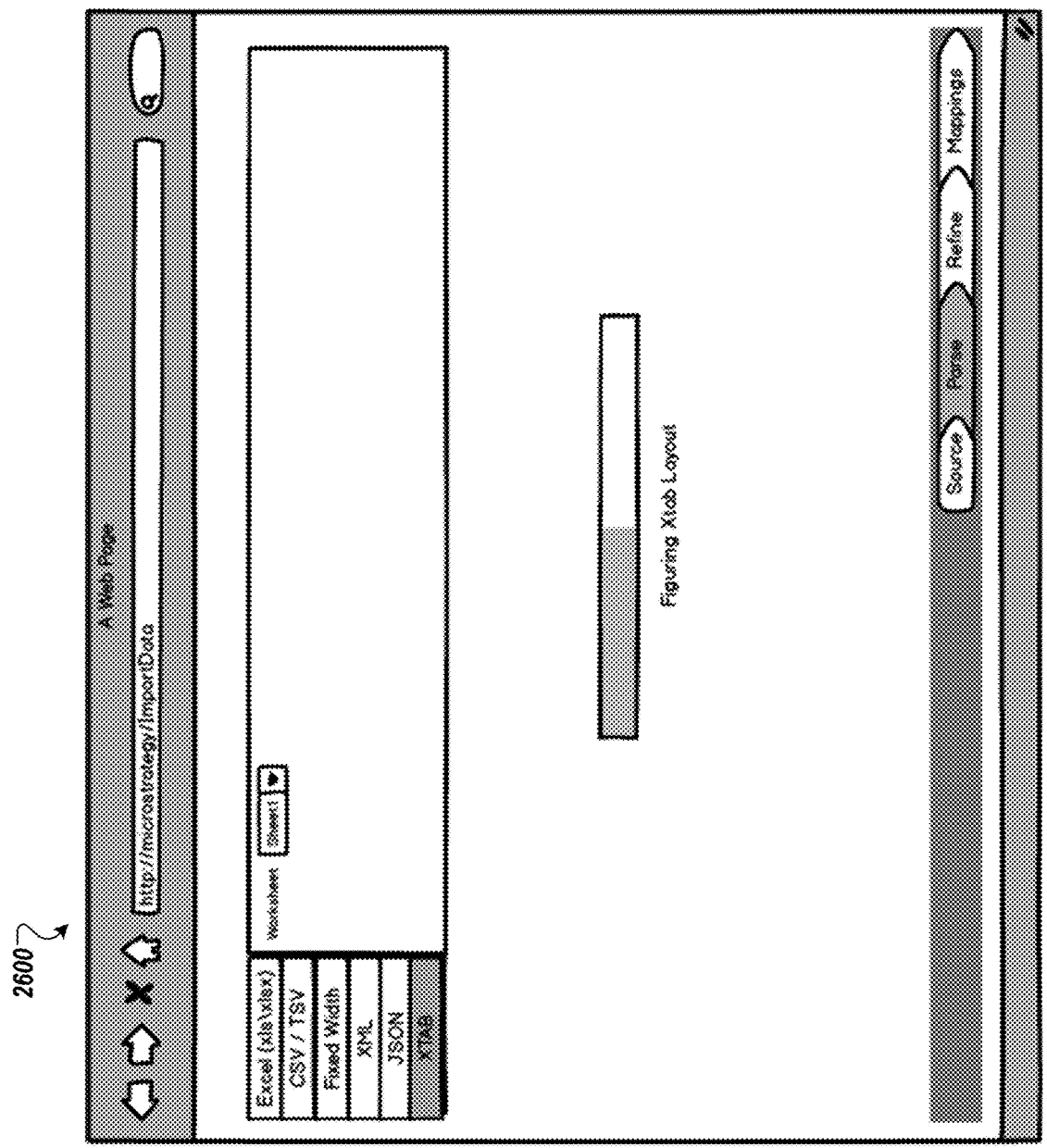

FIG. 26 illustrates an example user interface 2600 related to figuring an Xtab layout. The user interface 2600 is displayed in response to the user selecting the Xtab option in the user interface 2500. The user interface 2600 shows that the system is figuring the Xtab layout. For instance, when the user clicks on the Xtab option, the system may send the file from the data refinement (e.g., Open Refine) source to the database server (e.g., I-server).

Figure 27:
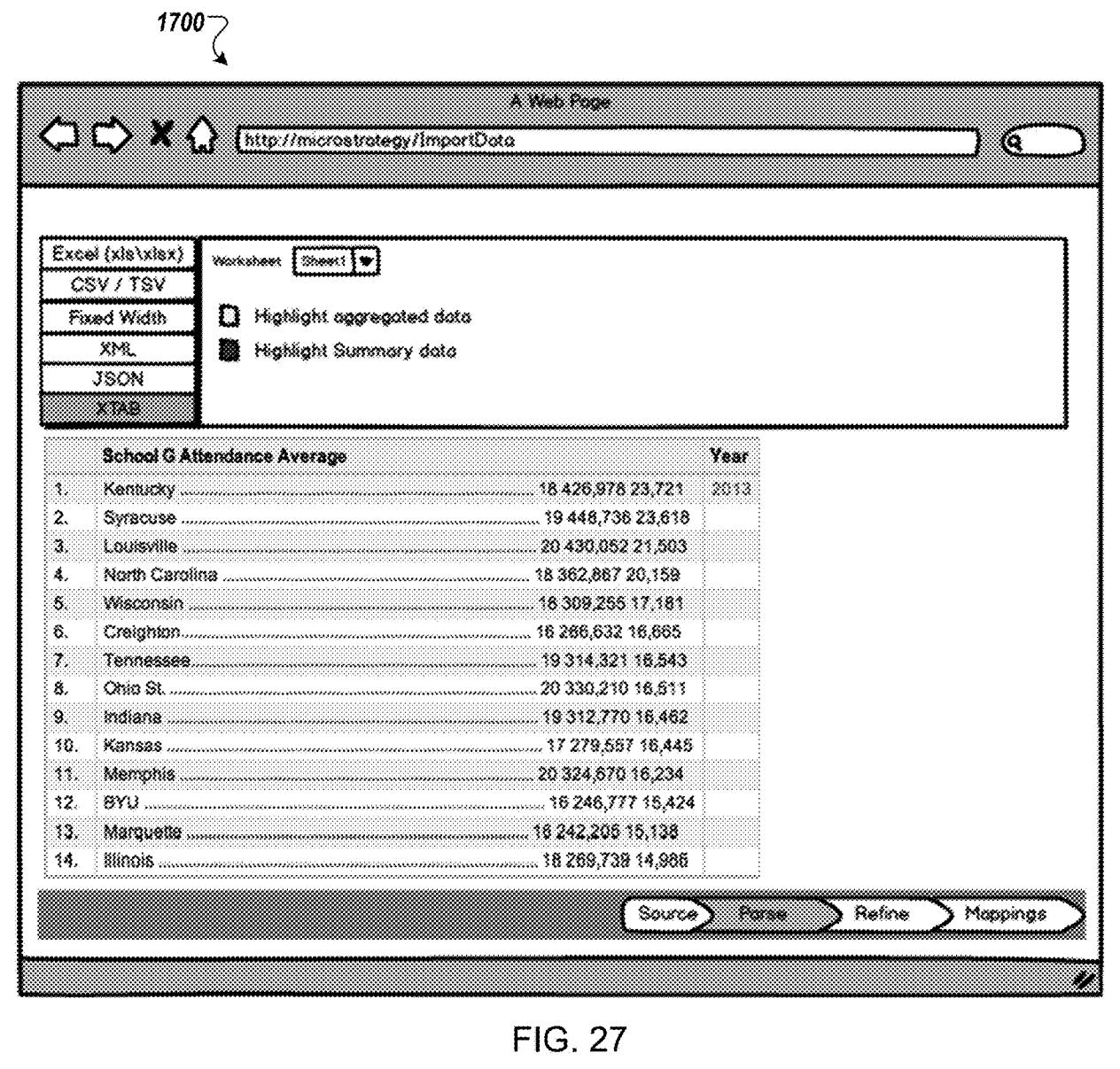

FIG. 27 illustrates an example user interface 2700 resulting from selection of the Xtab option. The user interface 2700 is displayed in response to figuring the Xtab layout in the user interface 2600 completing. The user interface 2700 is changed to reflect columns and not attribute\metrics so that it feels natural to other transformations. In this example, the user selects the refine control to refine the data parsed.

Figure 28:
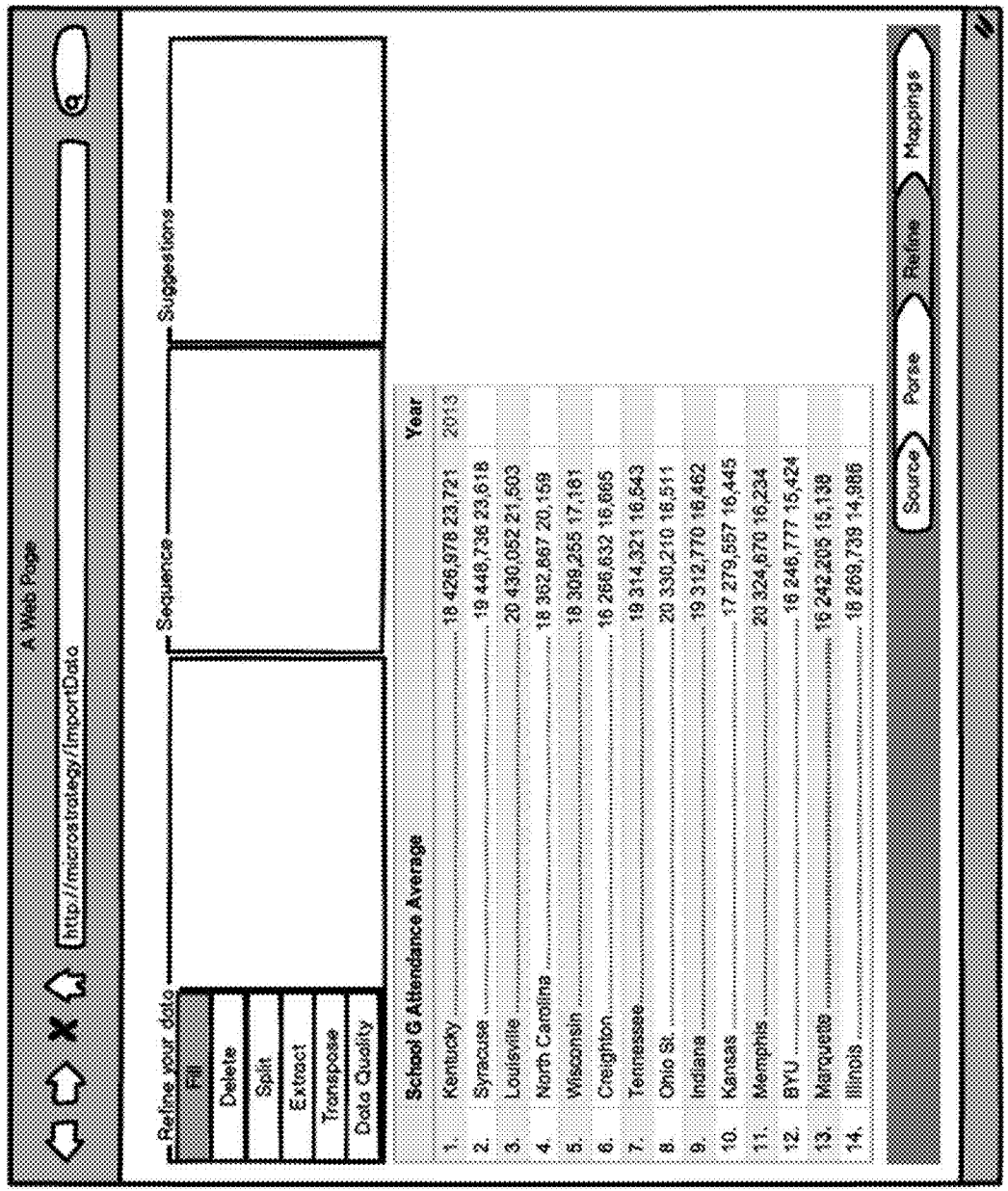

FIG. 28 illustrates an example user interface 2800 that displays a refine data interface. The user interface 2800 is displayed in response to the user selecting the refine control in the user interface 2700. As shown, the user interface 2800 has three options: List of Transformations and the corresponding UI, Sequence of Steps which is the data refinement (e.g., Open Refine) script, and Suggestions. The Suggestions is part of the intuitive UI where the system suggests to the user some of the transformation functions based on what they click in the preview of data below.

Figure 29:
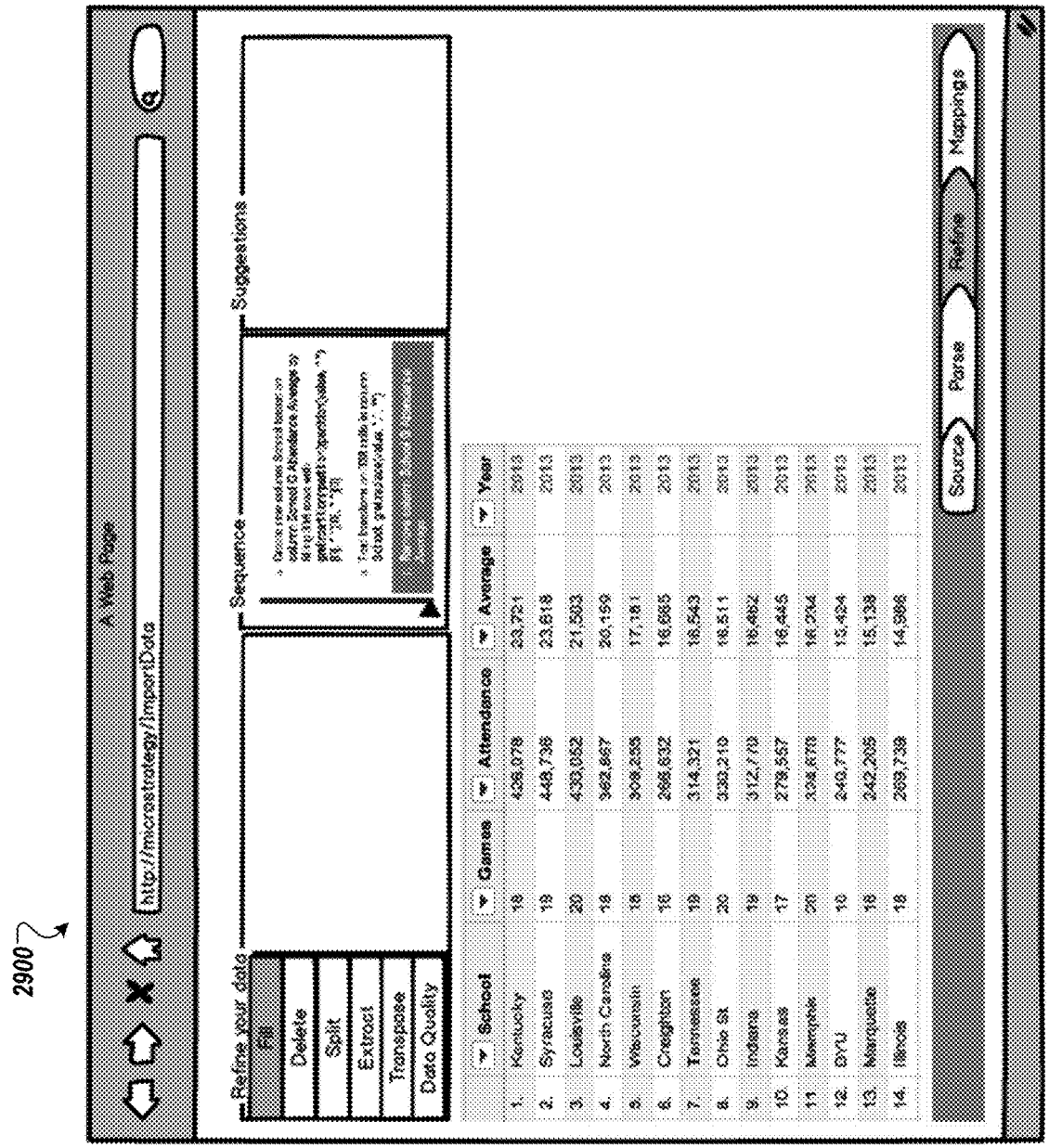

FIG. 29 illustrates an example user interface 2900 that displays a refine data interface with a sequence built. The user interface 2900 is displayed in response to the user performing some transformations in the user interface 2800. In this example, the system has received some transformations performed by the user and has built the sequence of steps shown based on the transformations. The user has the option to undo or redo the sequence steps by using the vertical slider shown. From this point, the user clicks on the mappings control.

Figure 30:
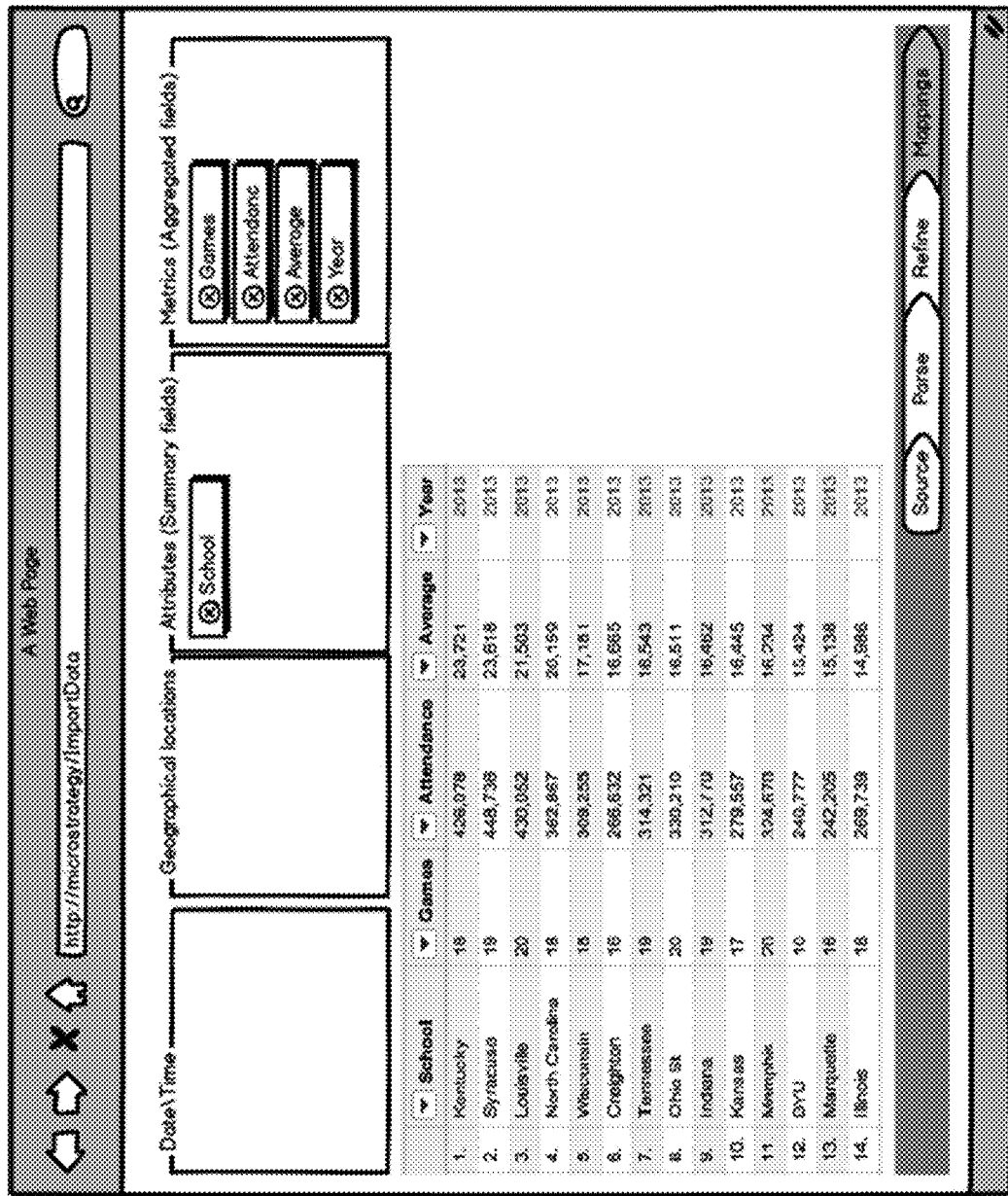

FIG. 30 illustrates an example user interface 3000 that displays a mappings interface. The user interface 3000 is displayed in response to the user selecting the mappings control in the user interface 2900. In the previous interfaces, the system was dealing with columns. In the user interface 3000, the system maps those columns to attributes and metrics. As shown, the system displays a preview of the mapping at the top of the user interface 3000. The system may display inline mapping (e.g., the first row displays the attribute versus metrics).

Figure 31:
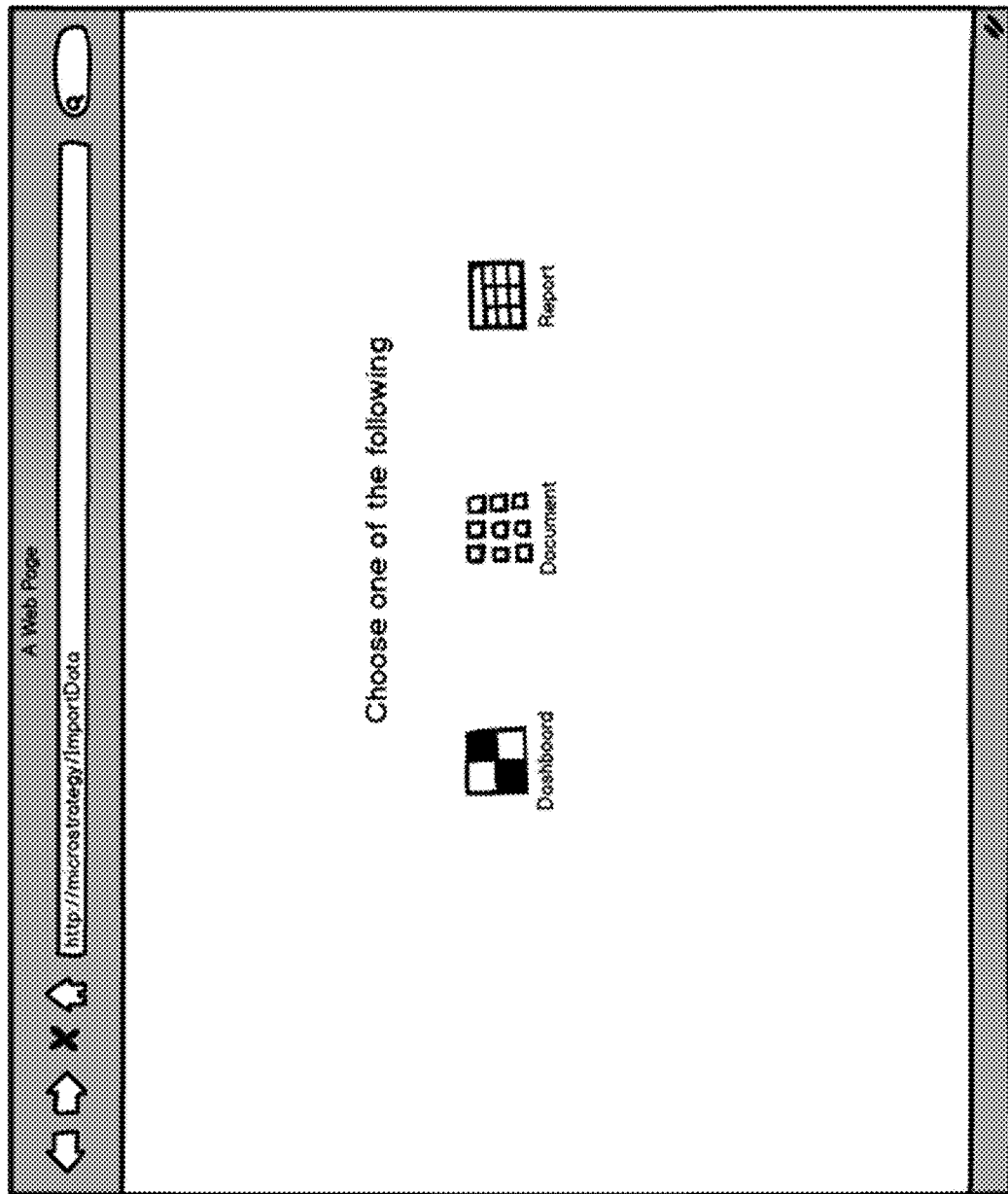

FIG. 31 illustrates an example user interface 3100 for selecting a type of data to import. As shown, the user interface 3100 enables a user to import data to and/or from a dashboard, a document, or a report. In this example, the user selects to import data from a document.

Figure 32:
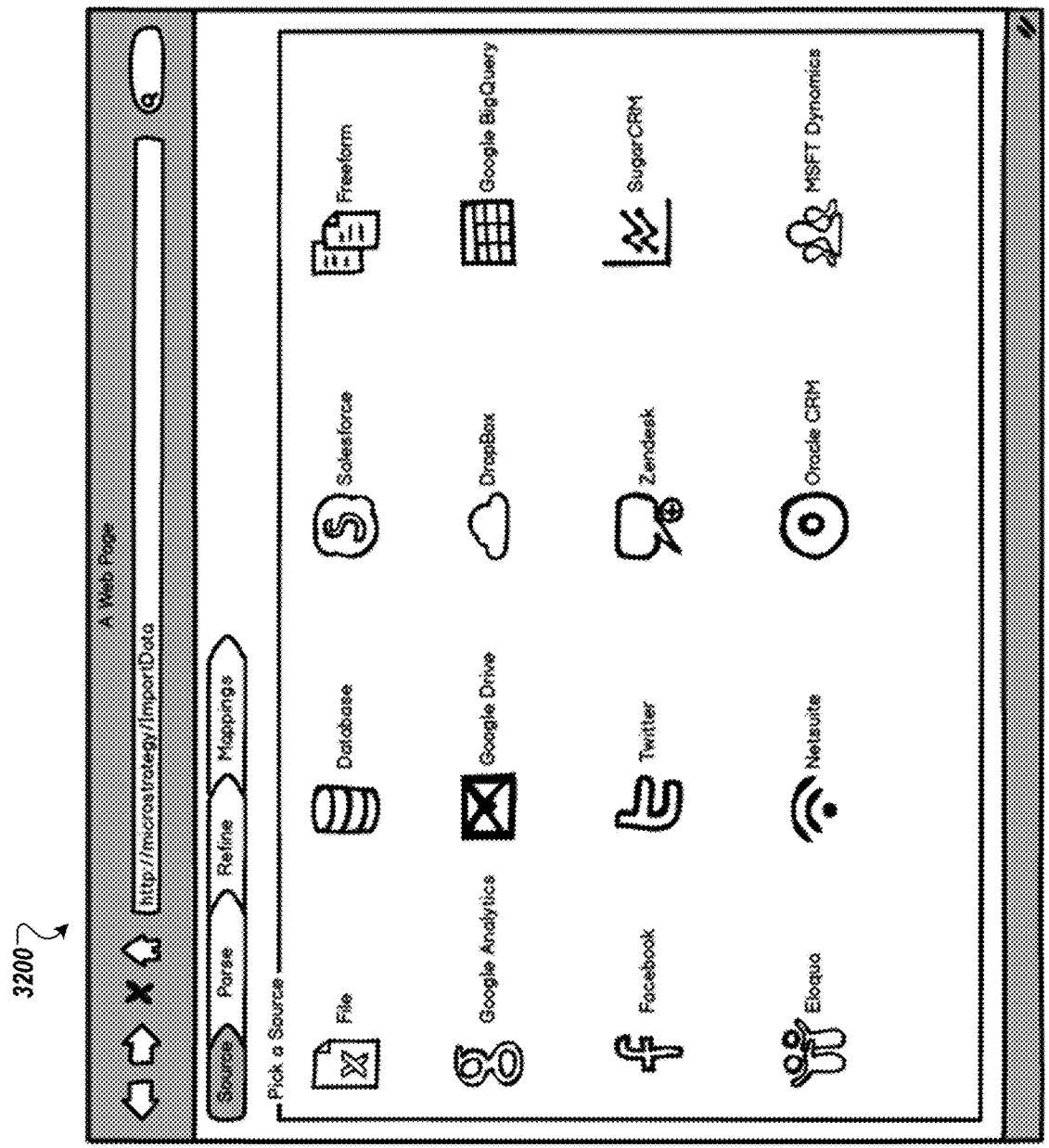

FIG. 32 illustrates an example user interface 3200 for selecting a data source. As shown, the user interface 3200 has a variety of sources a user may select to import data. In this example, the user selects to import data from a database.

Figure 33:
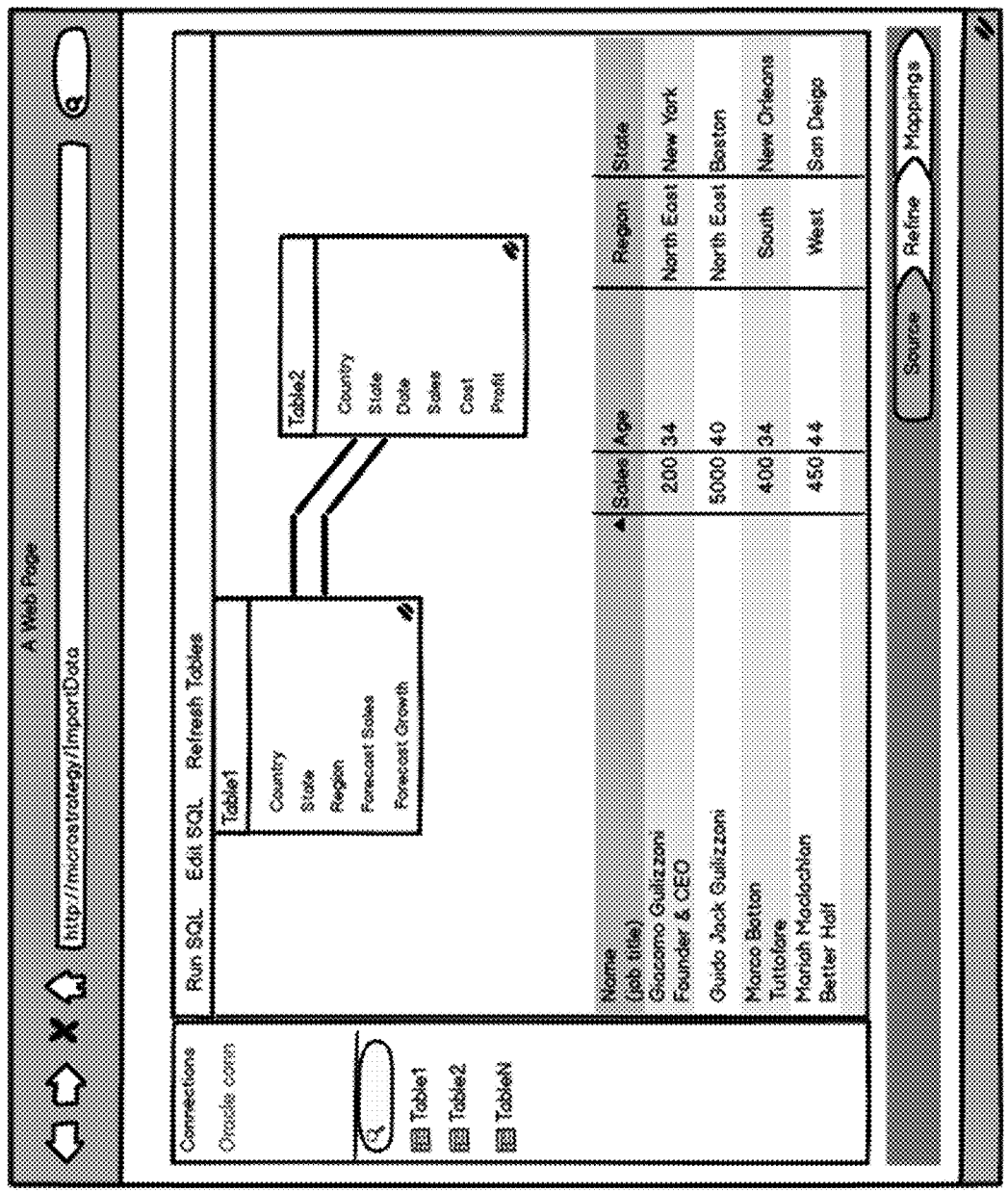

FIG. 33 illustrates an example user interface 3300 for identifying database data to import. The user interface 3300 is displayed in response to the user selecting to import data from a database in the user interface 3200. The user interface 3300 allows a user to build a query. At this point, the system just displays the "columns" generated from the query and not the mappings. The user may click on the refine control or choose to skip to mappings using the mappings control. In this example, the user clicks on the refine control.

Figure 34:
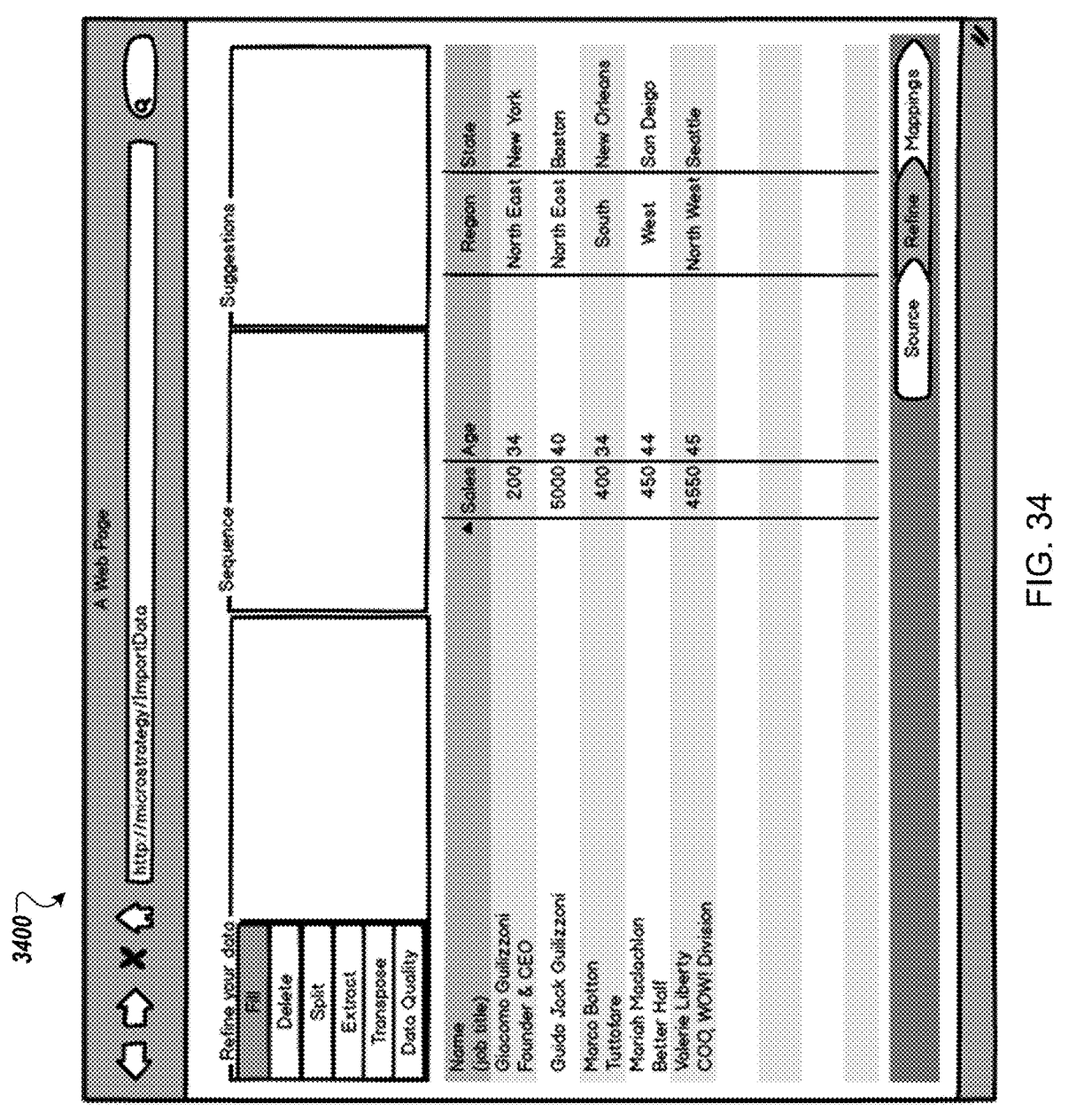

FIG. 34 illustrates an example user interface 3400 that displays a refine data interface. The user interface 3400 is displayed in response to the user selecting the refine control in the user interface 3300. As shown, the user interface 3400 has three options: List of Transformations and the corresponding UI, Sequence of Steps which is the data refinement (e.g., Open Refine) script, and Suggestions. The Suggestions is part of the intuitive UI where the system suggests to the user some of the transformation functions based on what they click in the preview of data below. The system may send the data from the database server (e.g., I-server) to the data refinement (e.g., Open Refine) source in response to the user selecting the refine control in the user interface 3300.

Figure 35:
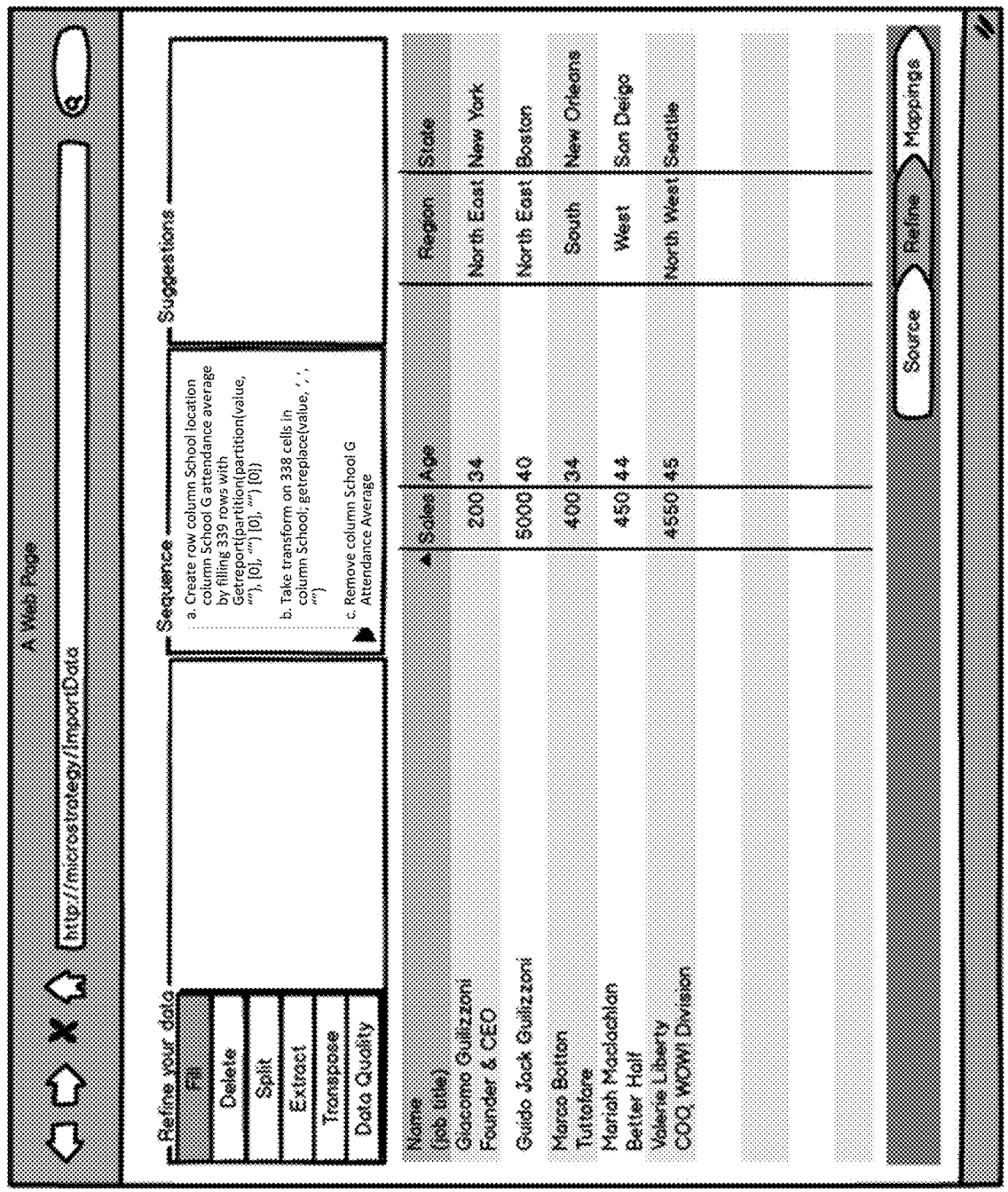

FIG. 35 illustrates an example user interface 3500 that displays a refine data interface with a sequence built. The user interface 3500 is displayed in response to the user performing some transformations in the user interface 3400. In this example, the system has received some transformations performed by the user and has built the sequence of steps shown based on the transformations. The user has the option to updo or redo the sequence steps by using the vertical slider shown. From this point, the user clicks on the mappings control.

Figure 36:
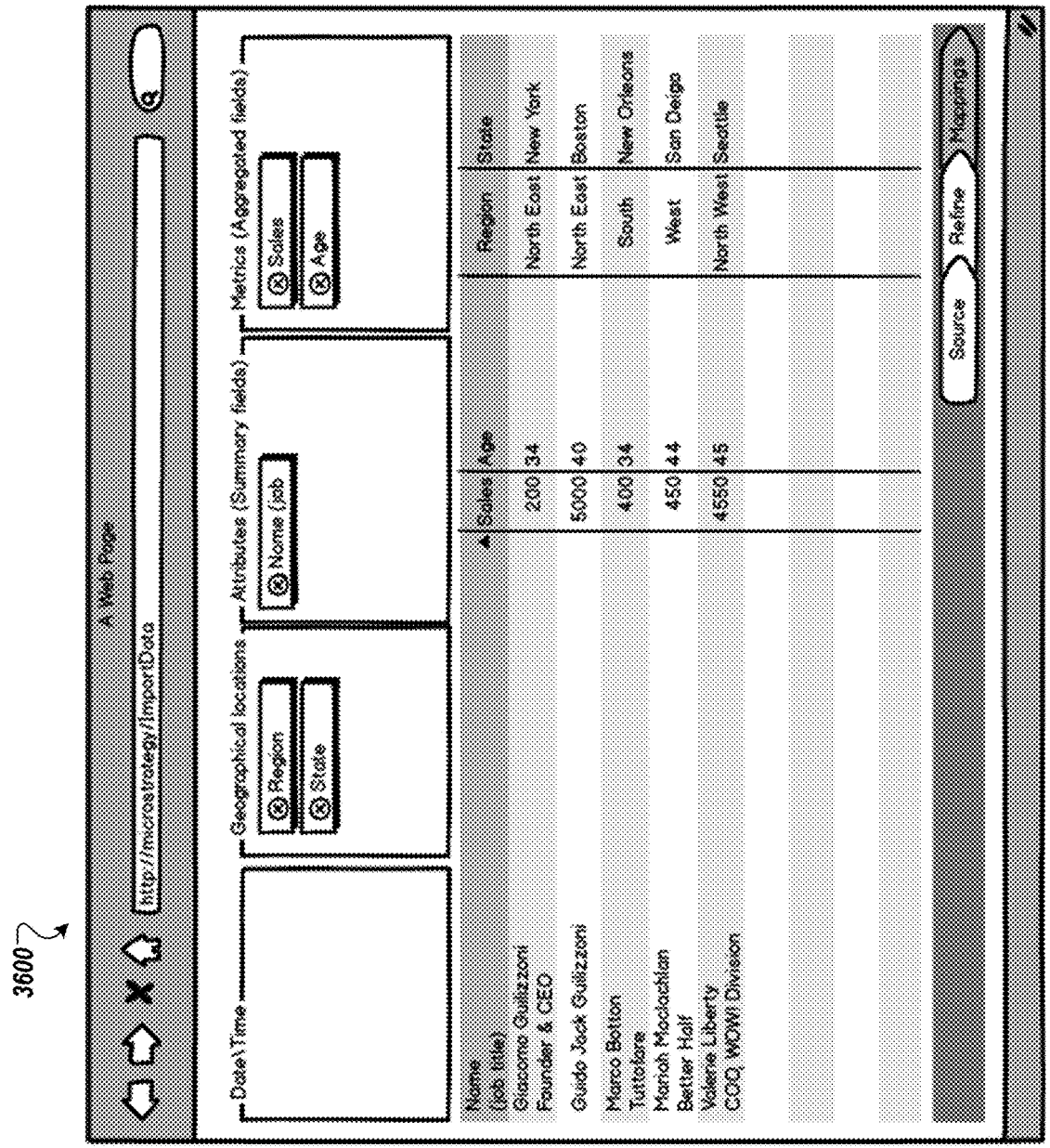

FIG. 36 illustrates an example user interface 3600 that displays a mappings interface. The user interface 3600 is displayed in response to the user selecting the mappings control in the user interface 3500. In the user interface 3600, the system maps the columns to attributes and metrics. As shown, the system displays a preview of the mapping at the top of the user interface 3600.

Figure 37:
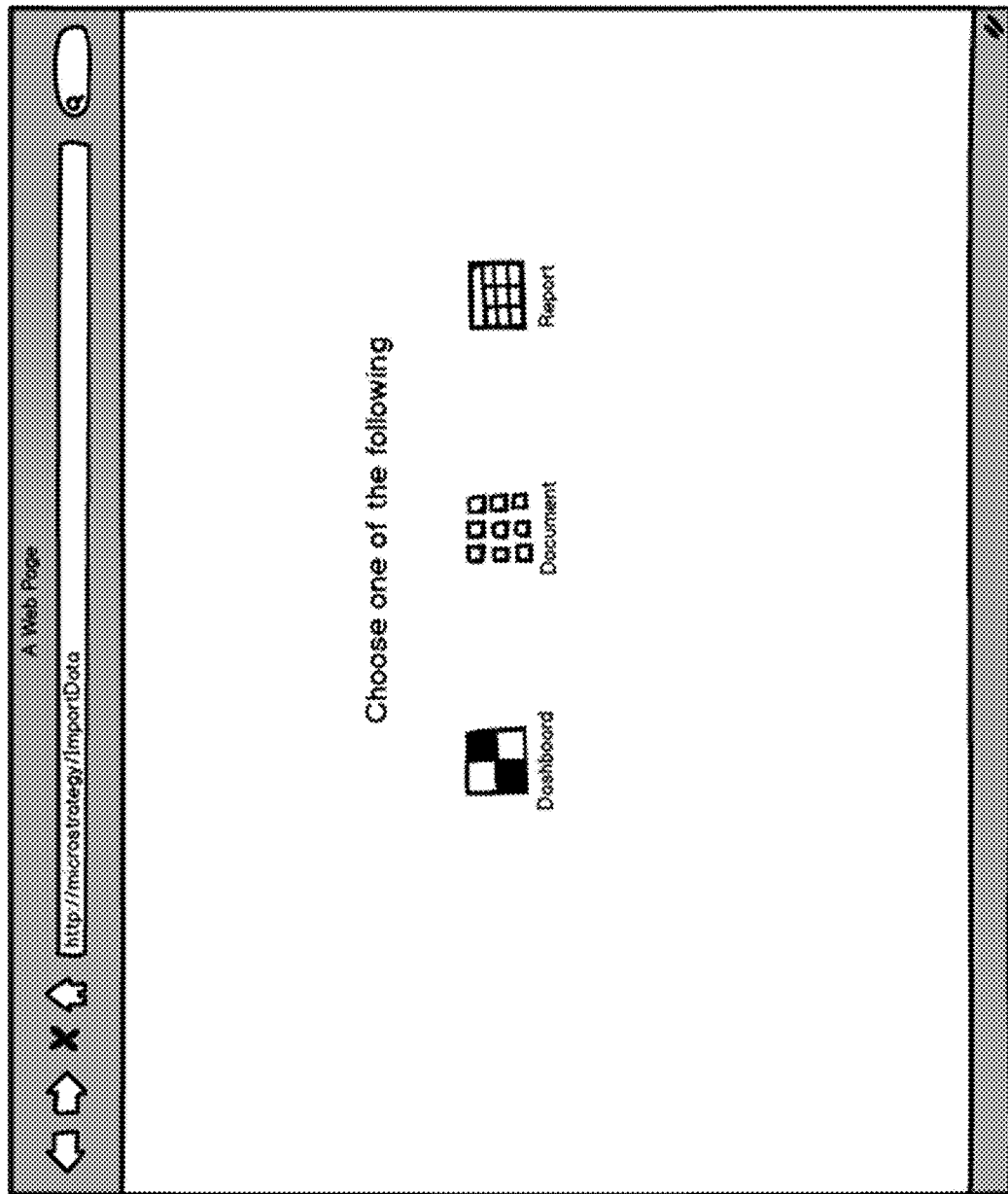

FIG. 37 illustrates an example user interface 3700 for selecting a type of data to import. The user interface 3700 is displayed in response to completion of the mappings in the user interface 3600. As shown, the user interface 3700 enables a user to import data to and/or from a dashboard, a document, or a report and continue refinement and other data wrangling operations.

Figure 38:
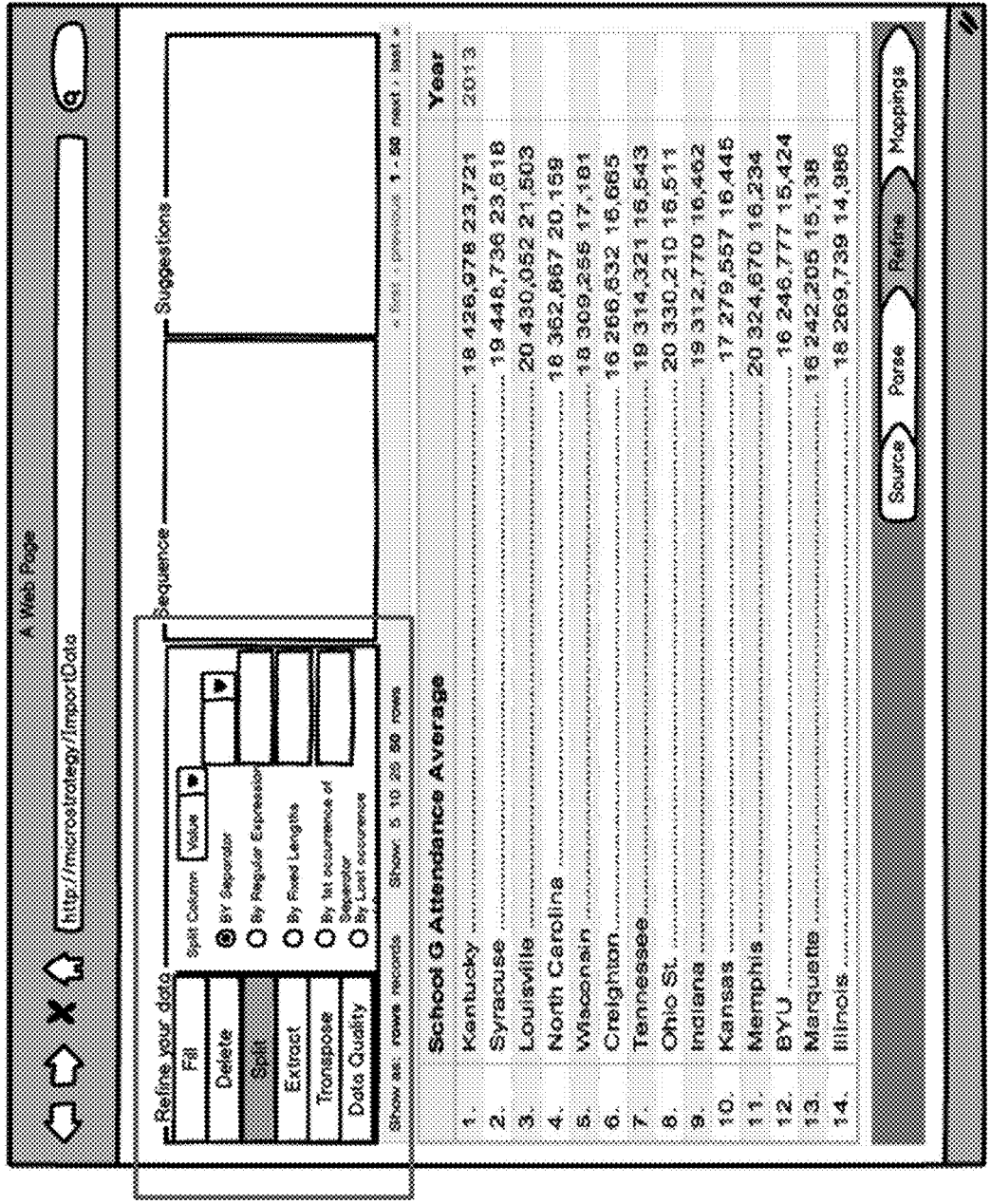

FIG. 38 illustrates an example user interface 3800 that displays a refine data interface. The user interface 3800 may be displayed for any data refinement action on imported data. As shown, the user interface 3800 enables a user to refine data by selecting a data wrangling operation in a "Refine you data" portion of the user interface 3800. In this example, the user has selected the "Split" operation to split a column into multiple columns.

Figure 39:
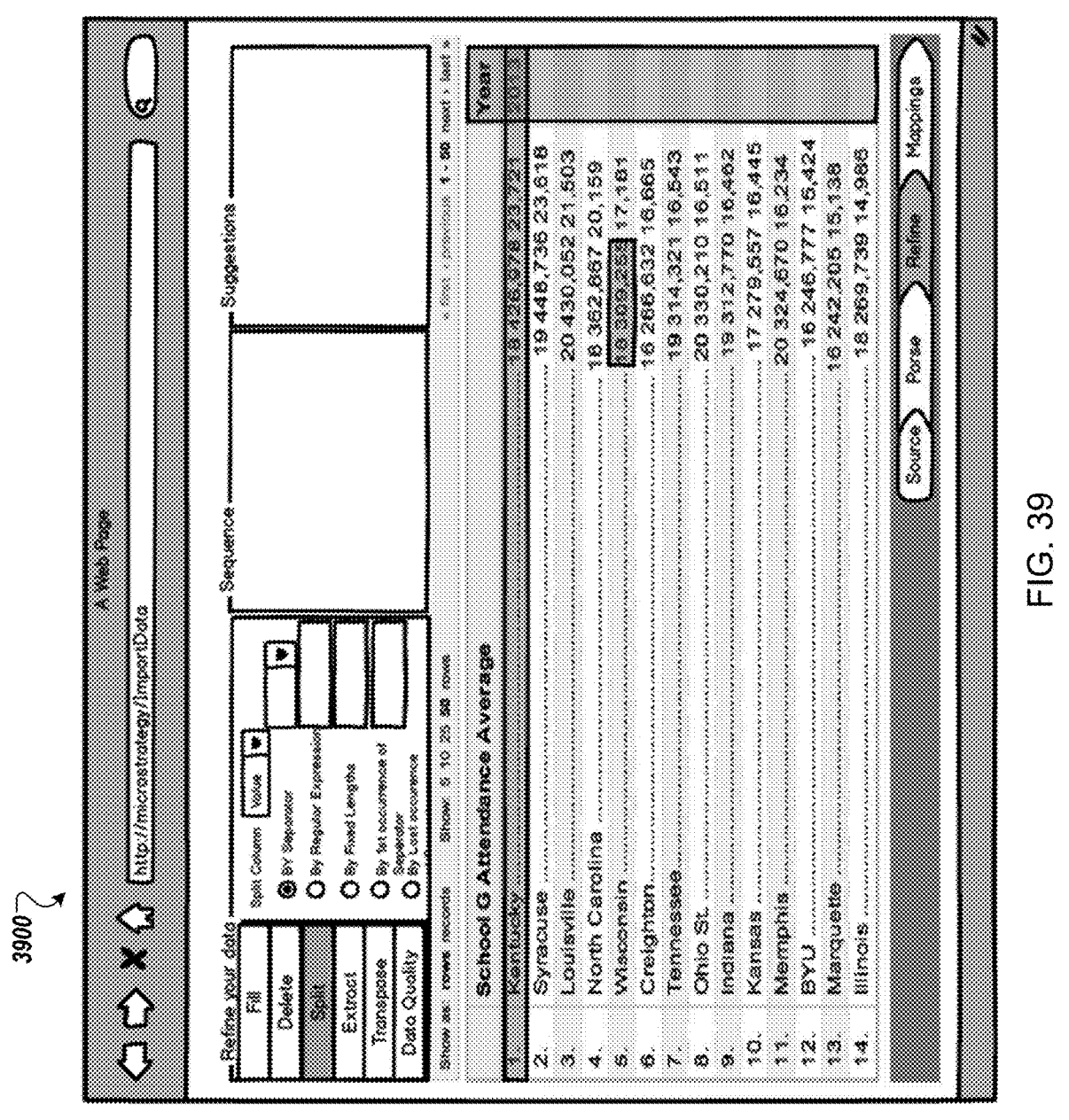

FIG. 39 illustrates an example user interface 3900 that displays a refine data interface. The user interface 3900 may be displayed for any data refinement action on imported data and may be displayed subsequent to the user interface 3800. As shown, in the user interface 3900, the preview dialogue is also clickable and there are three regions that a user can select: Row, Column, Cell (either the whole cell or partial data). Based on what user clicks, the system provides some suggestions. The suggestions are not intended to solve all data cleansing operations, but just help the user to intuitively understand and use the existing functions. In this example, the system has received user selection of row "1.", the column "year", and cell data "18 309,255".

Figure 40:
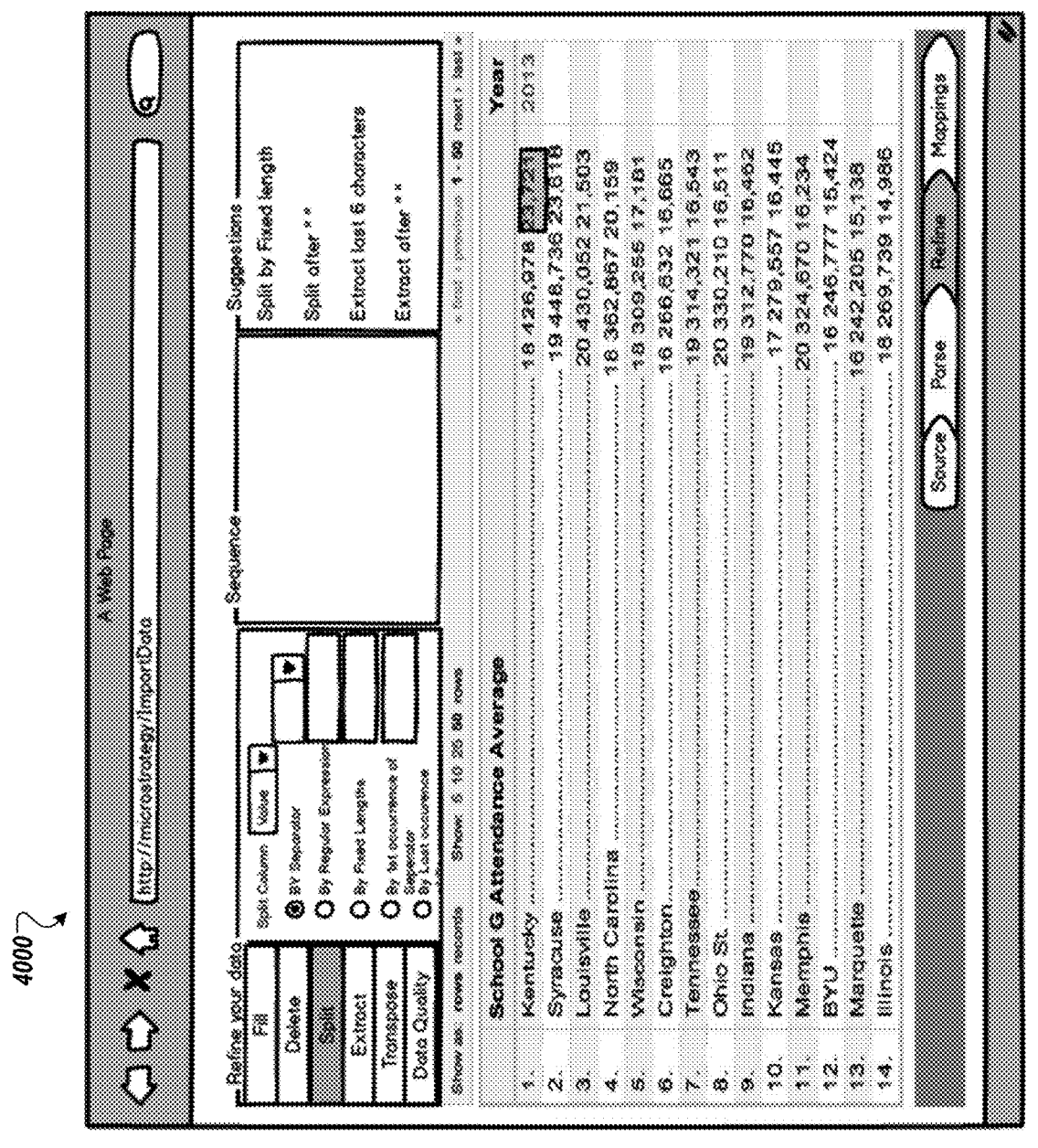

FIG. 40 illustrates an example user interface 4000 that displays a refine data interface. The user interface 4000 may be displayed for any data refinement action on imported data and may be displayed subsequent to the user interface 3900. As shown, the system has received user selection of some text in a cell and has determined and provided suggestions based on the selection. The corresponding suggestions may be to extract that data or split the column.

Figure 41:
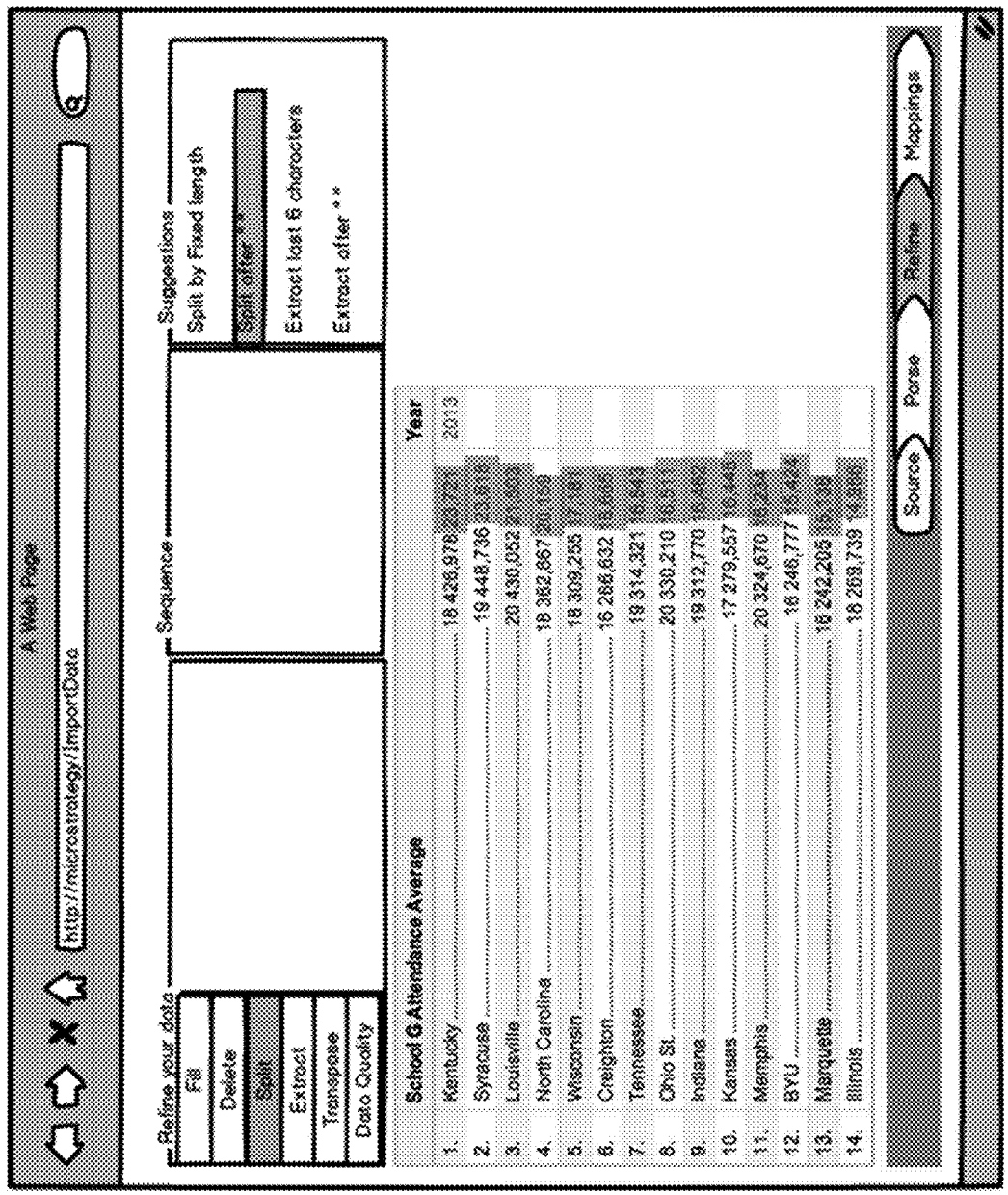

FIG. 41 illustrates an example user interface 4100 that displays a refine data interface. The user interface 4100 may be displayed for any data refinement action on imported data and may be displayed subsequent to the user interface 4000. As shown, the system has detected a mouse hover over the suggestion Split after " ". Based on detection of the mouse hover over the suggestion Split after " ", the system attempts to indicate to the user what would happen if that suggestion was adopted. As shown in the user interface 4100, the system highlights the text that will be split after " ". The user interface 4100 may provide other options that the user may select. For example, the user interface 4100 may provide an option perform actions such as to review event logs, review the event logs to determine that a user added a product to an online shopping cart, but didn't purchase the item, limit a data set to these types of customers, select a subset of these customers, and then perform further analysis on the subset of customers.

Figure 42:
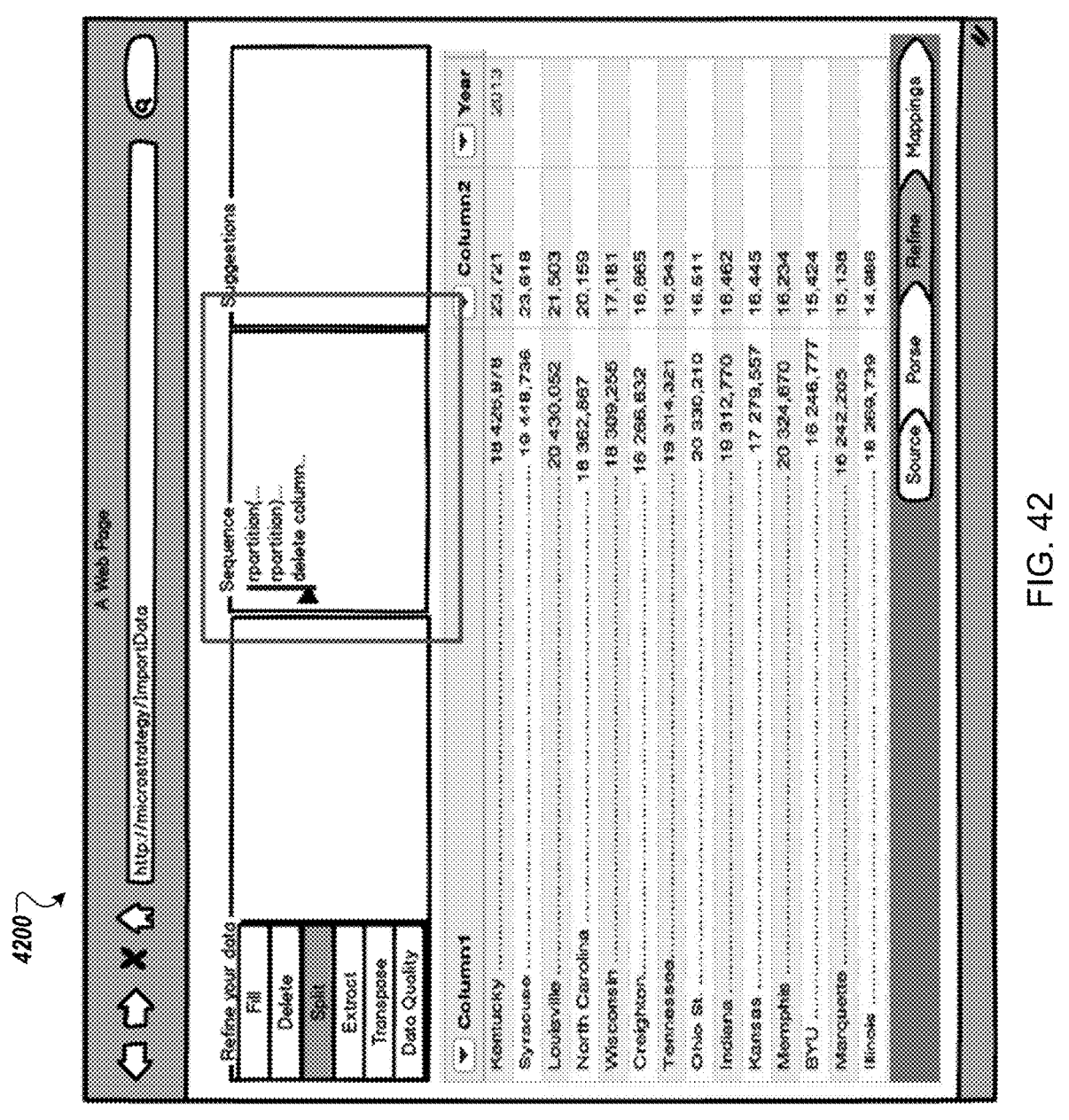

FIG. 42 illustrates an example user interface 4200 that displays a refine data interface with a sequence built. The user interface 4200 may be displayed for any data refinement action on imported data and may be displayed subsequent to the user interface 4100. In this example, the system has received some operations either by manual user input or using the suggestions and has built the sequence of steps shown based on the operations. The user has the option to undo or redo the sequence steps by dragging the vertical slider shown.

Figure 43:
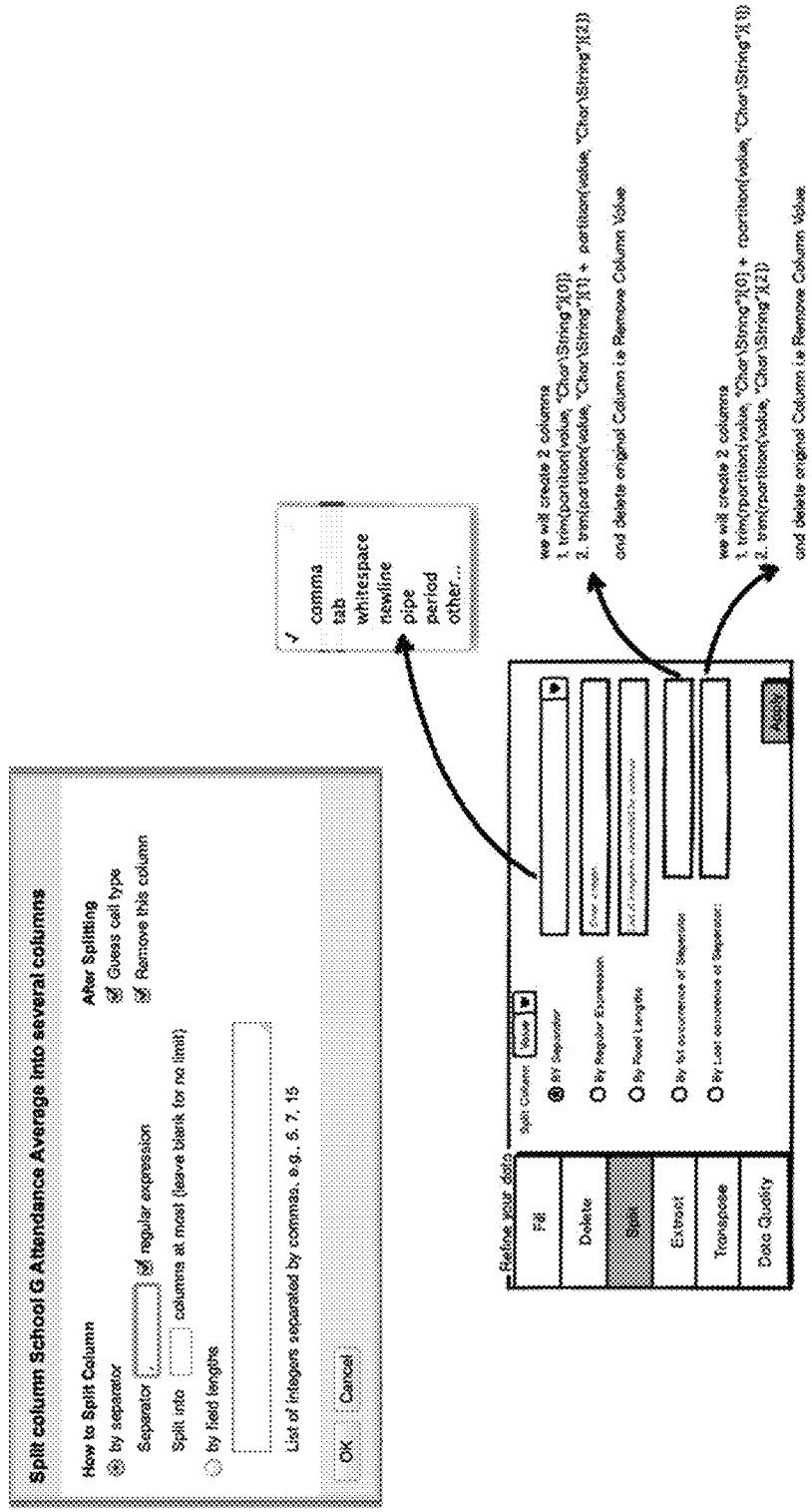

FIG. 43 illustrates an example user interface 4300 for splitting a column. The user interface 4300 may be displayed for any split refinement action on imported data. In this example, the user interface 4300 includes a menu for splitting a column and indicates operations performed based on various split options being selected.

Figure 44:
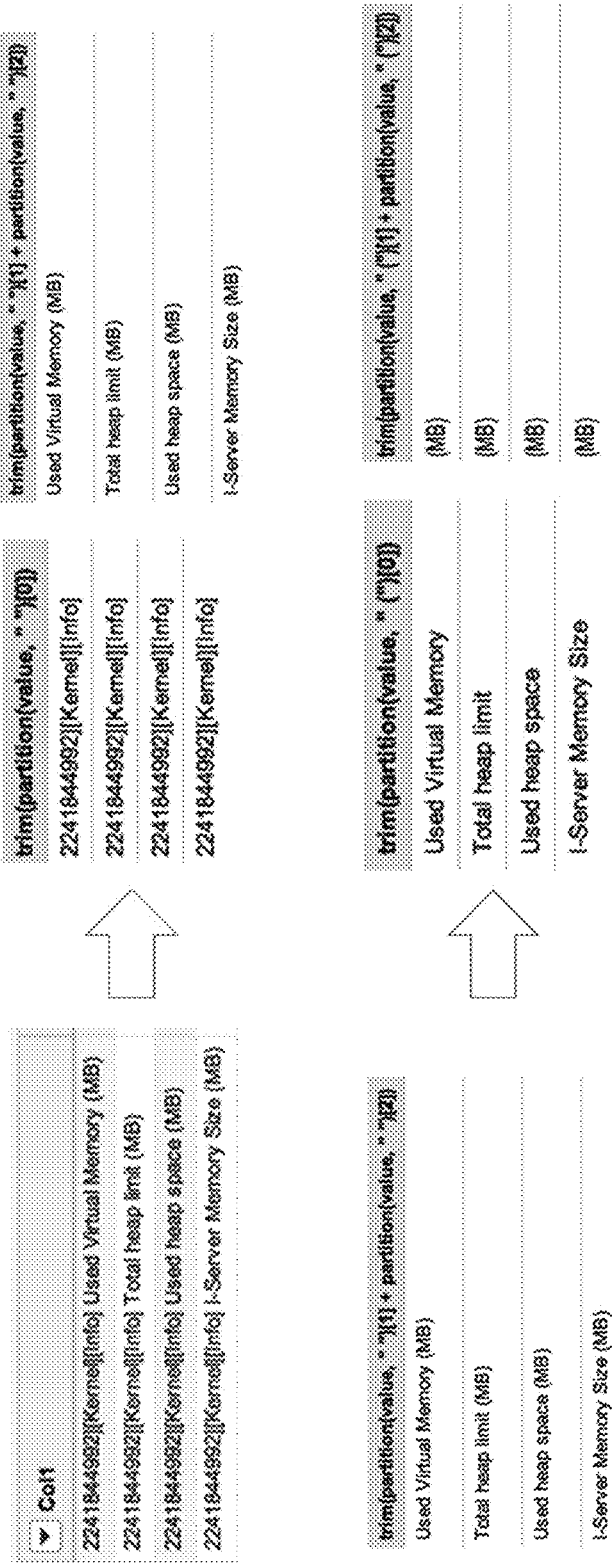

FIG. 44 illustrates an example user interface 4400 for splitting a column by first occurrence of a separator. The user interface 4400 may be displayed for any split by first occurrence of a separator refinement action on imported data. In this example, the user interface 4400 illustrates creation of two columns and deletion of the original column.

Figure 45:
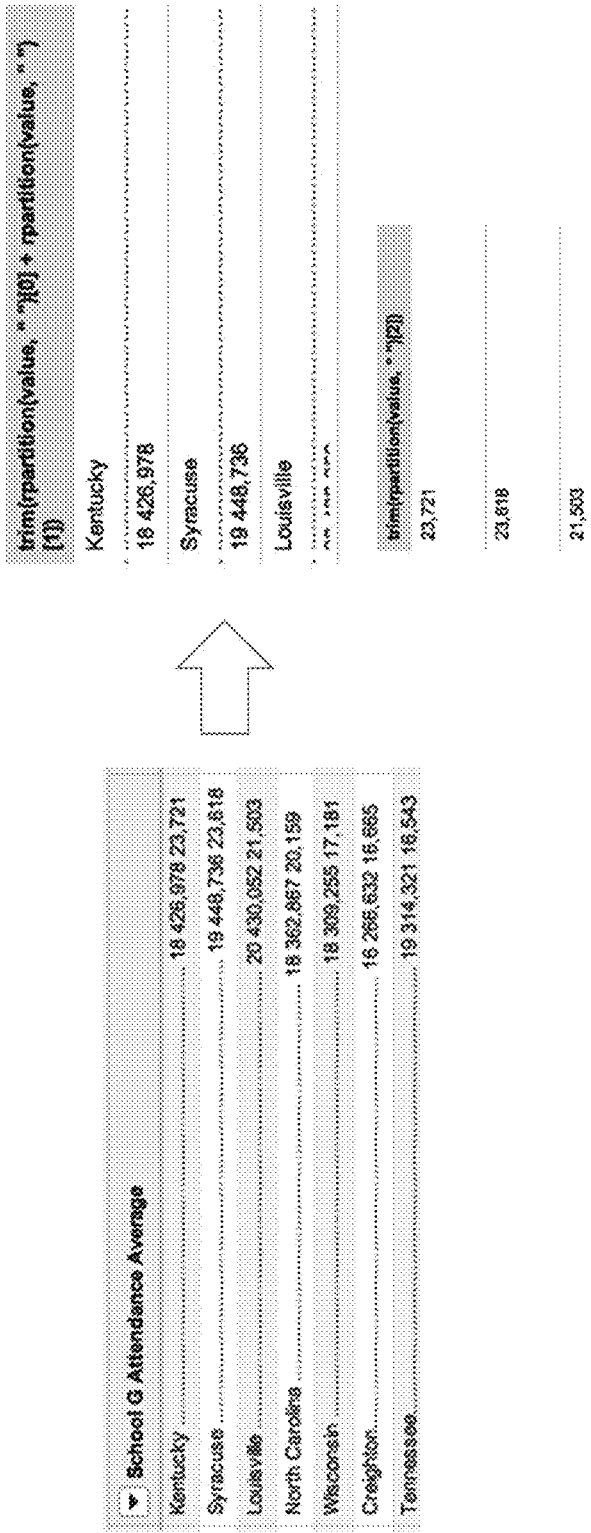

FIG. 45 illustrates an example user interface 4500 for splitting a column by last occurrence of a separator. The user interface 4500 may be displayed for any split by last occurrence of a separator refinement action on imported data. In this example, the user interface 4500 illustrates creation of two columns and deletion of the original column.

Figure 46:
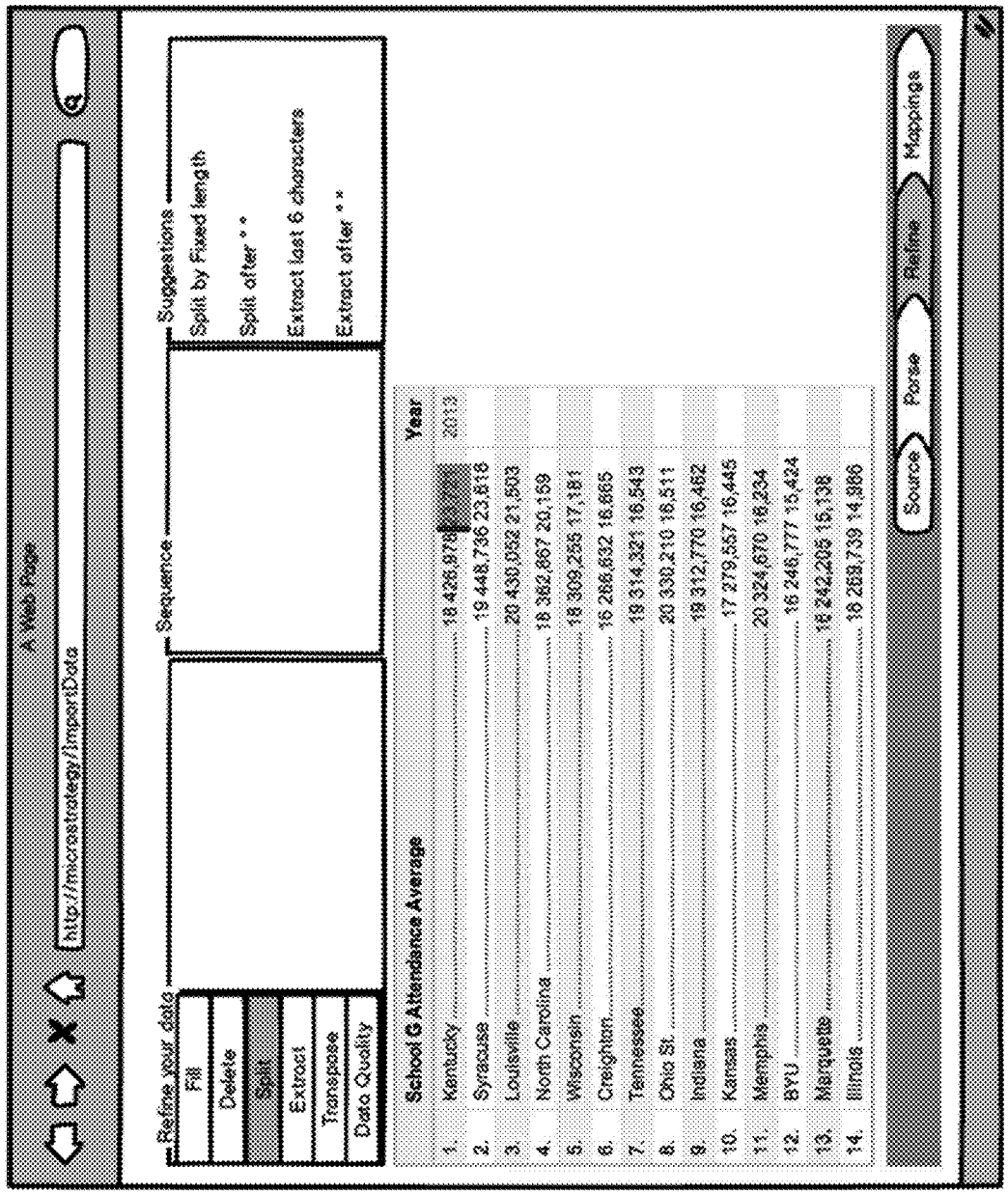

FIG. 46 illustrates an example user interface 4600 that displays a refine data interface. The user interface 4600 may be displayed for any data refinement action on imported data. As shown, in the user interface 4600, the preview dialogue is clickable and there are three regions that a user can select: Row, Column, Cell (either the whole cell or partial data). Based on what user clicks, the system provides some suggestions. The suggestions are not intended to solve all data cleansing operations, but just help the user to intuitively understand and use the existing functions. In this example, the system has received user selection of text from a cell while the split refine option was selected. In this regard, the system provides some suggestions for splitting the column based on the selected text.

Figure 47:
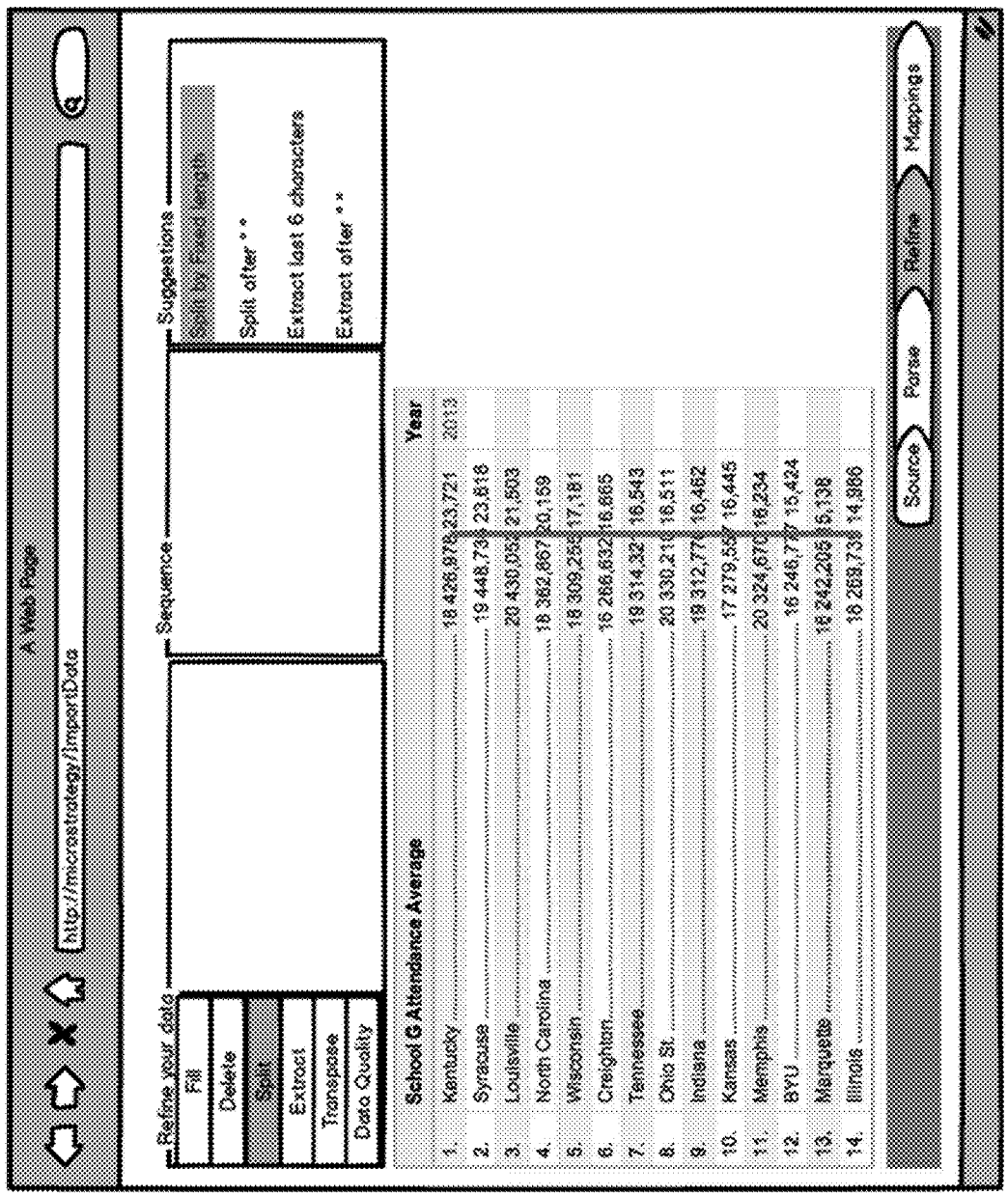

FIG. 47 illustrates an example user interface 4700 that displays a refine data interface. The user interface 4700 may be displayed for any data refinement action on imported data and may be displayed subsequent to the user interface 4600.

As shown, the system has detected a mouse hover over the suggestion Split by Fixed Length. Based on detection of the mouse hover over the suggestion Split by Fixed Length, the system attempts to indicate to the user what would happen if that suggestion was adopted. As shown in the user interface 4700, the system draws a vertical line through the column showing how the column would be split.

Figure 48:
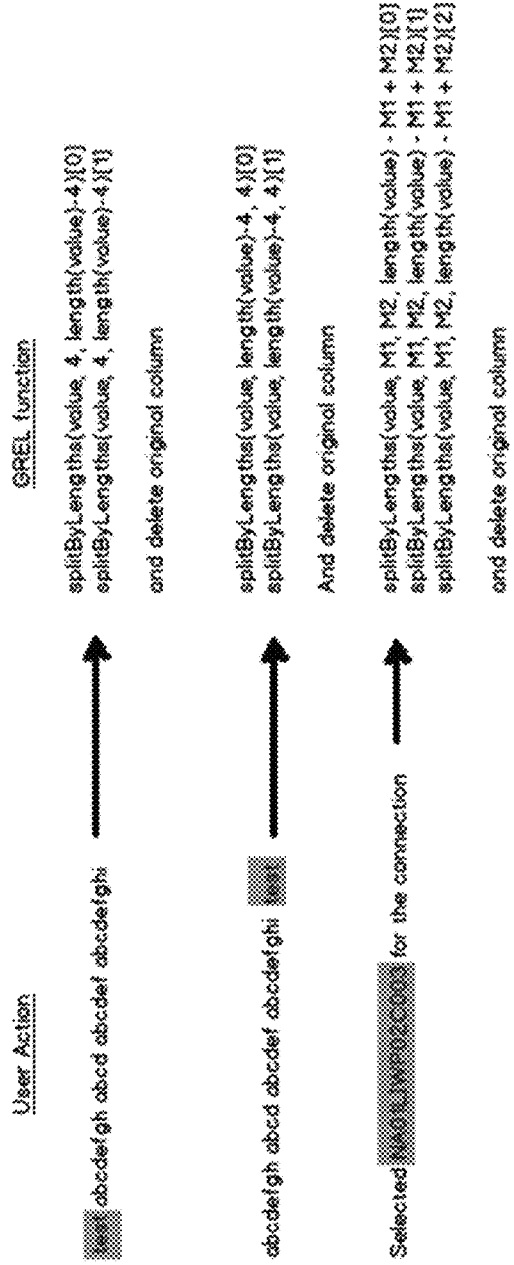

FIG. 48 illustrates an example user interface 4800 for splitting a column by fixed length. The user interface 4800 may be displayed for any split by fixed length refinement action on imported data. In this example, the user interface 4800 illustrates examples of splitting by fixed lengths.

Figure 49:
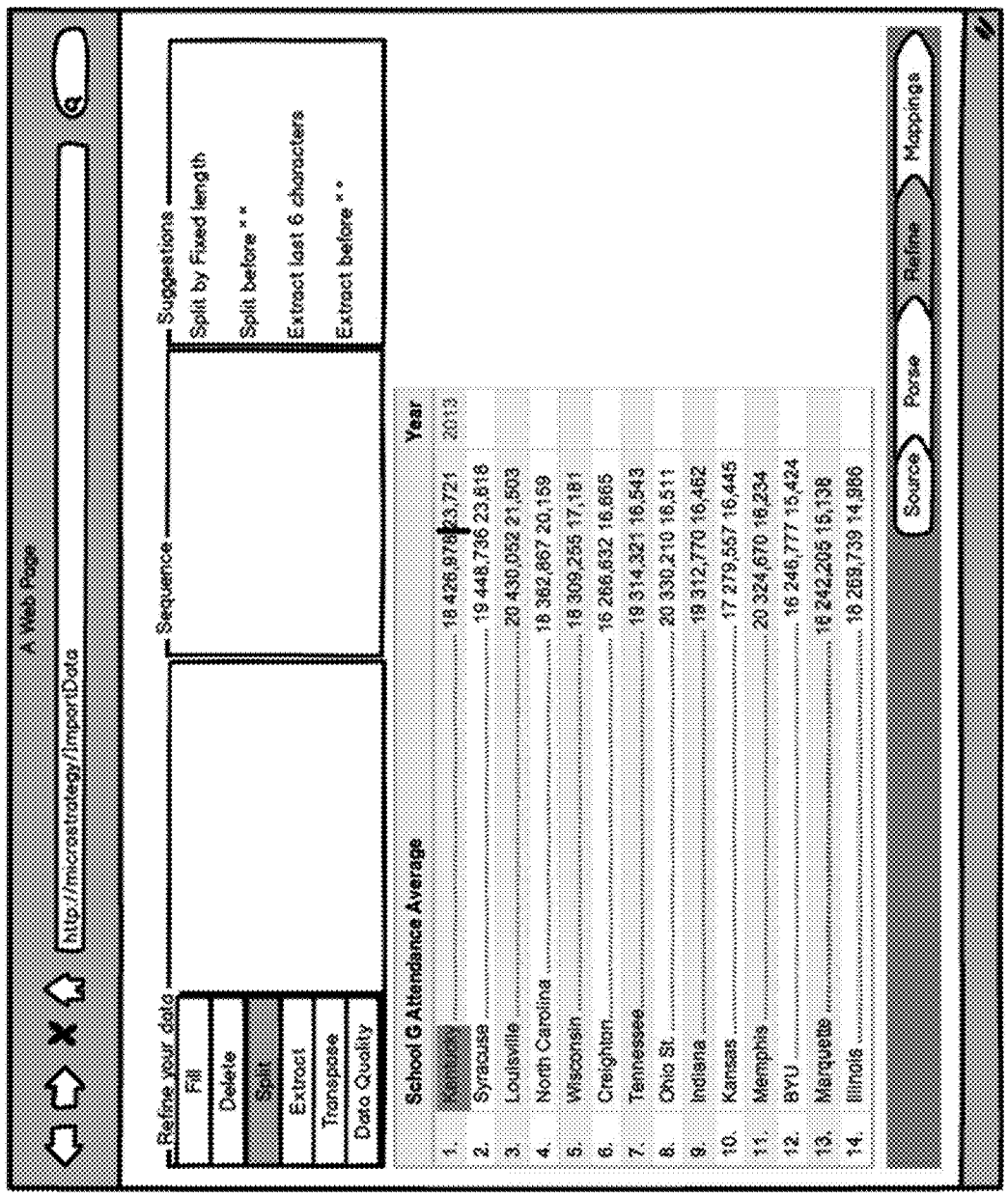

FIG. 49 illustrates an example user interface 4900 that displays a refine data interface. The user interface 4900 may be displayed for any data refinement action on imported data. As shown, in the user interface 4900, the preview dialogue is clickable and there are three regions that a user can select: Row, Column, Cell (either the whole cell or partial data). Based on what user clicks, the system provides some suggestions. The suggestions are not intended to solve all data cleansing operations, but just help the user to intuitively understand and use the existing functions. In this example, the system has received user selection of text from a cell while the split refine option was selected. In this regard, the system provides some suggestions for splitting the column based on the selected text.

Figure 50:
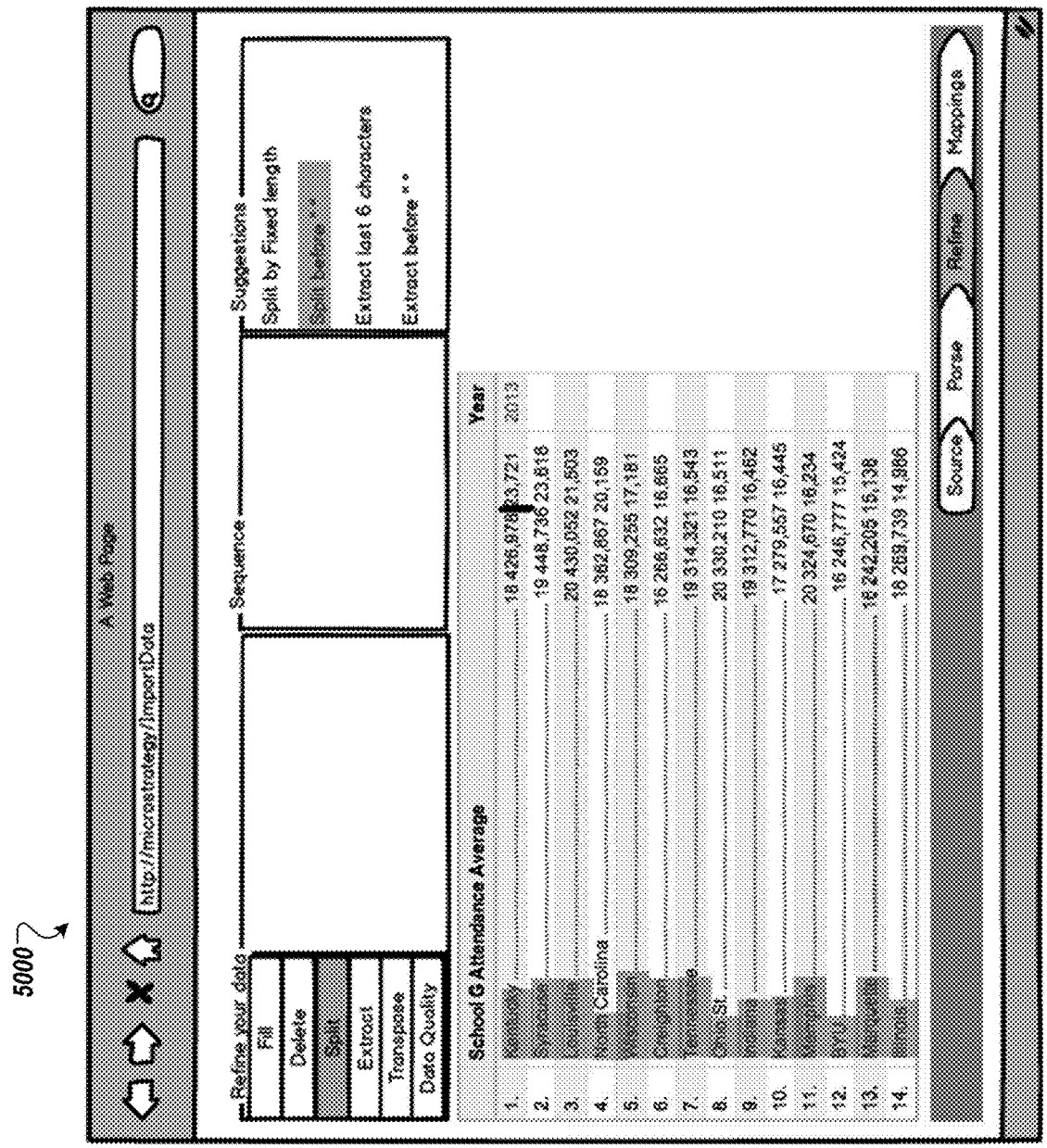

FIG. 50 illustrates an example user interface 5000 that displays a refine data interface. The user interface 5000 may be displayed for any data refinement action on imported data and may be displayed subsequent to the user interface 4900. As shown, the system has detected a mouse hover over the suggestion Split before " ". Based on detection of the mouse hover over the suggestion Split before " ", the system attempts to indicate to the user what would happen if that suggestion was adopted. As shown in the user interface 5000, the system highlights data showing how the column would be split.

Figure 51:
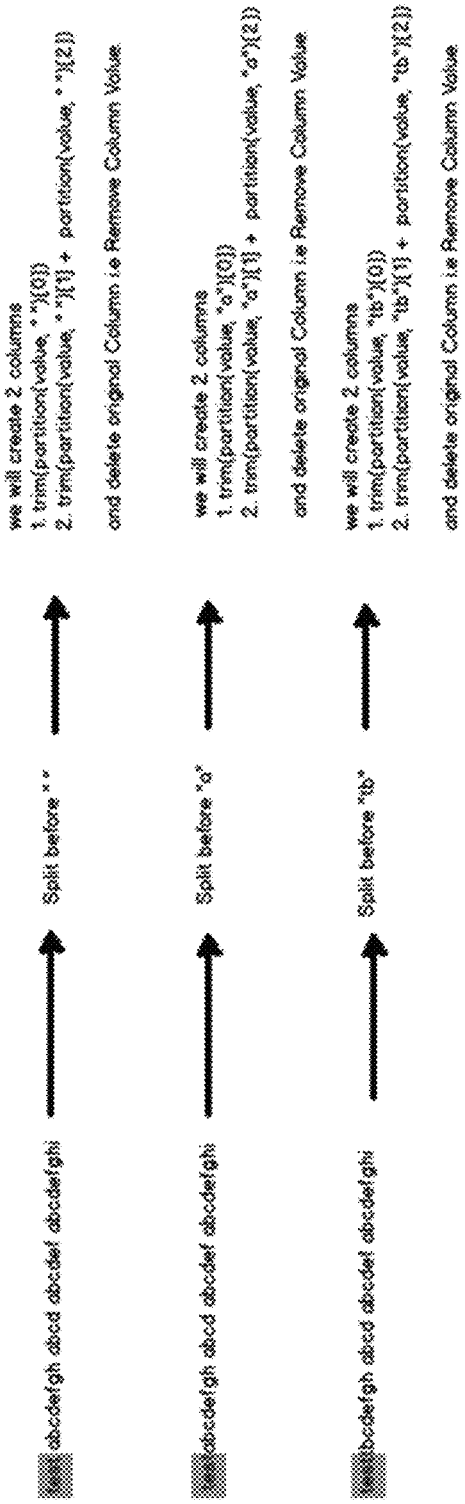

FIG. 51 illustrates an example user interface 5100 for splitting a column before a character or string. The user interface 5100 may be displayed for any split before a character or string refinement action on imported data. In this example, the user interface 5100 illustrates examples of splitting before a character or string.

Figure 52:
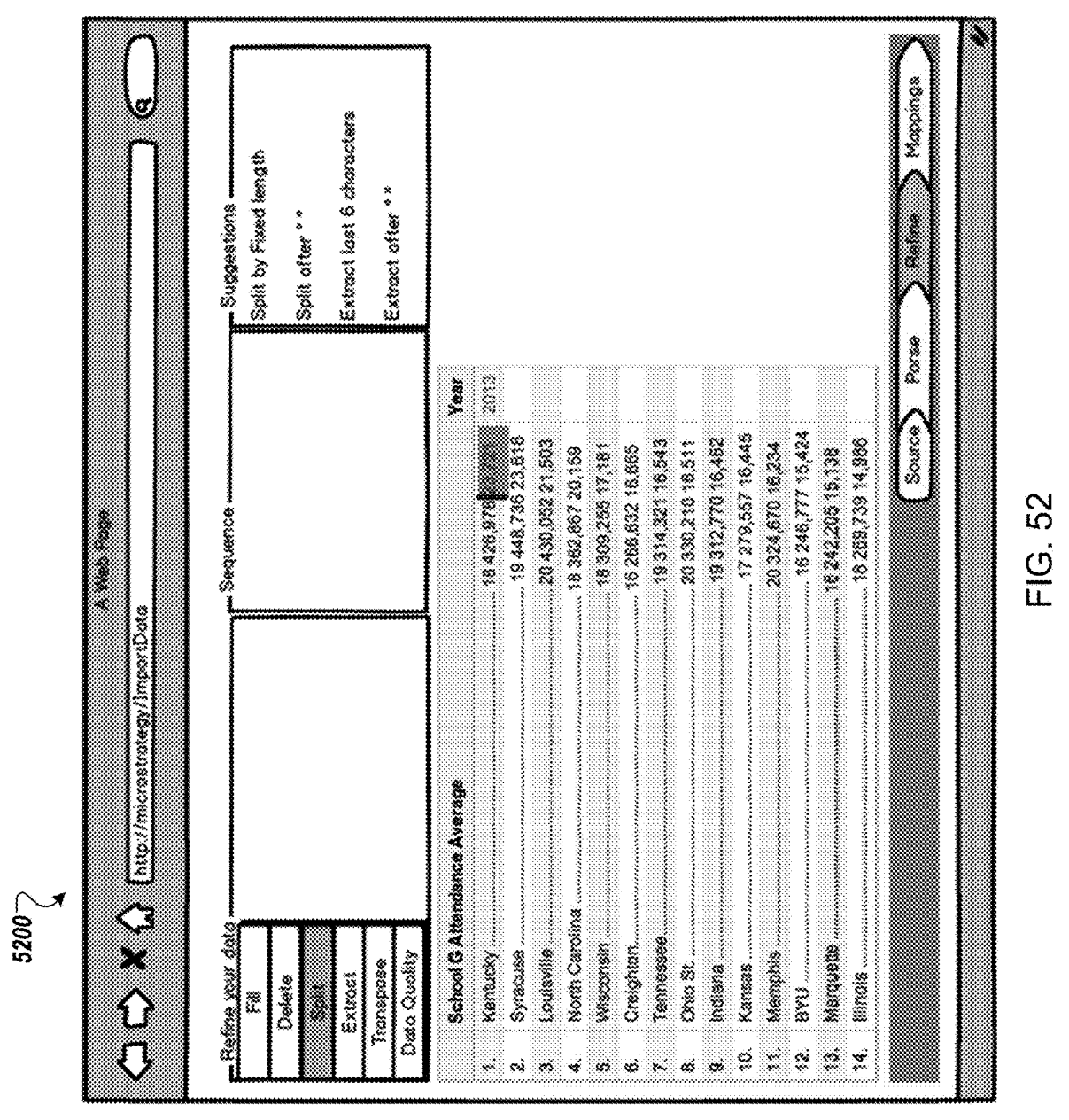

FIG. 52 illustrates an example user interface 5200 that displays a refine data interface. The user interface 5200 may be displayed for any data refinement action on imported data. As shown, in the user interface 5200, the preview dialogue is clickable and there are three regions that a user can select: Row, Column, Cell (either the whole cell or partial data). Based on what user clicks, the system provides some suggestions. The suggestions are not intended to solve all data cleansing operations, but just help the user to intuitively understand and use the existing functions. In this example, the system has received user selection of text from a cell while the split refine option was selected. In this regard, the system provides some suggestions for splitting the column based on the selected text.

Figure 53:
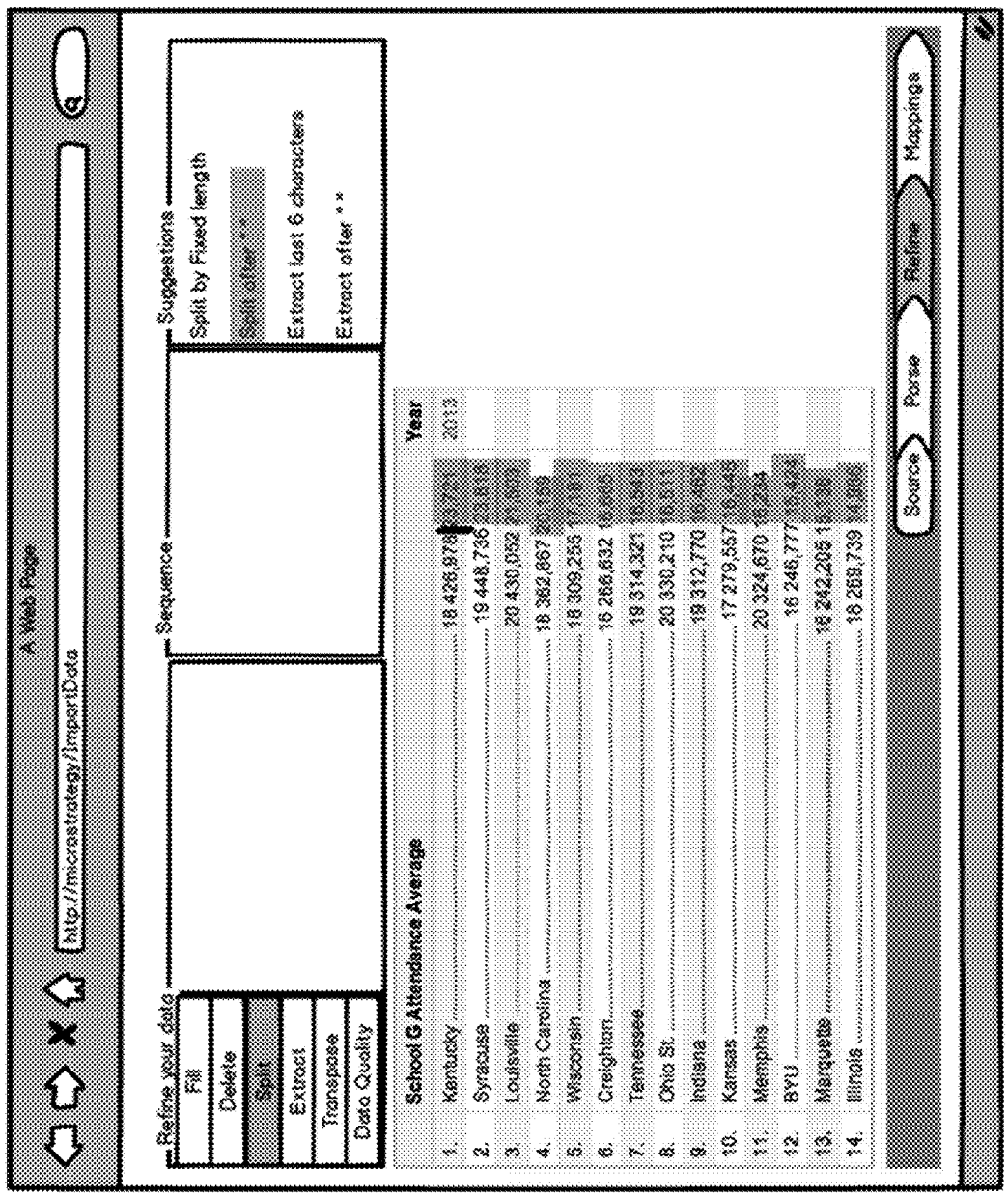

FIG. 53 illustrates an example user interface 5300 that displays a refine data interface. The user interface 5300 may be displayed for any data refinement action on imported data and may be displayed subsequent to the user interface 5200. As shown, the system has detected a mouse hover over the suggestion Split after " ". Based on detection of the mouse hover over the suggestion Split after " ", the system attempts to indicate to the user what would happen if that suggestion was adopted. As shown in the user interface 5300, the system highlights data showing how the column would be split.

Figure 54:
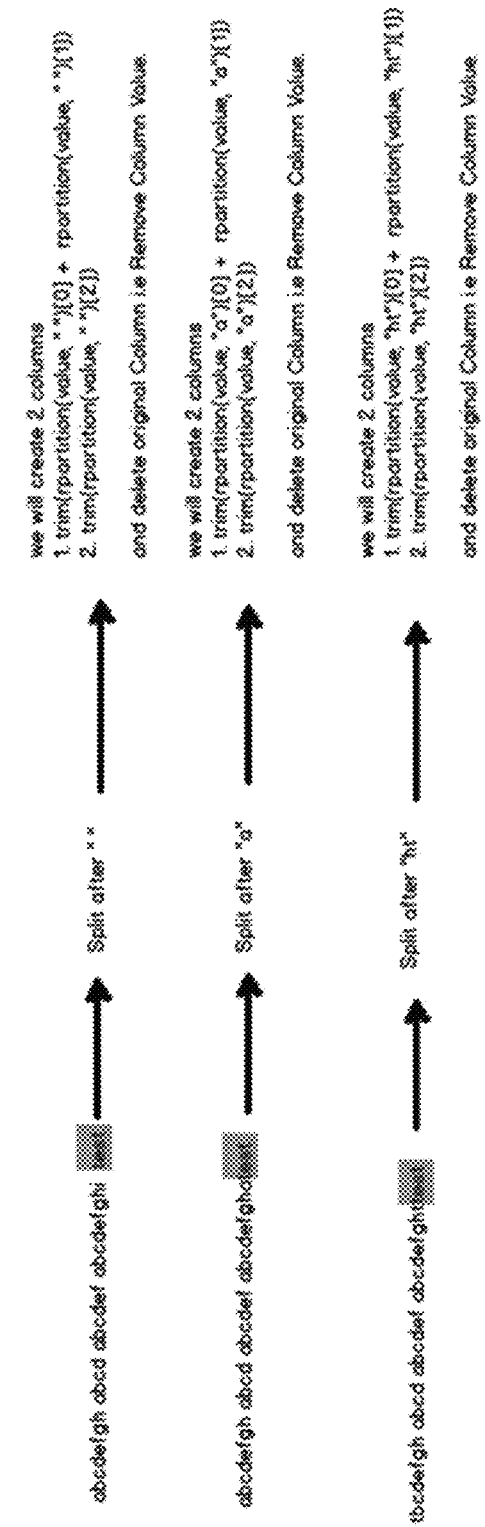

FIG. 54 illustrates an example user interface 5400 for splitting a column after a character or string. The user interface 5400 may be displayed for any split after a character or string refinement action on imported data. In this example, the user interface 5400 illustrates examples of splitting after a character or string.

In some implementations, the user may select an option to have the system that stores the original data perform some of the processing. For example, in a Big Data file system, such as Hadoop, the user may instruct the file system to perform some of the processing. The user may place code for the processing in nodes of the file system and request that the file system execute the code. In some implementations, the user may provide an SQL script to the file system. The SQL script may need to be translated.

In some implementations, the system may be able to identify an appropriate amount of data to refine based on the subsequent steps performed on the data. The system may be able to look ahead to the subsequent steps and adjust the amount data being refined so that the system executes the subsequent steps more efficiently. For example, a system may determine to increase the size of strings that it is extracting from files in preparation for subsequent processing that may require longer strings despite receiving instructions to extract smaller strings.

In some implementations, the system may read data from multiple sources and the user may not necessarily be required to have knowledge of where the data is located. The user may provide the instructions for the type of data refinement, or wrangling, for the system to preform, and the system identifies the location to retrieve the data from based on the status of the various file systems.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the disclosure.

What is claimed is:

1. A computer-implemented method comprising:
    receiving, by a data refinement engine, a request for processed data;
    determining, by the data refinement engine, a data source for unprocessed data and processing required to transform the unprocessed data into the processed data, the data source including a plurality of data nodes that are separate from the data refinement engine;
    determining, by the data refinement engine, that both the plurality of data nodes and the data refinement engine are configured to perform processing required to transform the unprocessed data into the processed data;
    determining, by the data refinement engine, (i) a portion of the processing for the plurality of data nodes to perform to transform a portion of the unprocessed data into a portion of the processed data and (ii) a remaining portion of the processing for the data refinement engine to perform to transform a remaining portion of the unprocessed data into a remaining portion of the processed data, wherein the respective portions of processing for the data refinement engine and the plurality of data nodes are determined to balance a processing load of the data refinement engine with a processing load of the plurality of data nodes;
    based on determining (i) the portion of the processing for the plurality of data nodes to perform to transform the portion of the unprocessed data into the portion of the processed data and (ii) the remaining portion of the processing for the data refinement engine to perform to transform the remaining portion of the unprocessed data into the remaining portion of the processed data, transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data;
    receiving, by the data refinement engine and from the plurality of data nodes, the portion of the processed data and the remaining portion of the unprocessed data;
    transforming, by the data refinement engine, the remaining portion of the unprocessed data into the remaining portion of the processed data by performing the remaining portion of the processing on the remaining portion of the unprocessed data; and
    transmitting, by the data refinement engine, the portion of the processed data received from the plurality of data nodes and the remaining portion of the processed data processed by the data refinement engine.

2. The method of claim 1, wherein processing required to transform the unprocessed data into the processed data comprises:
    filtering, aggregation, wrangling, searching, data mining, text analytics, on demand loading, incremental refreshing, streaming, data blending, complex ETL workflows, or multi-sourcing.

3. The method of claim 1, wherein the data refinement engine receives the request for processed data request from a dashboard application.

4. The method of claim 1, comprising:
    generating a query tree that includes query tasks for processing; and
    determining that the portion of the processing required to transform the portion of the unprocessed data into the portion of the processed data includes a first portion of the query tasks and the remaining portion of the processing required to transform the remaining portion of the unprocessed data into the remaining portion of the processed data includes a second portion of the query tasks,
    wherein transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data is further based on determining that the portion of the processing required to transform the portion of the unprocessed data into the portion of the processed data includes the first portion of the query tasks and the remaining portion of the processing required to transform the remaining portion of the unprocessed data into the remaining portion of the processed data includes the second portion of the query tasks.

5. The method of claim 1, comprising:
    after transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data, receiving, by the data refinement engine and from the plurality of data nodes, heartbeats and execution status updates.

6. The method of claim 1, wherein transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data comprises:

identifying a particular data node of the plurality of data nodes that stores a sub-portion of the portion of the unprocessed data; and transmitting, to the particular data node of the plurality of data nodes, code to perform a sub-portion of processing required to transform the sub-portion of the portion of the unprocessed data into a sub-portion of the portion of processed data.

7. The method of claim 1, comprising:

identifying, by the data refinement engine, a group of the plurality of nodes that stores copies of a same sub-portion of the portion of the unprocessed data;

determining, by the data refinement engine, a processing load of each node in the group of the plurality of nodes; and for each node in the group of the plurality of nodes, determining, by the data refinement engine, a sub-portion of the portion of the processing required to transform the portion of the unprocessed data into the portion of the processed data to balance processing loads of each node in the group of the plurality of nodes;

wherein transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data comprises:

for each node in the group of the plurality of nodes, transmitting, by the data refinement engine and to a respective node in the group of the plurality of data nodes, code including instructions to perform a respective sub-portion of the portion of the processing required to transform the portion of the unprocessed data into the portion of the processed data.

8. A system comprising:

one or more computers and one or more storage devices storing instructions that are operable, when executed by the one or more computers, to cause the one or more computers to perform operations comprising:

receiving, by a data refinement engine, a request for processed data;

determining, by the data refinement engine, a data source for unprocessed data and processing required to transform the unprocessed data into the processed data, the data source including a plurality of data nodes that are separate from the data refinement engine;

determining, by the data refinement engine, that both the plurality of data nodes and the data refinement engine are configured to perform processing required to transform the unprocessed data into the processed data;

determining, by the data refinement engine, (i) a portion of the processing for the plurality of data nodes to perform to transform a portion of the unprocessed data into a portion of the processed data and (ii) a remaining portion of the processing for the data refinement engine to perform to transform a remaining portion of the unprocessed data into a remaining portion of the processed data, wherein the respective portions of processing for the data refinement engine and the plurality of data nodes are determined to balance a processing load of the data refinement engine with a processing load of the plurality of data nodes;

based on determining (i) the portion of the processing for the plurality of data nodes to perform to transform the portion of the unprocessed data into the portion of the processed data and (ii) the remaining portion of the processing for the data refinement engine to perform to transform the remaining portion of the unprocessed data into the remaining portion of the processed data, transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data;

receiving, by the data refinement engine and from the plurality of data nodes, the portion of the processed data and the remaining portion of the unprocessed data;

transforming, by the data refinement engine, the remaining portion of the unprocessed data into the remaining portion of the processed data by performing the remaining portion of the processing on the remaining portion of the unprocessed data; and transmitting, by the data refinement engine, the portion of the processed data received from the plurality of data nodes and the remaining portion of the processed data processed by the data refinement engine.

9. The system of claim 8, wherein processing required to transform the unprocessed data into the processed data comprises:

filtering, aggregation, wrangling, searching, data mining, text analytics, on demand loading, incremental refreshing, streaming, data blending, complex ETL workflows, or multi-sourcing.

10. The system of claim 8, wherein the data refinement engine receives the request for processed data request from a dashboard application.

11. The system of claim 8, wherein the operations further comprise:

generating a query tree that includes query tasks for processing; and determining that the portion of the processing required to transform the portion of the unprocessed data into the portion of the processed data includes a first portion of the query tasks and the remaining portion of the processing required to transform the remaining portion of the unprocessed data into the remaining portion of the processed data includes a second portion of the query tasks, wherein transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data is further based on determining that the portion of the processing required to transform the portion of the unprocessed data into the portion of the processed data includes the first portion of the query tasks and the remaining portion of the processing required to transform the remaining portion of the unprocessed data into the remaining portion of the processed data includes the second portion of the query tasks.

12. The system of claim 8, wherein the operations further comprise:
after transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data, receiving, by the data refinement engine and from the plurality of data nodes, heartbeats and execution status updates.

13. The system of claim 8, wherein transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data comprises:
identifying a particular data node of the plurality of data nodes that stores a sub-portion of the portion of the unprocessed data; and
transmitting, to the particular data node of the plurality of data nodes, code to perform a sub-portion of processing required to transform the sub-portion of the portion of the unprocessed data into a sub-portion of the portion of processed data.

14. A non-transitory computer-readable medium storing software comprising instructions executable by one or more computers which, upon such execution, cause the one or more computers to perform operations comprising:
receiving, by a data refinement engine, a request for processed data;
determining, by the data refinement engine, a data source for unprocessed data and processing required to transform the unprocessed data into the processed data, the data source including a plurality of data nodes that are separate from the data refinement engine;
determining, by the data refinement engine, that both the plurality of data nodes and the data refinement engine are configured to perform processing required to transform the unprocessed data into the processed data;
determining, by the data refinement engine, (i) a portion of the processing for the plurality of data nodes to perform to transform a portion of the unprocessed data into a portion of the processed data and (ii) a remaining portion of the processing for the data refinement engine to perform to transform a remaining portion of the unprocessed data into a remaining portion of the processed data, wherein the respective portions of processing for the data refinement engine and the plurality of data nodes are determined to balance a processing load of the data refinement engine with a processing load of the plurality of data nodes;
based on determining (i) the portion of the processing for the plurality of data nodes to perform to transform the portion of the unprocessed data into the portion of the processed data and (ii) the remaining portion of the processing for the data refinement engine to perform to transform the remaining portion of the unprocessed data into the remaining portion of the processed data, transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data;
receiving, by the data refinement engine and from the plurality of data nodes, the portion of the processed data and the remaining portion of the unprocessed data;
transforming, by the data refinement engine, the remaining portion of the unprocessed data into the remaining portion of the processed data by performing the remaining portion of the processing on the remaining portion of the unprocessed data; and
transmitting, by the data refinement engine, the portion of the processed data received from the plurality of data nodes and the remaining portion of the processed data processed by the data refinement engine.

15. The non-transitory computer-readable medium of claim 14, wherein processing required to transform the unprocessed data into the processed data comprises:
filtering, aggregation, wrangling, searching, data mining, text analytics, on demand loading, incremental refreshing, streaming, data blending, complex ETL workflows, or multi-sourcing.

16. The non-transitory computer-readable medium of claim 14, wherein the operations further comprise:
generating a query tree that includes query tasks for processing; and
determining that the portion of the processing required to transform the portion of the unprocessed data into the portion of the processed data includes a first portion of the query tasks and the remaining portion of the processing required to transform the remaining portion of the unprocessed data into the remaining portion of the processed data includes a second portion of the query tasks,
wherein transmitting, by the data refinement engine and to the plurality of data nodes, code including instructions (i) to perform the portion of the processing required to transform the portion of the unprocessed data into the portion of the processed data and (ii) to provide, to the data refinement engine, the remaining portion of the unprocessed data is further based on determining that the portion of the processing required to transform the portion of the unprocessed data into the portion of the processed data includes the first portion of the query tasks and the remaining portion of the processing required to transform the remaining portion of the unprocessed data into the remaining portion of the processed data includes the second portion of the query tasks.

17. The non-transitory computer-readable medium of claim 14, wherein the operations further comprise:
after transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data, receiving, by the data refinement engine and from the plurality of data nodes, heartbeats and execution status updates.

18. The non-transitory computer-readable medium of claim 14, wherein transmitting, by the data refinement engine and to the plurality of data nodes, the code including the instructions (i) to perform the portion of the processing required to transform the portion of the unprocessed data into the portion of the processed data and (ii) to provide, to the data refinement engine, the remaining portion of the unprocessed data comprises:

identifying a particular data node of the plurality of data nodes that stores a sub-portion of the portion of the unprocessed data; and transmitting, to the particular data node of the plurality of data nodes, code to perform a sub-portion of processing required to transform the sub-portion of the portion of the unprocessed data into a sub-portion of the portion of processed data.

\* \* \* \* \*